(12) United States Patent
Kunishige et al.

(10) Patent No.: US 8,957,982 B2
(45) Date of Patent: Feb. 17, 2015

(54) IMAGING DEVICE AND IMAGING METHOD

(75) Inventors: Keiji Kunishige, Hachioji (JP); Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 167 days.

(21) Appl. No.: 13/613,993

(22) Filed: Sep. 13, 2012

(65) Prior Publication Data

US 2013/0083211 A1    Apr. 4, 2013

(30) Foreign Application Priority Data

Oct. 4, 2011   (JP) ................................ 2011-220542
Oct. 4, 2011   (JP) ................................ 2011-220543

(51) Int. Cl.
*H04N 5/228* (2006.01)
*H04N 5/225* (2006.01)
*H04N 5/262* (2006.01)
*H04N 5/232* (2006.01)

(52) U.S. Cl.
CPC .......... *H04N 5/23245* (2013.01); *H04N 5/2621* (2013.01)
USPC ....................... 348/222.1; 348/220.1; 348/239

(58) Field of Classification Search
CPC .. H04N 5/262; H04N 5/2621; H04N 5/23245
USPC .................... 348/222.1, 220.1, 239
See application file for complete search history.

(56) References Cited

U.S. PATENT DOCUMENTS

| | | | |
|---|---|---|---|
| 6,546,187 B1* | 4/2003 | Miyazaki et al. ............. | 386/224 |
| 8,384,785 B2* | 2/2013 | Solomon .................... | 348/207.1 |
| 8,605,171 B2* | 12/2013 | Toyoda ........................ | 348/239 |
| 2002/0105589 A1* | 8/2002 | Brandenberger et al. ..... | 348/360 |
| 2006/0268117 A1* | 11/2006 | Loui et al. .................. | 348/220.1 |
| 2008/0049123 A1* | 2/2008 | Gloudemans et al. ........ | 348/239 |
| 2010/0142913 A1* | 6/2010 | Hasegawa ...................... | 386/52 |
| 2010/0201830 A1* | 8/2010 | Hosoda ........................ | 348/220.1 |
| 2010/0238324 A1* | 9/2010 | Toyoda ........................ | 348/239 |
| 2010/0268729 A1* | 10/2010 | Nara et al. .................... | 707/769 |

FOREIGN PATENT DOCUMENTS

| | | |
|---|---|---|
| JP | 2010-062836 | 3/2010 |
| JP | 2010-074244 | 4/2010 |

* cited by examiner

*Primary Examiner* — James Hannett
(74) *Attorney, Agent, or Firm* — John C. Pokotylo; Straub & Pokotylo

(57) ABSTRACT

An imaging device includes a moving image special effect image processing unit that performs image processing of applying a first special effect causing a visual effect over a plurality of frames corresponding to image data of a moving image, and image processing of applying a second special effect corresponding to the first special effect to a still image captured during moving image capturing using image data of a moving image captured before the still image, and a control unit that controls an application form of the first and second special effects in the moving image special effect image processing unit.

4 Claims, 42 Drawing Sheets

FIG.3

| NAME | CHROMA | GAMMA | VISUAL EFFECT |
|---|---|---|---|
| FANTASIC FOCUS | STANDARD | GAMMA CAUSING INTERMEDIATE BRIGHTNESS TO BE BRIGHTER | SOFT FOCUS |
| FANTASIC FOCUS+ STARLIGHT | STANDARD | GAMMA CAUSING INTERMEDIATE BRIGHTNESS TO BE BRIGHTER | SOFT FOCUS+ CROSS FILTER |
| FANTASIC FOCUS+ WHITE EDGE | STANDARD | GAMMA CAUSING INTERMEDIATE BRIGHTNESS TO BE BRIGHTER | SOFT FOCUS+ PERIPHERAL BRIGHTNESS INCREASE |
| POP ART | HIGH CHROMA | GAMMA ENHANCING CONTRAST | NOTHING |
| POP ART+STARLIGHT | HIGH CHROMA | GAMMA ENHANCING CONTRAST | CROSS FILTER |
| POP ART+PINHOLE | HIGH CHROMA | GAMMA ENHANCING CONTRAST | SHADING |
| POP ART+ WHITE EDGE | HIGH CHROMA | GAMMA ENHANCING CONTRAST | PERIPHERAL BRIGHTNESS INCREASE |
| TOY PHOTO | STANDARD | STANDARD | SHADING |
| ROUGH MONOCHROME | MONOCHROME | GAMMA ENHANCING CONTRAST | NOISE ADDITION |
| DIORAMA | HIGH CHROMA | GAMMA ENHANCING CONTRAST | PERIPHERAL GRADATION |

TIME FROM TRIGGER

FIG.10

| BUTTON | DURING MOVING IMAGE NON-RECORDING | DURING MOVING IMAGE RECORDING |
|---|---|---|
| ↑ (UP-ARROW KEY) | EXPOSURE CORRECTION | ONE-SHOT ECHO START |
| ↓ (DOWN-ARROW KEY) | CONTINUOUS SHOOTING/SINGLE SHOOTING | TRANSIT START |
| ← (LEFT-ARROW KEY) | AF TARGET | MULTIECHO START/STOP |
| → (RIGHT-ARROW KEY) | FLASH SETTING | FLUCTUATION START |

FIG.11

| BUTTON | DURING MOVING IMAGE NON-RECORDING | DURING MOVING IMAGE RECORDING |
|---|---|---|
| ↑ (UP-ARROW KEY) | EXPOSURE CORRECTION | EFFECT START |
| ↓ (DOWN-ARROW KEY) | CONTINUOUS SHOOTING/SINGLE SHOOTING | EFFECT STOP (STOP AT TIME OF MULTI-ECHO) |
| ← (LEFT-ARROW KEY) | AF TARGET | EFFECT SWITCHING |
| → (RIGHT-ARROW KEY) | FLASH SETTING | EFFECT SWITCHING |

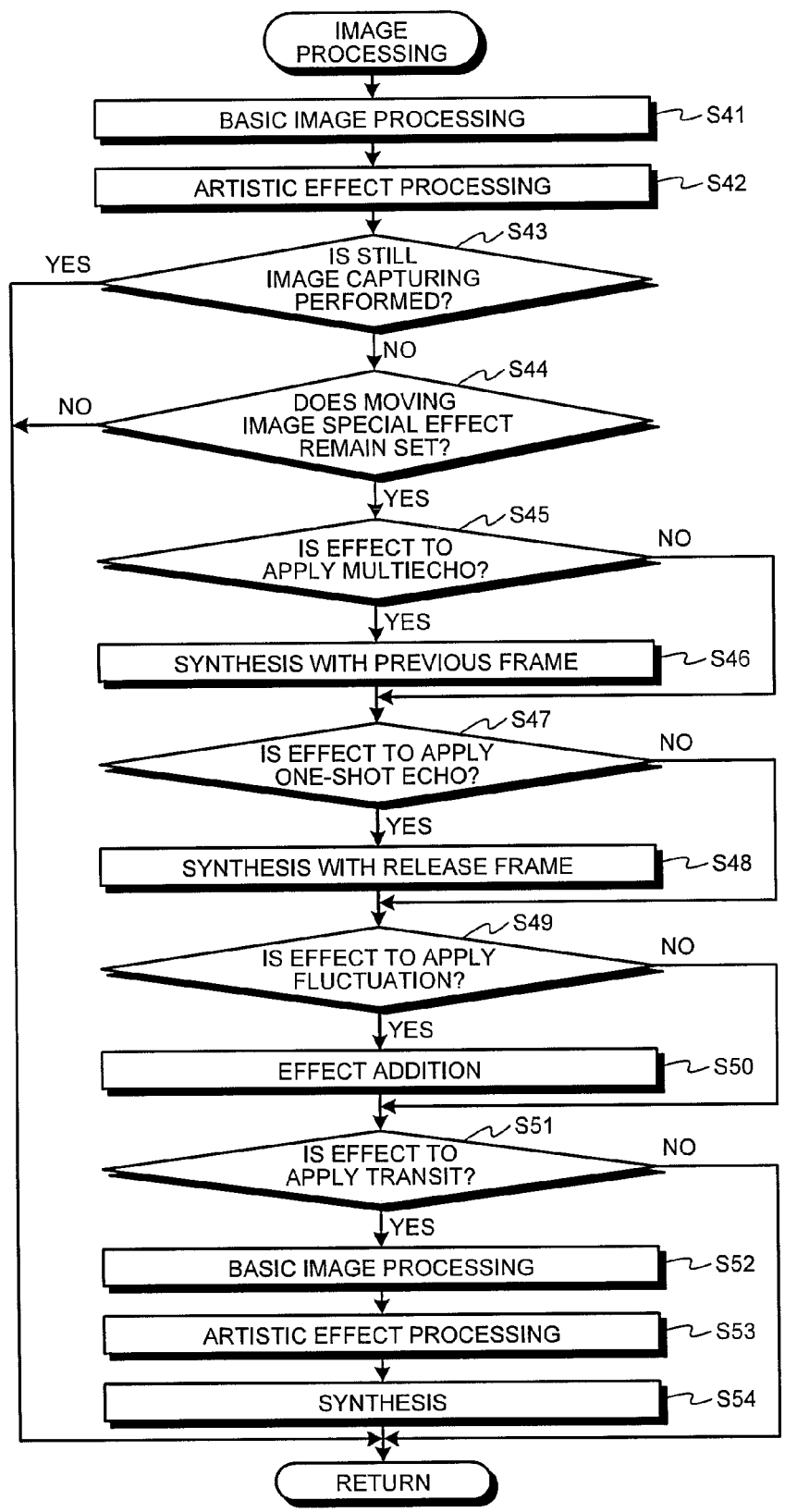

FIG.17

| BUTTON (OPERATION) | DURING MOVING IMAGE NON-RECORDING | DURING MOVING IMAGE RECORDING |
|---|---|---|
| RELEASE BUTTON (FIRST RELEASE) | AE/AF | EFFECT START/STOP (STOP AT TIME OF MULTI-ECHO) |
| RELEASE BUTTON (SECOND RELEASE) | SHOOTING | ... |
| LENS OPERATING UNIT | FOCUS | EFFECT SWITCHING |

FIG.18

| BUTTON | DURING MOVING IMAGE NON-RECORDING | DURING MOVING IMAGE RECORDING |
|---|---|---|
| FUNCTION KEY | AF | EFFECT START/STOP (STOP AT TIME OF MULTI-ECHO) |
| LENS OPERATING UNIT | FOCUS | EFFECT SWITCHING |

| BUTTON (OPERATION) | DURING MOVING IMAGE NON-RECORDING | DURING MOVING IMAGE RECORDING |
|---|---|---|
| TOUCH PANEL (TOUCH) | STILL IMAGE CAPTURING | EFFECT START/STOP (STOP AT TIME OF MULTI-ECHO) |
| TOUCH PANEL (HORIZONTAL SLIDE) | ... | EFFECT SWITCHING |

FIG.22

| BUTTON | DURING MOVING IMAGE NON-RECORDING | DURING MOVING IMAGE RECORDING |
|---|---|---|
| ↑ (UP-ARROW KEY) | EXPOSURE CORRECTION | EFFECT SIMULATION START |
| ↓ (DOWN-ARROW KEY) | CONTINUOUS SHOOTING/SINGLE SHOOTING | EFFECT STOP (MULTI ECHO AND FLUCTUATION) |
| ← (LEFT-ARROW KEY) | AF TARGET | EFFECT SWITCHING |
| → (RIGHT-ARROW KEY) | FLASH SETTING | EFFECT SWITCHING |
| DECISION BUTTON | CAMERA SETTING | EFFECT RECORDING START |
| RELEASE BUTTON (FIRST RELEASE) | AE/AF | EFFECT RECORDING START |
| RELEASE BUTTON (SECOND RELEASE) | SHOOTING | EFFECT RECORDING START |

FIG.23

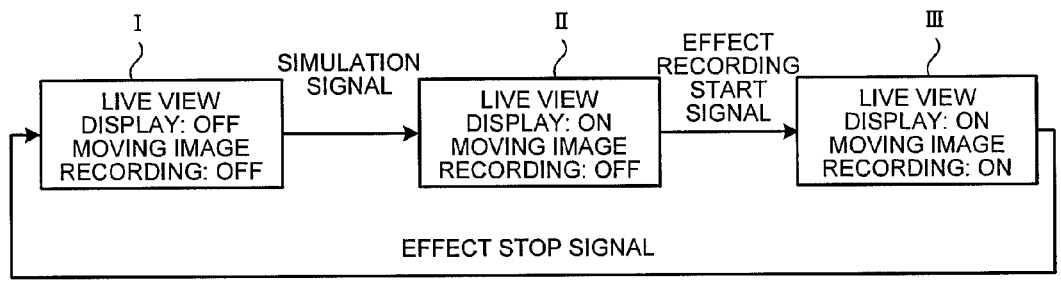

FIG.24

| BUTTON | DURING MOVING IMAGE NON-RECORDING | DURING MOVING IMAGE RECORDING |
|---|---|---|
| ↑ (UP-ARROW KEY) | EXPOSURE CORRECTION | ONE-SHOT ECHO EFFECT START |
| ↓ (DOWN-ARROW KEY) | CONTINUOUS SHOOTING/ SINGLE SHOOTING | TRANSIT EFFECT START |
| ← (LEFT-ARROW KEY) | AF TARGET | MULTI-ECHO SIMULATION START |
| → (RIGHT-ARROW KEY) | FLASH SETTING | FLUCTUATION SIMULATION START |
| DECISION BUTTON | CAMERA SETTING | EFFECT RECORDING START/EFFECT STOP |
| RELEASE BUTTON (FIRST RELEASE) | AE/AF | EFFECT RECORDING START/EFFECT STOP |
| RELEASE BUTTON (SECOND RELEASE) | SHOOTING | EFFECT RECORDING START/EFFECT STOP |

FIG.25

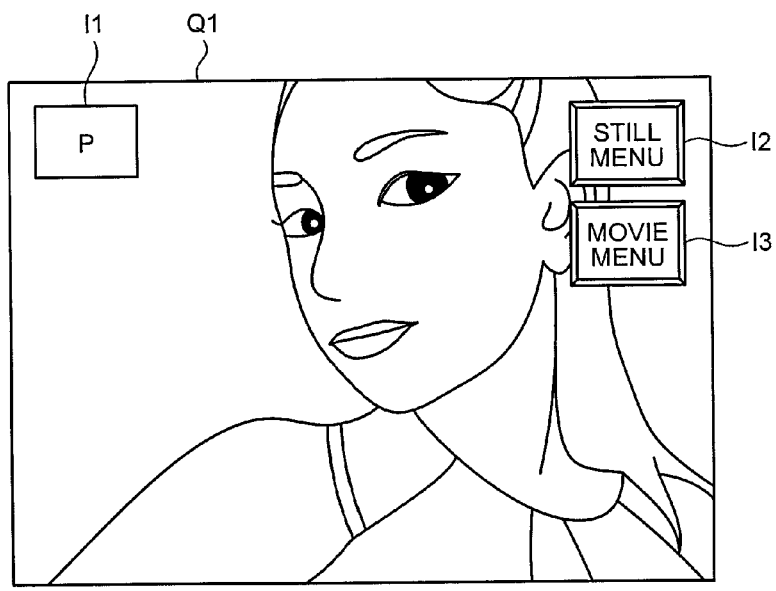

FIG.32

| BUTTON | STILL IMAGE CAPTURING MODE | MOVING IMAGE CAPTURING MODE |
|---|---|---|
| ↑ (UP-ARROW KEY) | EXPOSURE CORRECTION | EXPOSURE CORRECTION |
| ↓ (DOWN-ARROW KEY) | CONTINUOUS SHOOTING/ SINGLE SHOOTING | TRANSIT START |
| ← (LEFT-ARROW KEY) | AF TARGET | AF TARGET |
| → (RIGHT-ARROW KEY) | FLASH SETTING | FLUCTUATION START/STOP |
| PLAYBACK BUTTON | PLAYBACK | ONE-SHOT ECHO START |
| ERASE BUTTON | ERASE | MULTIECHO START/STOP |

| BUTTON | STILL IMAGE CAPTURING MODE | MOVING IMAGE CAPTURING MODE |
|---|---|---|
| ↑ (UP-ARROW KEY) | EXPOSURE CORRECTION | ONE-SHOT ECHO START |
| ↓ (DOWN-ARROW KEY) | CONTINUOUS SHOOTING/ SINGLE SHOOTING | TRANSIT START |
| ← (LEFT-ARROW KEY) | AF TARGET | MULTIECHO START/ STOP |
| → (RIGHT-ARROW KEY) | FLASH SETTING | FLUCTUATION START/ STOP |

IMAGING DEVICE AND IMAGING METHOD

CROSS-REFERENCE TO RELATED APPLICATIONS

This application is based upon and claims the benefit of priority from Japanese Patent Application No. 2011-220542 and Japanese Patent Application No. 2011-220543, filed on Oct. 4, 2011, the entire contents of which are incorporated herein by reference.

BACKGROUND OF THE INVENTION

1. Field of the Invention

The present invention relates to an imaging device that images a subject and generates image data of the subject, and an imaging method.

2. Description of the Related Art

In recent years, imaging devices such as digital cameras have been known that have not only a function of generating a clear image with a natural impression but also a function of intentionally adding an effect such as noise, shading, and gradation. The imaging device having the above-mentioned functions can perform shooting giving a special impression which has not been provided in the past.

For example, Japanese Laid-open Patent Publication No. 2010-62836 discloses a technique of generating an image of a high contrast with a granular feeling (noise feeling) like a film. According to this technique, it is possible to capture an image having a rough and dynamic impression.

Further, Japanese Laid-open Patent Publication No. 2010-74244 discloses a technique of generating an image whose edge is dimmed. According to this technique, it is possible to capture an image of an impression that capturing is performed by a toy camera.

The above-mentioned techniques of the related arts can be applied to moving image capturing as well as still image capturing. When moving image capturing is performed, a unique video expression of a moving image which is not obtained in a still image can be made using a temporal change in an image.

SUMMARY OF THE INVENTION

An imaging device according to the present invention captures a subject, generates image data of the subject, captures a moving image, and captures a still image during moving image capturing including directly after moving image capturing end, the device including: a moving image special effect image processing unit that performs image processing of applying a first special effect causing a visual effect over a plurality of frames corresponding to image data of a moving image, and image processing of applying a second special effect corresponding to the first special effect to a still image captured during moving image capturing using image data of a moving image captured before the still image; and a control unit that controls an application form of the first and second special effects in the moving image special effect image processing unit.

An imaging device according to the present invention captures a subject, generates image data of the subject, captures a moving image, and captures a still image during moving image capturing including directly after moving image capturing end, the device including: a moving image special effect image processing unit that performs moving image special effect image processing of synthesizing captured image data with a plurality of image data captured before the image data at a predetermined ratio; and a control unit that changes the number of image data synthesized by the moving image special effect image processing unit depending on whether the captured image data is a moving image or a still image.

An imaging method according to the present invention is performed by an imaging device that captures a subject, generates image data of the subject, captures a moving image, and captures a still image during moving image capturing including directly after moving image capturing end, the method including: performing image processing of applying a first special effect causing a visual effect over a plurality of frames corresponding to image data of a moving image, and image processing of applying a second special effect corresponding to the first special effect to a still image captured during moving image capturing using image data of a moving image captured before the still image.

An imaging method according to the present invention is performed by an imaging device that captures a subject, generates image data of the subject, captures a moving image, and captures a still image during moving image capturing including directly after moving image capturing end, the method including: performing moving image special effect image processing of synthesizing captured image data with a plurality of image data captured before the image data at a predetermined ratio; and changing the number of image data synthesized by the moving image special effect image processing unit depending on whether the captured image data is a moving image or a still image.

An imaging device according to the present invention captures a subject, generates image data of the subject, and captures a moving image and a still image, the device including: a moving image special effect image processing unit that applies an expression of temporally changing a visual effect over a plurality of frames; and an artistic effect processing unit that applies an artistic effect causing a visual effect to one image data, wherein the moving image special effect image processing unit performs transit processing of steadily changing an artistic effect over a plurality of frames, the transit processing synthesizing an image obtained by multiplying a first artistic effect image by a coefficient b changing over time with an image obtained by multiplying a second artistic effect image different from the first artistic effect image by a coefficient 1–b, and the coefficient b is changed in response to a start trigger input of the transit processing.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an outline of artistic effect imaging processing performed by an artistic effect image processing unit of the imaging device according to the first embodiment of the present invention;

FIG. 10 is a diagram illustrating an example of assigning an operation to each arrow key of a cross key at the time of moving image recording and at the time of moving image non-recording;

FIG. 11 is a diagram illustrating an example (second example) of assigning an operation to each arrow key of a cross key at the time of moving image recording and at the time of moving image non-recording;

FIG. 16 is a flowchart illustrating an outline of image processing performed by the imaging device according to the first embodiment of the present invention;

FIG. 17 is a diagram illustrating an assignment of a user interface at the time of moving image recording and at the time of moving image non-recording in an imaging device according to Modified Example 1-1 of the first embodiment of the present invention;

FIG. 18 is a diagram illustrating an assignment of a user interface at the time of moving image recording and at the time of moving image non-recording in an imaging device according to Modified Example 1-2 of the first embodiment of the present invention;

FIG. 22 is a diagram illustrating an assignment of a user interface according to the second embodiment of the present invention;

FIG. 23 is a diagram illustrating an outline of a state transition of an imaging device according to the second embodiment of the present invention at the time of moving image recording;

FIG. 24 is a diagram illustrating an assignment of a user interface at the time of moving image recording and at the time of moving image non-recording in an imaging device according to Modified Example 2-1 of the second embodiment of the present invention;

FIG. 25 is a diagram illustrating a screen display example in a display unit when an imaging device according to Modified Example 2-2 of the second embodiment of the present invention is in a still image capturing standby state;

FIG. 32 is a diagram illustrating a key assignment when an imaging device according to the third embodiment of the present invention is set to a still image capturing mode or a moving image capturing mode;

DETAILED DESCRIPTION OF THE PREFERRED EMBODIMENTS

Figure 1:
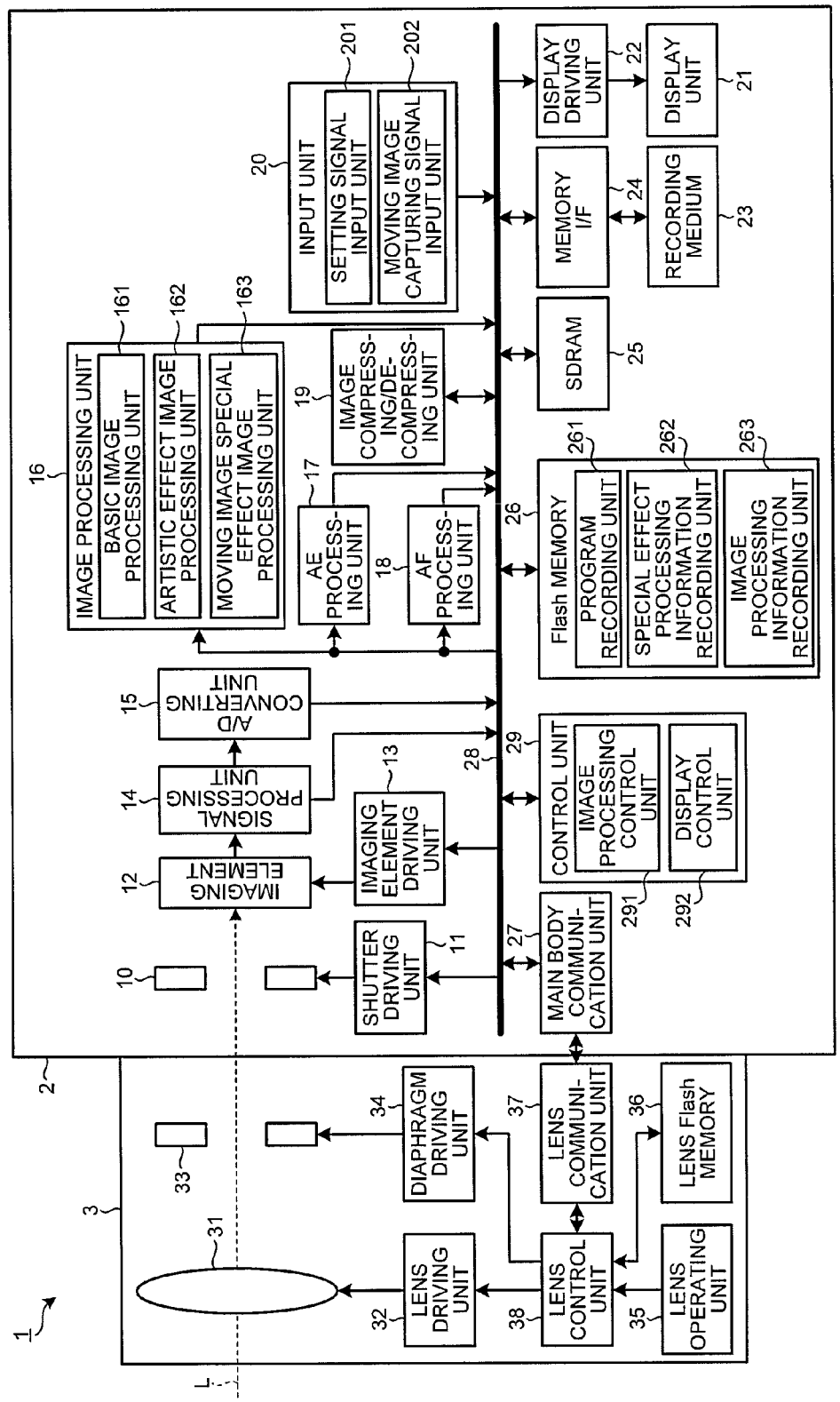
FIG. 1 is a block diagram illustrating a configuration of an imaging device according to a first embodiment of the present invention.

Hereinafter, embodiments (hereinafter, referred to as an "embodiment") for embodying the present invention will be described with reference to the accompanying drawings. In the drawings, like reference numerals denote like parts.

First Embodiment

In a first embodiment of the present invention, when moving image recording starts using an imaging device having a still image capturing function and a moving image capturing function, a function of a user interface for an operation input assigned for a still image is switched to a function for a moving image special effect.

The imaging device of the first embodiment has a function of capturing a still image during moving image capturing. Here, examples of a method of capturing a still image during moving image capturing include a method of capturing a still image in the process of capturing a moving image and a method of capturing a still image directly after moving image capturing ends. Further, examples of the method of capturing a still image in the process of capturing a moving image includes a method of stopping moving image capturing and then performing still image capturing and a method of performing still image capturing and moving image capturing at the same time.

Figure 2:
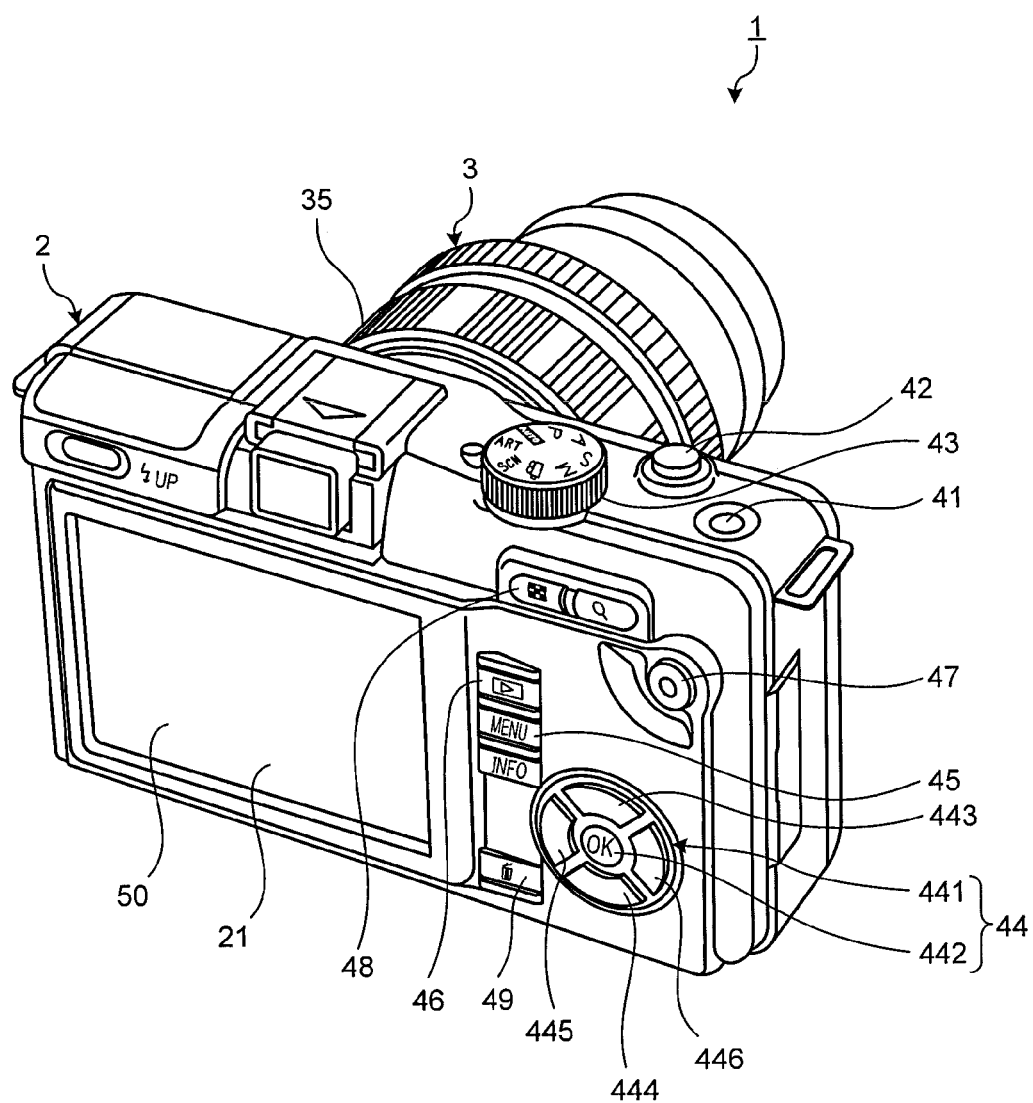
FIG. 2 is a perspective view illustrating a configuration of the imaging device according to the first embodiment of the present invention, which is viewed at a side (front side) facing a user.

FIG. 1 is a block diagram illustrating a configuration of the imaging device of the first embodiment. FIG. 2 is a perspective view illustrating a configuration of the imaging device according to the first embodiment of the present invention, which is viewed at a side (front side) facing the user. An imaging device 1 illustrated in FIGS. 1 and 2 includes a main body unit 2 and a lens unit 3 detachably attached to the main body unit 2.

The main body unit 2 includes a shutter 10, a shutter driving unit 11, an imaging element 12, an imaging element driving unit 13, a signal processing unit 14, an A/D (analog-to-digital) converting unit 15, an image processing unit 16, an AE (automatic exposure) processing unit 17, an AF (auto-focus) processing unit 18, an image compressing/decompressing unit 19, an input unit 20, a display unit 21, a display driving unit 22, a recording medium 23, a memory I/F 24, an SDRAM (Synchronous Dynamic Random Access Memory) 25, a flash memory 26, a main body communication unit 27, a bus 28, and a control unit 29.

The shutter 10 causes a state of the imaging element 12 to be set to an exposure state or a light-blocking state. The shutter driving unit 11 is configured using a stepping motor or the like, and drives the shutter 10 in response to an instruction signal input from the control unit 29.

The imaging element 12 is configured, for example, using a CCD (Charge Coupled Device) or a CMOS (Complementary Metal Oxide Semiconductor) that receives light condensed by the lens unit 3 and converts the light into an electric signal. The imaging element driving unit 13 causes the imaging element 12 to output image data (an analog signal) to the signal processing unit 14 at a predetermined timing. In this context, the imaging element driving unit 13 functions as an electronic shutter.

The signal processing unit 14 executes analog processing on the analog signal input from the imaging element 12, and outputs a resultant signal to the A/D converting unit 15. Specifically, the signal processing unit 14 performs noise reduction processing, gain-up processing, and the like on the analog signal. For example, the signal processing unit 14 reduces reset noise and the like from the analog signal, performs waveform shaping, and then performs gain-up processing to cause brightness to reach to a target level.

The A/D converting unit 15 generates digital image data by performing A/D conversion on the analog signal input from the signal processing unit 14, and outputs the digital image data to the SDRAM 25 through the bus 28.

The image processing unit 16 acquires image data from the SDRAM 25 through the bus 28, performs various kinds of image processing on the acquired image data (RAW data), and generates processed image data. The processed image data is output to the SDRAM 25 through the bus 28. The image processing unit 16 includes a basic image processing unit 161, an artistic effect image processing unit 162, and a moving image special effect image processing unit 163.

The basic image processing unit 161 performs basic image processing including at least optical black subtraction processing, white balance (WB) adjustment processing, synchronization processing of image data when an imaging element has the Bayer array, color matrix calculation processing, gamma correction processing, color reproduction processing, and edge enhancement processing on image data. Further, the basic image processing unit 161 performs finish effect processing of reproducing a natural image based on previously set parameters of respective image processing, and so generates finish effect image data. Here, examples of the parameters of the respective image processing include a contrast value, a sharpness value, a chroma value, a white balance value, and a gradation value.

The artistic effect image processing unit 162 performs artistic effect image processing of causing a visual effect by combining a plurality of image processing on single image data, and so generates processed image data (hereinafter, referred to as "artistic effect image data").

FIG. 3 is a diagram illustrating an outline of artistic effect image processing performed by the artistic effect image processing unit 162. In FIG. 3, ten kinds of processing, that is, fantasic focus, fantasic focus+starlight, fantasic focus+white edge, pop art, pop art+starlight, pop art+pinhole, pop art+ white edge, toy photo, rough monochrome, and diorama are described as artistic effect processing. Each artistic effect image processing mentioned above will be described below.

The fantasic focus is processing of executing gradation processing on an entire image and giving an effect of a soft focus of synthesizing a resultant image with a non-gradated image at a predetermined ratio. In the fantasic focus, tone curve processing of causing intermediate brightness to be brighter is performed, and thus an image of a beautiful and fantastic atmosphere appearing to be surrounded by happy light is formed or generated while leaving a detail of a subject in soft tone. For example, the fantasic focus is implemented by a combination of image processing such as tone curve processing, gradation processing, alpha blending processing, and image synthesis processing.

The fantasic focus+starlight is processing of applying a cross filter effect of drawing a cross pattern on a high-brightness part of an image in addition to the fantasic focus.

The fantasic focus+white edge is processing of applying an effect of gradually taking on a white tint as it is closer from the center of an image to the edge thereof in addition to the fantasic focus. The white tint effect is obtained by changing a pixel value such that the edge becomes whiter as the distance from the center of an image increases.

The pop art is processing of enhancing a color to be colorful and rendering a bright and pleasant atmosphere. For example, the pop art is implemented by a combination of chroma enhancement processing and contrast enhancement processing. Overall, an effect of a high contrast and a high chroma is given.

The pop art+starlight is processing of applying the pop art and the starlight in an overlapping manner. In this case, an effect in which a cross filter is applied to a colorful image is obtained.

The pop art+pinhole is processing of applying a toy photo (pinhole) that darkens the edge of an image by shading and gives an effect of looking through a hole in addition to the pop art. The details of the toy photo will be described later.

The pop art+white edge is processing of applying the pop art and the white edge in an overlapping manner.

The toy photo is processing of causing brightness to decrease (darken) as the distance from the center of an image increases and giving an effect of being sucked into unusual space when looking through a hole. For example, the toy photo is implemented by a combination of image processing such as shading processing of multiplying a brightness signal by a coefficient whose value decreases as it is closer to a peripheral part in addition to low pass filter processing, white balance processing, contrast processing, and hue/chroma processing (for example, see Japanese Laid-open Patent Publication No. 2010-74244 for the details of the toy photo and the shading).

The rough monochrome is processing of adding a high contrast and granular noise of a film and rendering a dynamic or rough monochrome image. For example, the rough monochrome is implemented by a combination of edge enhancement processing, level correction optimization processing, noise pattern overlap processing, synthesis processing, contrast processing, and the like (for example, see Japanese Laid-open Patent Publication No. 2010-62836 for the details of the rough monochrome). The noise pattern overlap processing (noise addition processing) is processing of adding a previously generated noise pattern image to an original image. For example, a random number may be generated and used to generate the noise pattern image.

The diorama is processing of gradating the edge of an image of a high contrast and a high chroma and so causing an atmosphere which felt as if a miniature model or toy is being viewed to be created on a screen. For example, the diorama is implemented by a combination of hue/chroma processing, contrast processing, peripheral gradation processing, synthesis processing, and the like. Of these, in the peripheral gradation processing, low pass filter processing is performed while changing a low pass filter coefficient according to the position of an image such that a fading degree increases as the distance from the center of an image increases, that is, it is closer to a peripheral part. Further, the peripheral gradation processing may be performed such that the top and bottom of an image or the left and right of an image is gradated.

The moving image special effect image processing unit 163 performs image processing of adding a special effect to an image during moving image recording. Examples of a moving image special effect executed by the moving image special effect image processing unit 163 includes a multiecho, a one-shot echo, a transit, and a fluctuation. The moving image special effects will be described below.

Figure 4:
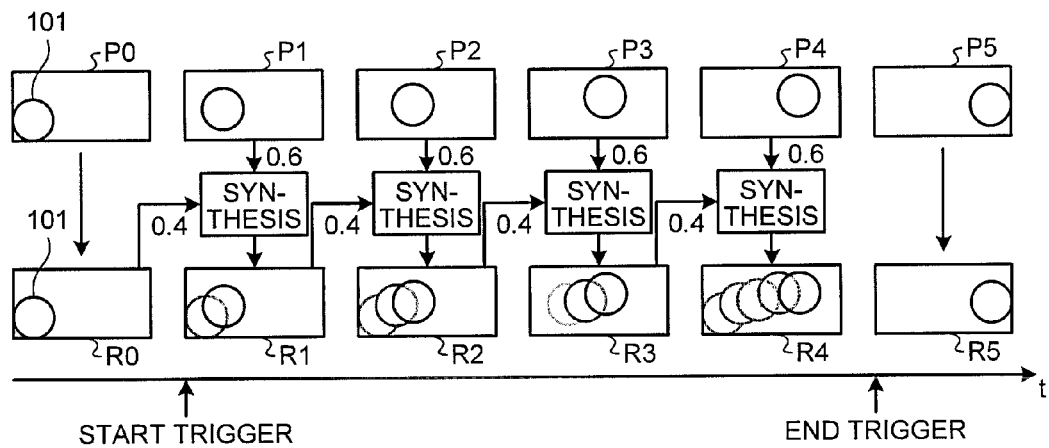
FIG. 4 is a diagram for describing an outline of a multi-echo.

FIG. 4 is a diagram for describing an outline of a multiecho. The multiecho refers to an effect of leaving an afterimage on an image by repeatedly synthesizing an immediately previous recording image with a currently captured image during a predetermined time period. Specifically, an effect by which the trajectory along which a ball 101 moves is displayed as an after image is given as illustrated in FIG. 4.

Here, in a state in which the multiecho remains set as the moving image special effect, when a start trigger is received, the moving image special effect image processing unit 163 performs processing (multiecho processing) of synthesizing an image generated directly after that with an image of an immediately previous frame at a predetermined ratio.

In the example illustrated in FIG. 4, the moving image special effect image processing unit 163 generates a synthesized image R1 by synthesizing a captured image P1 captured directly after the start trigger is input with a recording image R0 corresponding to a captured image P0 of an immediately previous frame. At the time of this synthesis, in each pixel, a signal of the captured image P1 is multiplied by a coefficient 0.6, and a signal of the recording image R0 is multiplied by a coefficient 0.4.

Next, the moving image special effect image processing unit 163 generates a multiecho image R2 by synthesizing the synthesized image R1 with a captured image P2 of a next frame. Here, in order to generate the multiecho image R2, in each pixel, a signal of the captured image P2 is multiplied by a coefficient 0.6, a signal of the synthesized image R1 is multiplied by a coefficient 0.4.

The moving image special effect image processing unit 163 repeatedly performs the above-described synthesis processing until an end trigger is input and thus sequentially generates multiecho images. Here, when the end trigger is input, a recording image R5 corresponding to a captured image P5 is recorded in the recording medium 23.

Figure 5:
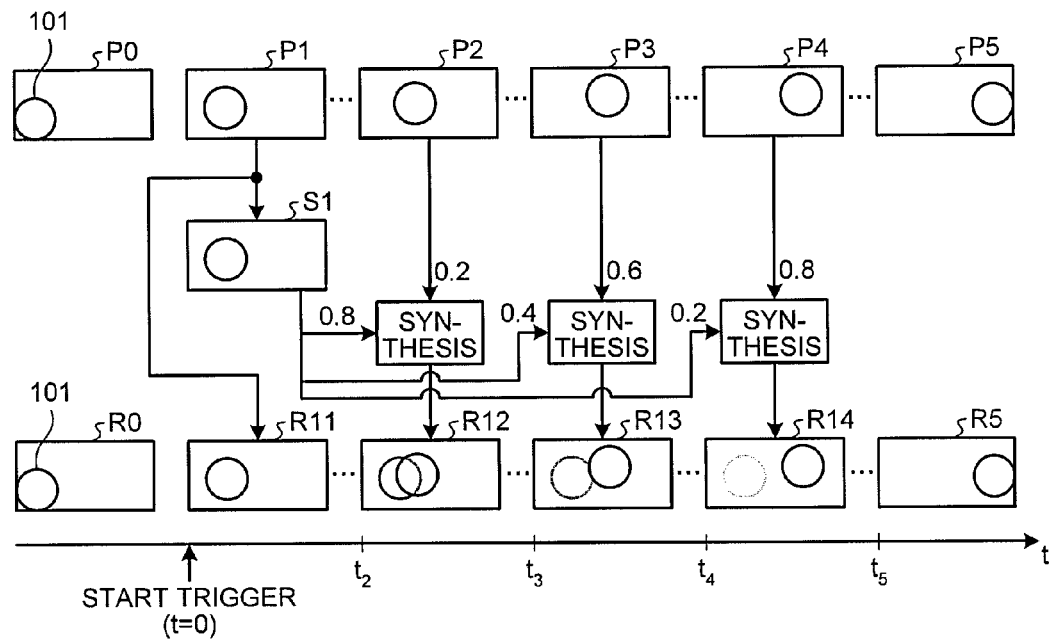
FIG. 5 is a diagram for describing an outline of a one-shot echo.

FIG. 5 is a diagram for describing an outline of a one-shot echo. The one-shot echo refers to an effect by which an image (a momentary image) of a certain frame steadily disappears while becoming thinner. Specifically, an effect by which the ball 101 captured at a certain time remains on a captured image as an afterimage for a while as illustrated in FIG. 5 is given.

Here, in a state in which the one-shot echo remains set as the moving image special effect, when the start trigger is received, the moving image special effect image processing unit 163 performs processing (one-shot echo processing) of storing image data, which has been captured directly after that and recorded, in the SDRAM 25 and then synthesizing the image data with image data captured after that such that a weight steadily decreases over time.

In the example illustrated in FIG. 5, a captured image P1 captured directly after the start trigger is input is stored in the SDRAM 25 (hereinafter, referred to as an "SDRAM image S1"). The moving image special effect image processing unit 163 synthesizes the SDRAM image S1 stored in the SDRAM 25 with a most recently captured image at a predetermined ratio.

In the example illustrated in FIG. 5, a one-shot echo image R11 corresponding to the captured image P1 is displayed directly after the start trigger is input.

Thereafter, when a time t is $t_2$, the moving image special effect image processing unit 163 generates a one-shot echo image R12 by synthesizing the SDRAM image S1 with a captured image P2. At the time of this synthesis, in each pixel, a signal of the SDRAM image S1 is multiplied by a coefficient a (=0.8), and a signal of the captured image P2 is multiplied by a coefficient 1−a (=0.2).

Thereafter, when the time t is $t_3$, the moving image special effect image processing unit 163 generates a one-shot echo image R13 synthesized such that the coefficient a by which a signal of the SDRAM image S1 is multiplied is set to 0.4, and the coefficient 1−a by which a signal of a captured image P3 is multiplied is set to 0.6.

Thereafter, when the time t is $t_4$, the moving image special effect image processing unit 163 generates a one-shot echo image R14 synthesized such that the coefficient a by which a signal of the SDRAM image S1 is multiplied is set to 0.2 and the coefficient 1−a by which a signal of a captured image P4 is multiplied is set to 0.8.

Thereafter, when the time t is $t_5$, the coefficient a becomes zero (0), a captured image P5 is used as a recording image R5.

Figure 6:
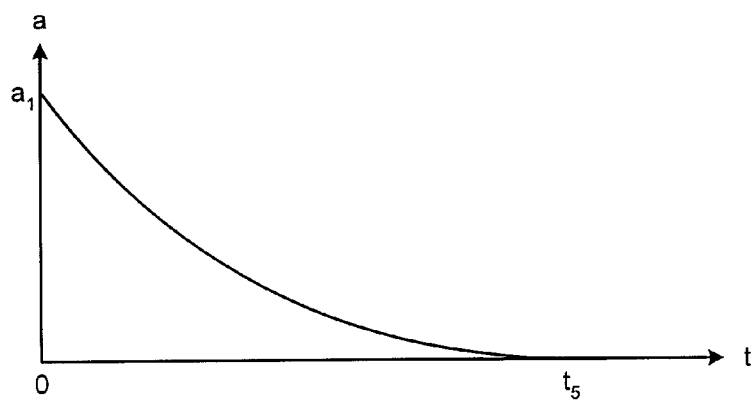
FIG. 6 is a diagram illustrating a temporal change in a coefficient of an SDRAM image to be synthesized with a most recently captured image.

FIG. 6 is a diagram illustrating a temporal change in a synthesis ratio of an SDRAM image to be synthesized with a most recently captured image. In FIG. 6, a horizontal axis t represents a time elapsed from a point in time (t=0) at which the start trigger is input, and a vertical axis a represents a coefficient by which each pixel signal of the SDRAM image S1 is multiplied. As illustrated in FIG. 6, the coefficient a becomes $a_1$ when the time t is zero (0), decreases smoothly over time, and then becomes zero (0) at a point in time at which a predetermined time $t_5$ elapses after the start trigger is input. In other words, the ratio at which the SDRAM image S1 occupies in the synthesized image is set to steadily decrease over time. Thus, an image appearing as if the SDRAM image S1 steadily disappears over time can be generated.

The curved line illustrated in FIG. 6 is merely an example, and as far as a curved line smoothly changes such that the coefficient a decreases over time and becomes zero (0) at a predetermined time, any curved line may be applied. For example, a curved line including a time period for which the coefficient a has a predetermined value may be applied.

Further, the coefficient a may be decided according to the number of frames after the start trigger is input. In this case, it is preferable that a value of the coefficient a steadily decrease in units of frames, and then the coefficient become zero (0) at a predetermined number of frames (for example, 120 frames).

Figure 7:
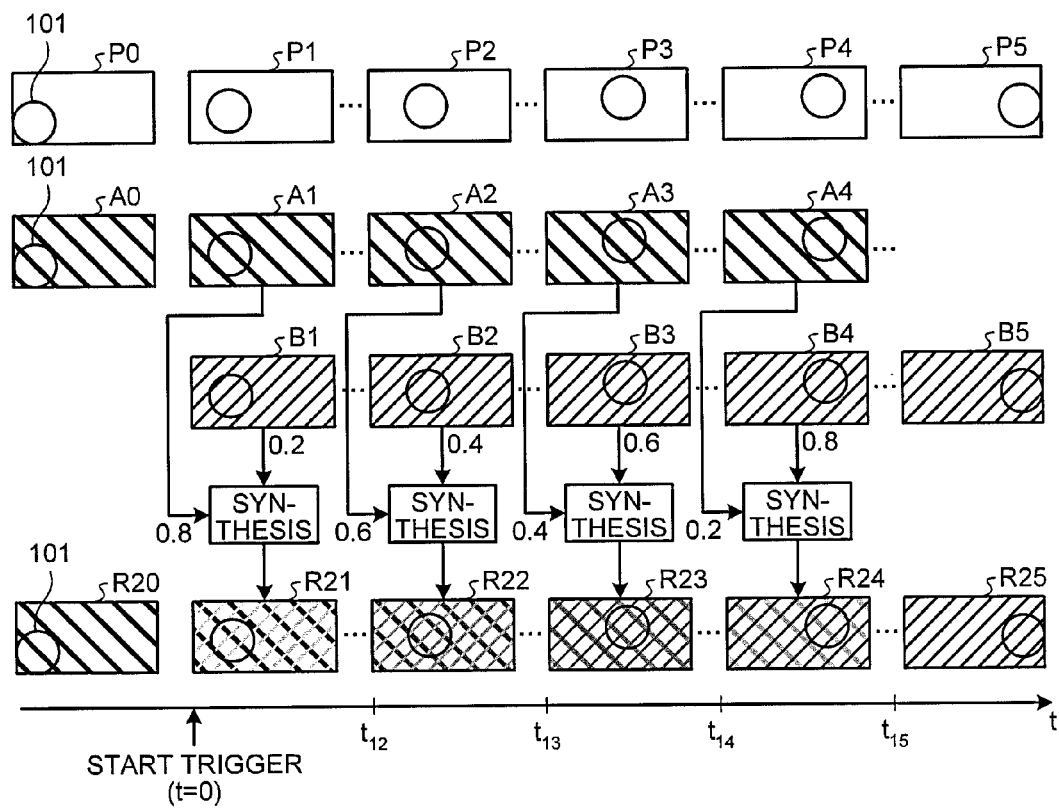
FIG. 7 is a diagram for describing an outline of a transit.

FIG. 7 is a diagram for describing an outline of a transit. The transit refers to an effect by which an artistic effect to be applied to one image changes to another artistic effect while steadily changing a ratio thereof. FIG. 7 schematically illustrates the transit that changes from an artistic effect A to an artistic effect B. In FIG. 7, directly before a start trigger for the transit is input, an artistic effect image A0 in which the artistic effect A is applied to a captured image P0 is generated. A time taken from a switching start of an artistic effect by the transit to a switching end may be arbitrarily set.

In the example illustrated in FIG. 7, the artistic effect A is assumed to be set before the start trigger is input. In other words, it is assumed that directly before the start trigger is input, the artistic effect image processing unit 162 has generated an artistic effect image R20 in which the artistic effect A is applied to the captured image P0.

Then, when the start trigger is input, the moving image special effect image processing unit 163 generates a transit image R21 such that an image in which an artistic effect image A1 (a first artistic effect image) obtained by applying the artistic effect A to a captured image P1 is multiplied by a coefficient b (=$b_0$) of 0.8 is synthesized with an image in which an the artistic effect image B1 (a second artistic effect image) obtained by applying the artistic effect B to the captured image P1 is multiplied by a coefficient 1−b (=1−$b_0$) of 0.2.

Thereafter, when the time t is $t_{12}$, the moving image special effect image processing unit 163 generates a transit image R22 synthesized such that the coefficient b by which a signal of an artistic effect image A2 obtained by applying the artistic effect A to a captured image P2 is multiplied is set to 0.6, and the coefficient 1-b by which a signal of an artistic effect image B2 obtained by applying the artistic effect B to the captured image P2 is multiplied is set to 0.4.

Thereafter, when the time t is $t_{13}$, the moving image special effect image processing unit 163 generates a transit image R23 synthesized such that the coefficient b by which a signal of an artistic effect image A3 obtained by applying the artistic effect A to a captured image P3 is multiplied is set to 0.4, and the coefficient 1−b by which a signal of an artistic effect image B3 obtained by applying the artistic effect B to the captured image P3 is multiplied is set to 0.6.

Thereafter, when the time t is $t_{14}$, the moving image special effect image processing unit 163 generates a transit image R24 synthesized such that the coefficient b by which a signal of an artistic effect image A4 obtained by applying the artistic effect A to a captured image P4 is multiplied is set to 0.2, and the coefficient 1−b by which a signal of an artistic effect image B4 obtained by applying the artistic effect B to the captured image P4 is multiplied is set to 0.8.

Thereafter, when the time t is $t_{15}$, the moving image special effect image processing unit 163 generates a transit image R25 in which the artistic effect B is applied to the captured image P5 (b=0).

Figure 8:
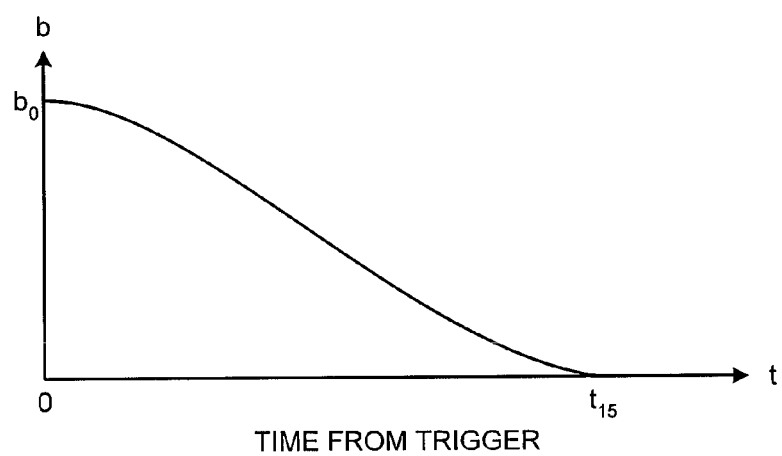
FIG. 8 is a diagram illustrating a temporal change in a coefficient of an artistic effect applied before a start trigger is input in transit processing.

FIG. 8 is a diagram illustrating a temporal change in the synthesis ratio (coefficient) b of the artistic effect applied before the start trigger is input in the transit processing. As illustrated in FIG. 8, the coefficient b is $b_0$ when the time t is zero (0), smoothly decreases over time, and then becomes zero (0) at a time in point when a predetermined time $t_{15}$ elapses after the start trigger is input.

The curved line illustrated in FIG. 8 are merely examples, and as far as a curved line smoothly changes such that the coefficient b decreases over time and becomes zero (0) at a predetermined time, any curved line may be applied. For example, a curved line including a time period for which the coefficient b has a predetermined value may be applied.

Further, the coefficient b may be decided according to the number of frames after the start trigger is input. In this case, it is preferable that a value of the coefficient b smoothly decrease in units of frames, and the coefficient become zero (0) at a predetermined number of frames (for example, 120 frames).

In the first embodiment, during transit processing, an image obtained by applying an artistic effect set directly before a start trigger is input to a captured image is used as the first artistic effect image. However, an image obtained by applying an artistic effect set directly after a start trigger is input to a captured image may be used as the first artistic effect image, or an image obtained by applying an artistic effect set at the same time as when the start trigger is input to a captured image may be used as the first artistic effect image.

Figure 9:
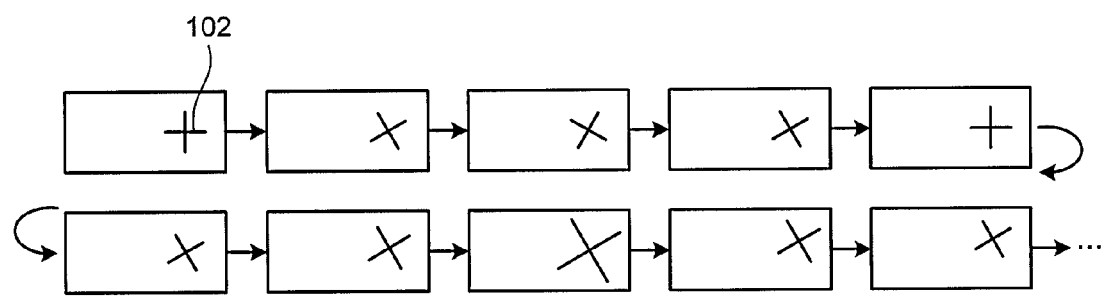
FIG. 9 is a diagram illustrating an outline of a fluctuation.

FIG. 9 is a diagram illustrating an outline of a fluctuation. The fluctuation refers to an effect obtained by randomly changing an application degree of an artistic effect to be applied to each frame of a moving image over time. FIG. 9 illustrates an example in which an artistic effect is a cross filter. In this case, the moving image special effect image processing unit 163 applies a fluctuation by randomly rotating a cross 102 over time, and randomly changing the size of the cross 102 over time.

Continuously, the configuration of the imaging device 1 will be described.

The AE processing unit 17 acquires image data recorded the SDRAM 25 through the bus 28, and sets the exposure condition used when capturing a still image or a moving image based on the acquired image data. Specifically, the AE processing unit 17 performs automatic exposure of the imaging device 1 by calculating brightness based on image data and then deciding a setting value of an aperture value (F value), a shutter speed, and the like based on the calculated brightness.

The AF processing unit 18 acquires image data recorded in the SDRAM 25 through the bus 28, and performs an automatic focal adjustment of the imaging device 1 based on the acquired image data. For example, the AF processing unit 18 performs an automatic focal adjustment of the imaging device 1 such that focus evaluation of the imaging device 1 is decided by extracting a signal of a high frequency component from image data and performing an AF (Auto Focus) calculation process on the signal of the high frequency component.

The image compressing/decompressing unit 19 acquires image data recorded in the SDRAM 25 through the bus 28, compresses the acquired image according to a predetermined format, and then outputs the compressed image data to the SDRAM 25. Here, the JPEG (Joint Photographic Experts Group) format, the Motion JPEG format, the MP4 (H.264), or the like may be used as the predetermined format. Further, the image compressing/decompressing unit 19 acquires image data (compressed image data) recorded in the recording medium 23 through the bus 28 and the memory I/F 24, decompresses the acquired image data, and then outputs the decompressed image data to the SDRAM 25. Instead of the recording medium 23, a storage unit may be disposed in the imaging device 1.

The input unit 20 includes a setting signal input unit 201 that receives an input of various kinds of setting signals including a still image capturing condition setting signal used to set a capturing condition on still image capturing and moving image capturing, and a moving image capturing signal input unit 202 that receives an input of a moving image capturing start signal instructing at least moving image capturing to start.

The input unit 20 is implemented using a user interface for an operation signal input disposed on the surface of the main body unit 2. Next, a configuration of the user interface serving as a part of the input unit 20 will be described.

As the user interface for the operation signal input, the imaging device 1 includes a power button 41 to switch a power state of the imaging device 1 to an on state or an off state, a release button 42 to receive an input of a still image release signal used to give a still image capturing instruction, a mode dial 43 to change various kinds of shooting modes set to the imaging device 1, an operation button 44 to change various kinds of settings of the imaging device 1, a menu button 45 to cause various kinds of settings of the imaging device 1 to be displayed on the display unit 21, a playback button 46 to cause an image corresponding to image data recorded in the recording medium 23 to be displayed on the display unit 21, a moving image button 47 to receive an input of a moving image release signal giving a moving image capturing instruction, a function key 48 to set various kinds of functions of the imaging device 1, an erase button 49 to erase data, and a touch panel 50 disposed to be superimposed on a display screen of the display unit 21 and used to receive an input signal corresponding to a contact position from the outside.

The release button 42 moves forward or backward by external pressure. Here, when the release button 42 is pressed halfway, a first release signal instructing a shooting preparation operation is input. On the other hand, when the release button 42 is fully pressed, a second release signal instructing still image capturing is input.

The operation button 44 includes a cross key 441 forming a cross shape in top, bottom, left, and right directions to perform a selection setting input in a menu screen or the like, and a decision button 442 to decide selection by the cross key 441. The cross key 441 includes an up-arrow key 443, a down-arrow key 444, a left-arrow key 445, and a right-arrow key 446.

In the user interface described above, the buttons other than the moving image button 47 configure a part of the setting signal input unit 201. The moving image button 47 configures a part of the moving image capturing signal input unit 202.

FIG. 10 is a diagram illustrating an example of assigning an operation to each arrow of the cross key 441 when it is not in the process of moving image recording (during moving image non-recording) and when it is in the process of moving image recording (during moving image recording). Here, when it is not in the process of moving image recording, an exposure correction operation is assigned to the up-arrow key 443. A continuous shooting/single shooting operation is assigned to the down-arrow key 444. An AF target operation is assigned to the left-arrow key 445. A flash setting operation is assigned to the right-arrow key 446.

Next, an example when it is in the process of moving image recording will be described. In this case, a one-shot echo start operation is assigned to the up-arrow key 443. A transit start operation is assigned to the down-arrow key 444. The left-arrow key 445 functions as a toggle key to alternately assign a multiecho start operation and a multiecho end operation. A fluctuation start operation is assigned to the right-arrow key 446. Further, when a setting is made such that the end of the fluctuation can be arbitrarily selected, it is desirable to cause the right-arrow key 446 to function as a toggle key to alternately operate a start operation and an end operation of the fluctuation.

An assignment of an input button at the time of moving image recording is not limited to the example illustrated in FIG. 10. For example, as illustrated in FIG. 11, an effect start operation may be assigned to the up-arrow key 443, an effect stop operation may be assigned to the down-arrow key 444, and an effect switching operation may be assigned to the left-arrow key 445 and the right-arrow key 446. In this case, set special effects are preferably displayed on the display unit 21.

Further, an operation assignment of the cross key 441 may be set according to usability or the frequency of use of an operation or may be uniquely set by the user. Further, there may be made a setting that causes another operation to be performed when both of neighboring two keys (for example, the up-arrow key 443 and the right-arrow key 446) are pressed.

The display unit 21 is configured using a liquid crystal display panel, an organic EL (Electro Luminescence) display panel, or the like. The display driving unit 22 acquires image data stored in the SDRAM 25 or image data stored in the recording medium 23 through the bus 28, and causes an image corresponding to the acquired image data to be displayed on the display unit 21. Here, examples of a display of an image include a rec-view display in which an image data directly after shooting is displayed only for a predetermined time (for example, three seconds), a playback display in which image data stored in the recording medium 23 is played back, and a live-view display in which live-view images corresponding to image data continuously generated by the imaging element 12 are sequentially displayed in time series. Further, the display unit 21 appropriately displays operation information and shooting-related information of the imaging device 1.

The recording medium 23 is configured using, for example, a memory card mounted from the outside of the imaging device 1. The recording medium 23 is removably mounted to the imaging device 1 through the memory I/F 24. Image data processed by the image processing unit 16 or the image compressing/decompressing unit 19 is written in the recording medium 23 through a reading/writing device (not illustrated) corresponding to a kind thereof, or image data recorded in the recording medium 23 is read through the reading/writing device. In addition, the recording medium 23 may output imaging program and various kinds of information to the flash memory 26 through the memory I/F 24 and the bus 28 under control of the control unit 29.

The SDRAM 25 is configured using a volatile memory. The SDRAM 25 has a function as a primary storage unit that temporarily stores image data input from the A/D converting unit 15 through the bus 28, processed image data input from the image processing unit 16, and information which is being processed by the imaging device 1. For example, the SDRAM 25 temporarily stores image data sequentially output in units of frames from the imaging element 12 through the signal processing unit 14, the A/D converting unit 15, and the bus 28.

The flash memory 26 is configured using a non-volatile memory. The flash memory 26 includes a program recording unit 261, a special effect processing information recording unit 262, and an image processing information recording unit 263. The program recording unit 261 records various kinds of programs for operating the imaging device 1, an imaging program, various kinds of data used during execution of a program, various kinds of parameters necessary for an image processing operation by the image processing unit 16, and the like. The special effect processing information recording unit 262 records image processing combination information in each artistic effect image processing performed by the artistic effect image processing unit 162. The image processing information recording unit 263 records image processing information in which a processing time is associated with image processing executable by the image processing unit 16. In addition, the flash memory 26 records a manufacturing number specifying the imaging device 1 and the like.

The main body communication unit 27 is a communication interface for performing communication with the lens unit 3 mounted to the main body unit 2. The main body communication unit 27 also includes an electrical contact point with the lens unit 3.

The bus 28 is configured using, for example, a transmission path connecting the respective components of the imaging device 1. The bus 28 transfers various kinds of data internally generated in the imaging device 1 to the respective components of the imaging device 1.

The control unit 29 is configured using a CPU (Central Processing Unit) or the like. The control unit 29 includes an image processing control unit 291 and a display control unit 292.

The image processing control unit 291 sets content of image processing to be executed by the image processing unit 16 in response to an instruction signal from the input unit 20, which is input through the bus 28, and causes any one of the basic image processing unit 161, the artistic effect image processing unit 162, and the moving image special effect image processing unit 163 to execute image processing according to the set content.

The display control unit 292 controls a display form of the display unit 21. Specifically, the display control unit 292 drives the display driving unit 22, and causes an image corresponding to various kinds of image data processed by the image processing unit 16 to be displayed on the display unit 21.

The control unit 29 controls an operation of the imaging device 1 in general by transmitting a control signal or various kinds of data to the respective components configuring the imaging device 1 in response to an instruction signal transmitted from the input unit 20 through the bus 28.

Here, when the second release signal is input through the release button 42, the control unit 29 performs control such that the imaging device 1 starts a still image capturing operation. Further, when the moving image capturing start signal is input through the moving image button 47, the control unit 29 performs control such that the imaging device 1 starts a moving image capturing operation. Here, the image capturing operation in the imaging device 1 refers to an operation in which the signal processing unit 14, the A/D converting unit 15, and the image processing unit 16 execute predetermined processing on image data which the imaging element 12 has output according to driving of the shutter driving unit 11 and the imaging element driving unit 13. The image data processed in the above-described way is compressed according to a predetermined format through the image compressing/decompressing unit 19, and then recorded in the recording medium 23 through the bus 28 and the memory I/F 24 under control of the image processing control unit 291. In the first embodiment, the recording medium 23 serves a part of the storage unit. However, separately from the recording medium 23, a storage area having a function of a storage unit is secured inside the imaging device 1, and compressed image data may be stored in the storage area.

The main body unit 2 having the above-described configuration may further include an audio input/output unit, a fill light emitting unit that emits a fill light (flash) to a subject, a communication unit having a function of performing two-way communication with an external device through the Internet, and the like.

Next, a configuration of the lens unit 3 will be described. The lens unit 3 includes an optical system 31, a lens driving unit 32, a diaphragm 33, a diaphragm driving unit 34, a lens operating unit 35, a lens flash memory 36, a lens communication unit 37, and a lens control unit 38.

The optical system 31 is configured using one or more lenses. The optical system 31 condenses light from a predetermined field region. The optical system 31 has an optical zoom function of changing an angle of view and a focus function of changing a focus.

The lens driving unit 32 is configured using a direct current (DC) motor, a stepping motor, or the like, and changes, for example, a focus position or an angle of view of the optical system 31 by moving a lens of the optical system 31 on an optical axis L.

The diaphragm 33 adjusts exposure by limiting an amount of incident light condensed by the optical system 31.

The diaphragm driving unit 34 is configured using a stepping motor or the like, and drives the diaphragm 33.

The lens operating unit 35 is a ring disposed around a lens barrel of the lens unit 3 as illustrated in FIG. 2, and receives an input of an operation signal to start an optical zoom operation in the lens unit 3 or an input of an instruction signal instructing a focus position adjustment in the lens unit 3. The lens operating unit 35 may be a push-type switch or the like.

The lens flash memory 36 records a control program that decides the position and movement of the optical system 31, lens characteristics of the optical system 31, and various kinds of parameters.

The lens communication unit 37 is a communication interface that performs communication with the main body communication unit 27 of the main body unit 2 when the lens unit 3 is mounted to the main body unit 2. The lens communication unit 37 also includes an electrical contact point with the main body unit 2.

The lens control unit 38 is configured using a CPU (Central Processing Unit) or the like. The lens control unit 38 controls an operation of the lens unit 3 in response to an operation signal of the lens operating unit 35 or an instruction signal from the main body unit 2. Specifically, in response to the operation signal of the lens operating unit 35, the lens control unit 38 drives the lens driving unit 32 to perform a focusing operation or a zoom change operation of the lens unit 3, and drives the diaphragm driving unit 34 to change an aperture value. Further, the lens control unit 38 may be configured to transmit focus position information of the lens unit 3, a focus distance, specific information identifying the lens unit 3, and the like to the main body unit 2 when the lens unit 3 is mounted to the main body unit 2.

Figure 12:
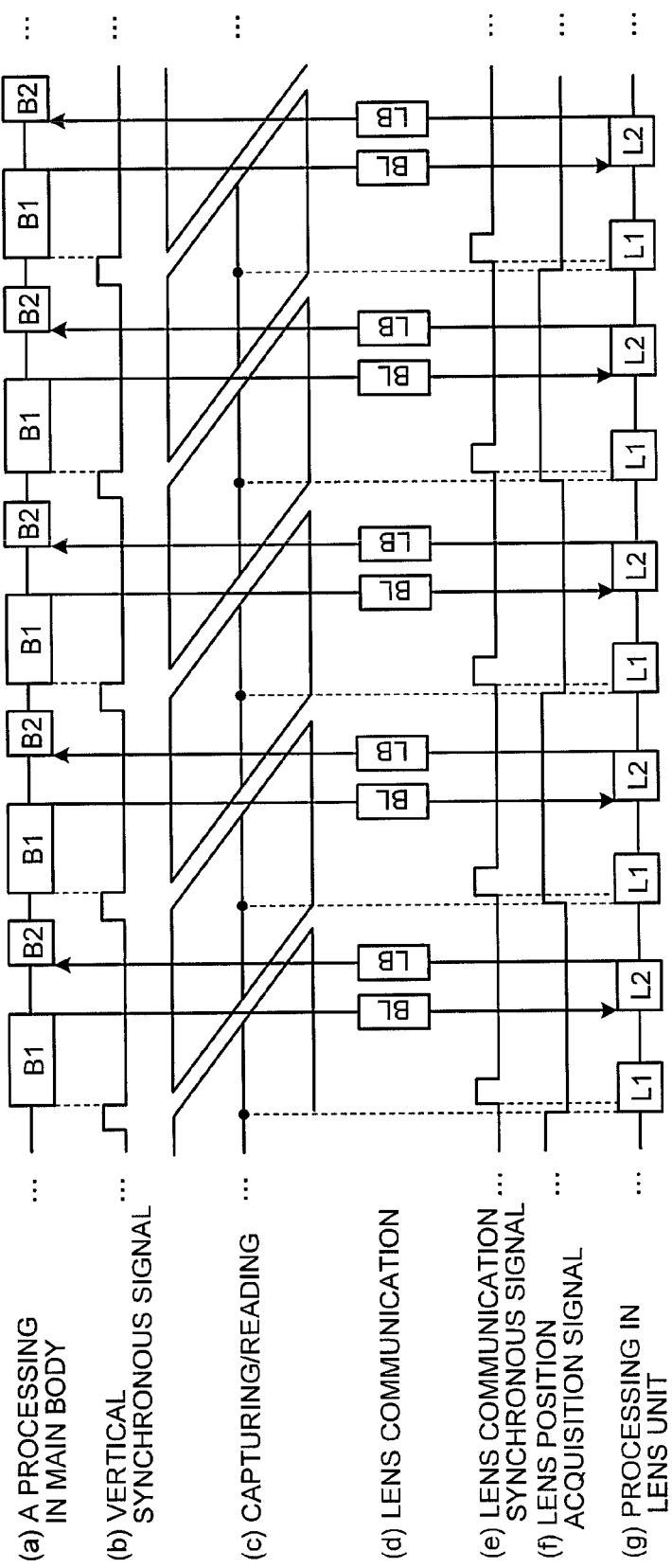
FIG. 12 is a timing chart illustrating an example of synchronous communication between a lens control unit and a control unit of the imaging device according to the first embodiment of the present invention.

The lens control unit 38 promotes operation cooperation with the main body unit 2 by exchanging a lens communication signal with the control unit 29 of the main body unit 2 at a predetermined period. FIG. 12 is a timing chart illustrating an example of synchronous communication between the lens control unit 38 and the control unit 29. FIG. 12(*a*) illustrates processing performed inside the main body unit 2. FIG. 12(*b*) illustrates a vertical synchronous signal. FIG. 12(*c*) illustrates an imaging timing and a reading timing. FIG. 12(*d*) illustrates lens communication. FIG. 12(*e*) illustrates a lens communication synchronous signal. FIG. 12(*f*) illustrates a lens position acquisition signal. FIG. 12(*g*) illustrates processing performed inside the lens unit 3.

First, the control unit 29 causes the image processing unit 16 to execute image processing and a calculation of an AF evaluation value of live-view image based on image data acquired in a previous frame, and transmits a lens state data request command used to acquire lens state data to the lens control unit 38 (B1 and BL). At this time, the control unit 29 transmits a synchronous signal for lens communication and a lens position acquisition signal instructing a timing to acquire position information of the optical system 31 at the same period as the vertical synchronous signal in a synchronous communication mode. The lens position acquisition signal is a signal whose state changes at a point in time at which half an accumulation time of a central portion of the imaging element 12 elapses as illustrated in FIG. 12(*c*).

The lens control unit 38 acquires position information of the optical system 31 at a timing at which the state of the lens position acquisition signal changes, and detects an operation state of the lens operating unit 35 at a reception timing of the lens communication synchronous signal (L1).

Next, the lens control unit 38 transmits lens state data including the position information of the optical system 31 and the detection state of the lens operating unit 35 which are acquired in the process L1 to the control unit 29 in response to the lens state data request command received from the control unit 29 (L2).

Thereafter, the control unit 29 performs a calculation of the AF evaluation value and various kinds of setting changes such as an exposure value change based on the lens state data transmitted from the lens control unit 38 (B2).

The control unit 29 and the lens control unit 38 repeatedly perform the above-described processing at regular intervals.

Figure 13A:
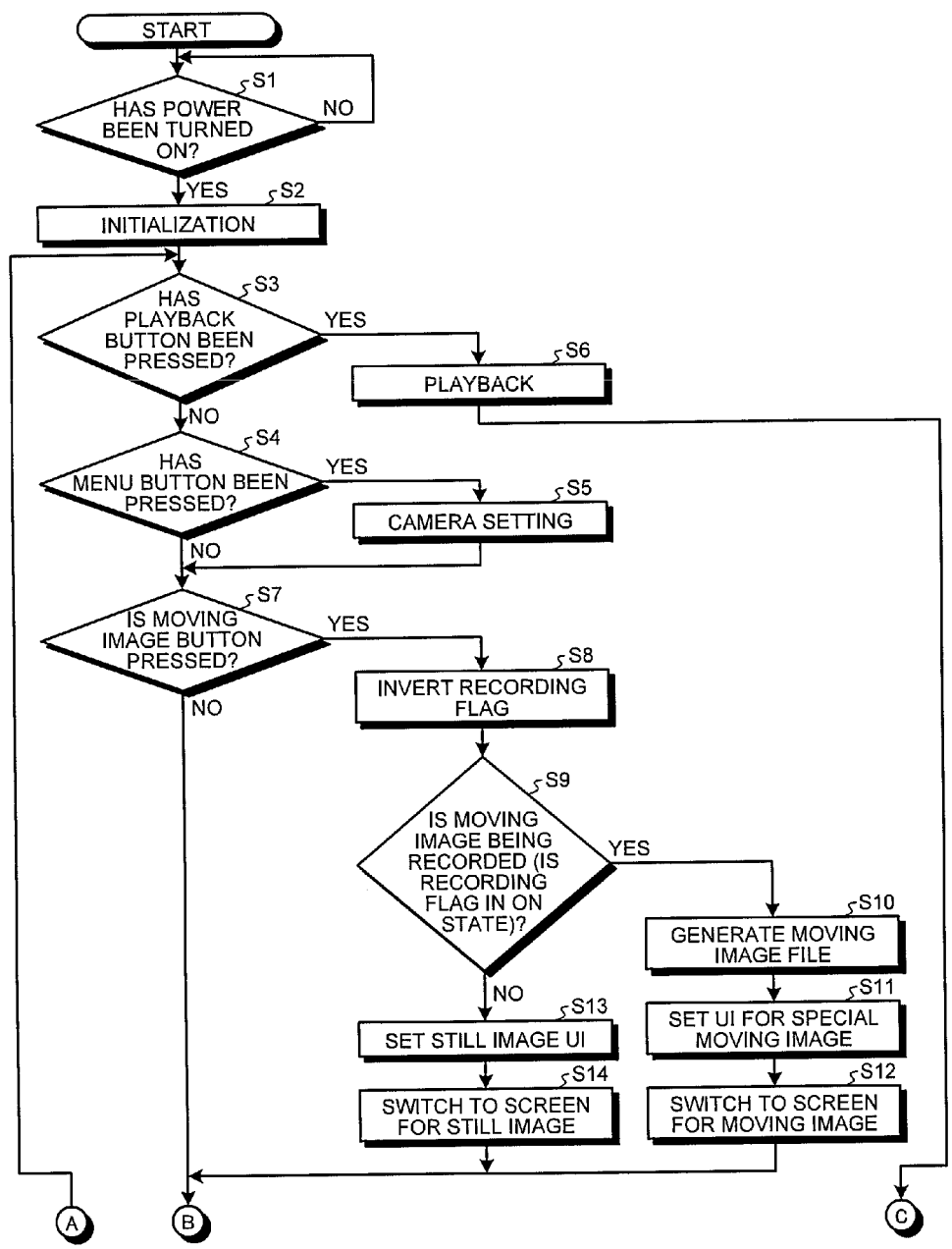
FIGS. 13A and 13B are flowcharts illustrating an outline of processing performed by the imaging device according to the first embodiment of the present invention.
Figure 13B:
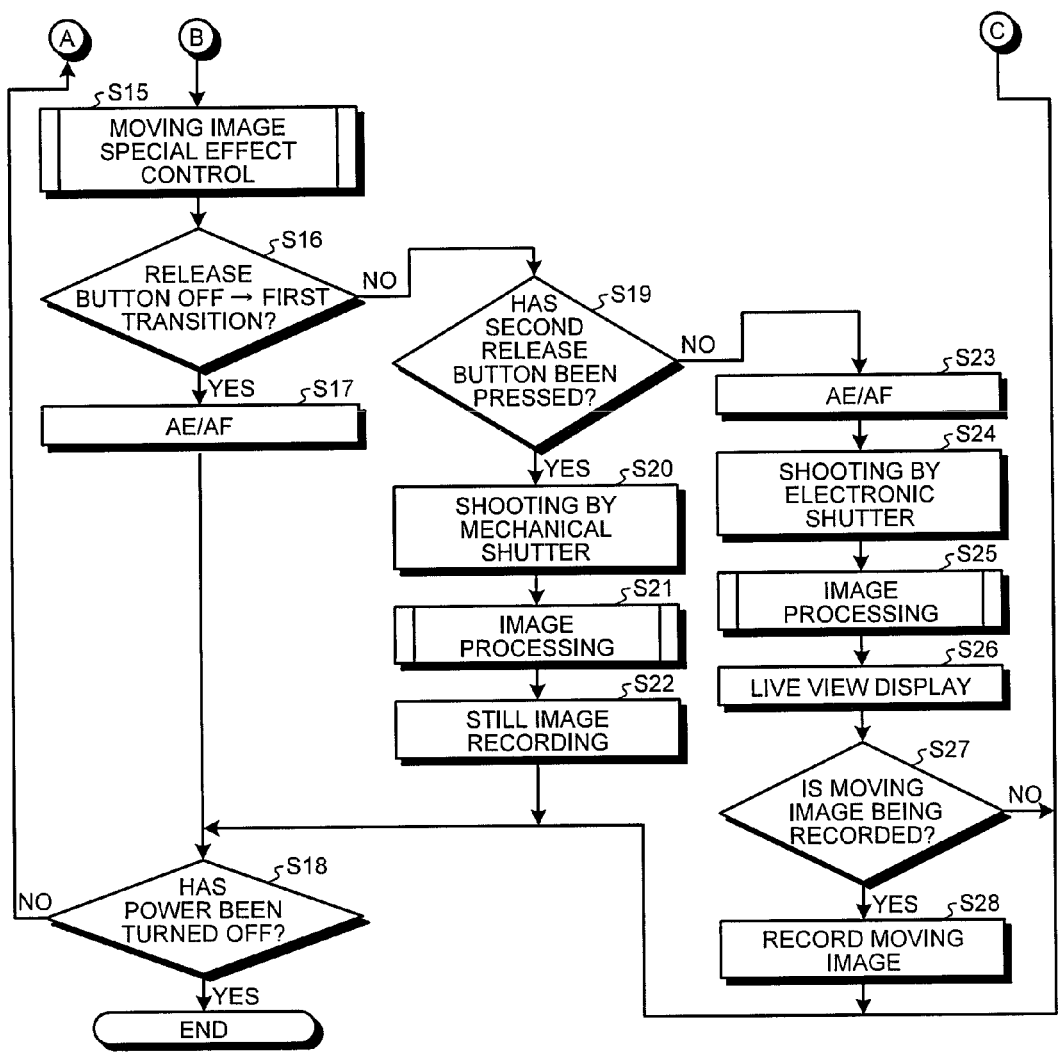

FIGS. 13A and 13B are flowcharts illustrating an outline of processing performed by the imaging device 1 including the above-described configuration. Referring to FIGS. 13A and 13B, first, when the user operates the power button 41 to turn power of the imaging device 1 on (Yes in step S1), the control unit 29 initializes the imaging device 1 (step S2). In this initialization processing, for example, the control unit 29 performs processing of resetting a recording flag representing that a moving image is being recorded to an off state, resetting a special effect flag representing the application related to a special effect in a moving image to an off state, and starting lens communication (see FIG. 12) with the lens control unit 38. However, when power of the imaging device 1 is not turned on (No in step S1), the imaging device 1 repeats step S1.

Next, when the playback button 46 is not operated (No in step S3) and the menu button 45 is operated (Yes in step S4), the imaging device 1 displays a display screen used to change a setting, and executes setting processing of setting various kinds of conditions of the imaging device 1 in response to the user's selection operation (step S5). After step S5, the imaging device 1 causes the process to proceed to step S7 which will be described later.

Here, examples of content to be set includes finish effect processing, artistic effect image processing, a still image recording mode, a moving image recording mode, and moving image special effect processing. For example, the finish effect processing includes natural processing which is processing of finishing an image in a natural tone, vivid processing which is processing of finishing an image vividly, flat processing which is processing of finishing with the emphasis on a material property of a subject, and monotone processing which is processing of finishing an image in a monochrome tone. Examples of the still image recording mode includes a JPEG recording mode, a JPEG+RAW recording mode, and a RAW recording mode depending on the type of still image of a recording target. The moving image capturing mode is a mode decided according to a moving image compression format, and includes, for example, a Motion-JPEG mode and an MP4 (H.264) mode. For example, a switching destination of an artistic effect by transit processing, a fluctuation, and the like are set through the moving image special effect processing.

Here, when the playback button 46 is operated in step S3 (Yes in step S3), the imaging device 1 performs playback processing (step S6). In step S6, the display control unit 292 causes a list of files recorded in the recording medium 23 to be displayed on the display unit 21. Thereafter, when a playback image is selected and input through the input unit 20, image data is acquired from the recording medium 23, the acquired image data is decompressed through the image compressing/decompressing unit 19, and then displayed on the display unit 21. Thereafter, the imaging device 1 causes the process to proceed to step S18.

Here, when the playback button 46 is not operated in step S3 (No in step S3), the menu button 45 is not operated (No in step S4), and the moving image button 47 is operated (Yes in step S7), the control unit 29 inverts the recording flag representing that a moving image is being recorded (step S8). Specifically, for example, when the recording flag is in the on state, the control unit 29 sets the recording flag to the off state.

Next, the control unit 29 determines whether or not the recording flag recorded in the SDRAM 25 is in the on state (step S9). Here, when it is determined that the recording flag is in the on state (Yes in step S9), the control unit 29 generates a moving image file used to record image data in the recording medium 23 in time series and stores the moving image file in the recording medium 23 (step S10).

Thereafter, the control unit 29 sets a user interface (UI) for a special moving image (step S11). Through this setting, for example, an assignment at the time of moving image recording illustrated in FIG. 10 is executed. The control unit 29 recognizes a signal subsequently received by the user interface which is the setting target in step S11 as a signal for a special moving image based on FIG. 10.

Next, the display control unit 292 changes, for example, a setting of an on-screen display (OSD) to be displayed on the display unit 21 and performs switching to a screen for a moving image (step S12). Specifically, for example, the display control unit 292 displays a remaining time, an icon representing that a special effect can be applied during moving image capturing, and the like. Thereafter, the imaging device 1 causes the process to proceed to step S15 which will be described later.

Figure 14:
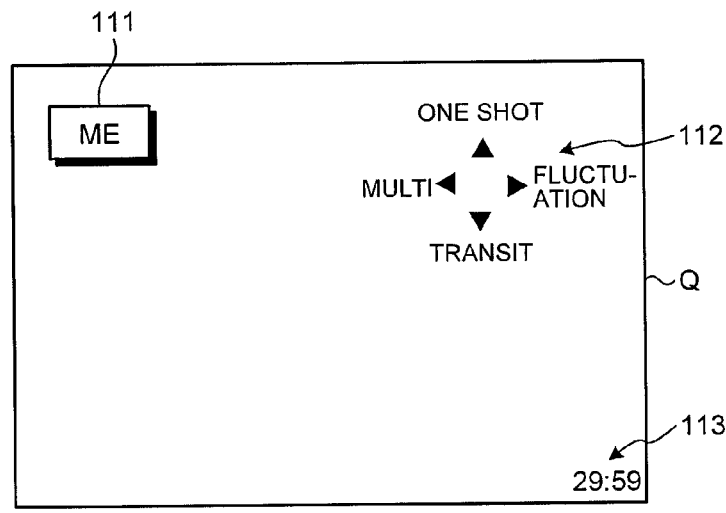
FIG. 14 is a diagram illustrating a screen display example for a moving image in a display unit of the imaging device according to the first embodiment of the present invention.

FIG. 14 is a diagram illustrating a screen display example for a moving image in the display unit 21. As illustrated in FIG. 14, a moving image icon 111 representing that a moving image special effect can be applied, a on screen display 112 representing a screen key assignment for a moving image, and a remaining time 113 displaying a remaining time of moving image capturing are displayed on a screen Q for a moving image. Of these, the on screen display 112 may be displayed for several seconds and then automatically disappeared or may be constantly displayed. Further, the on screen display 112 may be displayed or hidden according to an input from the setting signal input unit 201.

Here, when it is determined in step S9 that the recording flag is in the off state (No in step S9), the control unit 29 sets a user interface for a still image (step S13).

Next, the display control unit 292 switches a setting of the on screen display in the display unit 21 to a setting for a still image (step S14). Through this switching, for example, the display unit 21 displays the number of remaining records, an icon representing that a special effect can be applied during still image capturing, and the like. Thereafter, the imaging device 1 causes the process to proceed to step S15 which will be described later.

Meanwhile, when the moving image button 47 is not operated in step S7 (No in step S7), the image processing control unit 291 causes the moving image special effect image processing unit 163 to perform moving image special effect processing (step S15).

Figure 15:
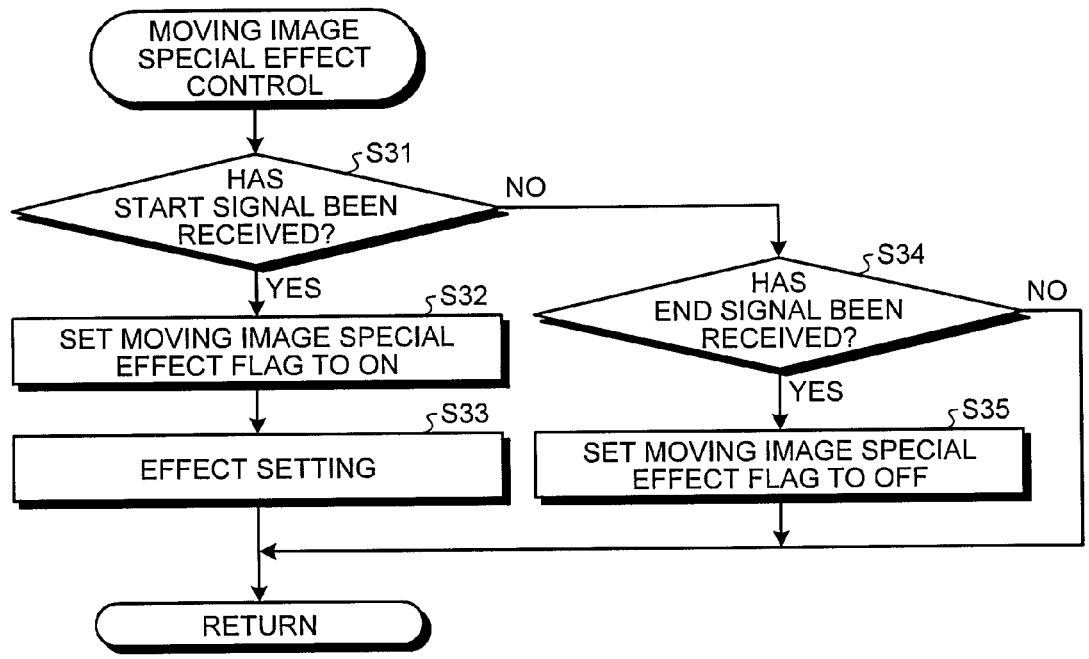
FIG. 15 is a flowchart illustrating an outline of moving image special effect processing performed by the imaging device according to the first embodiment of the present invention.

FIG. 15 is a flowchart illustrating an outline of moving image special effect processing. Referring to FIG. 15, when a key used to start a moving image special effect is operated (Yes in step S31), the image processing control unit 291 sets a moving image special effect flag to an on state (step S32). Thereafter, the image processing control unit 291 performs effect setting (step S33).

However, when a key used to start a moving image special effect is not operated (No in step S31) and then an end instruction is input (Yes in step S34), the image processing control unit 291 performs control such that the moving image special effect flag is set to an off state (step S35). Thereafter, the imaging device 1 returns to the main routine.

On the other hand, when a key used to start a moving image special effect is not operated (No in step S31) and then an end instruction is not input (No in step S34), the imaging device 1 returns to the main routine.

After moving image special effect processing of step S15, when the first release signal is input from the release button 42 (Yes in step S16), the control unit 29 causes the AE processing unit 17 to execute AE processing of adjusting exposure, and causes the AF processing unit 18 to execute AF processing of adjusting a focus (step S17).

Next, the control unit 29 determines whether or not power of the imaging device 1 has been turned off by an operation on the power button 41 (step S18). Here, when the control unit 29 determines that power of the imaging device 1 has been turned off (Yes in step S18), the imaging device 1 ends the current process. However, when the control unit 29 determines that power of the imaging device 1 has not been turned off (No in step S18), the imaging device 1 causes the process to return to step S3.

Meanwhile, when the first release signal is not input from the release button 42 (No in step S16) and the second release signal is input from the release button 42 (Yes in step S19), the control unit 29 drives the shutter driving unit 11 and the imaging element driving unit 13 and performs shooting by a mechanical shutter (step S20).

Next, the image processing unit 16 executes predetermined image processing on a captured still image (step S21). The details of image processing will be described later.

Thereafter, the control unit 29 compresses image data in a JPEG format through the image compressing/decompressing unit 19, and records the compressed image data in the recording medium 23 (step S22). In step S22, the control unit 29 may record the image data compressed in the JPEG format through the image compressing/decompressing unit 19 in the recording medium 23 in association with RAW data which has not been subjected to image processing by the image processing unit 16. After step S22, the imaging device 1 causes the process to proceed to step S18.

Meanwhile, when the second release signal is not input from the release button 42 in step S19 (step S19: No), the control unit 29 causes the AE processing unit 17 to execute AE processing of adjusting exposure, and causes the AF processing unit 18 to execute AF processing of adjusting a focus (step S23).

Next, the control unit 29 drives the imaging element driving unit 13 and performs shooting by an electronic shutter (step S24).

Thereafter, the image processing unit 16 performs image processing based on setting information of the imaging device 1 (step S25). The details of image processing will be described later.

The display control unit 292 causes live-view image corresponding to the image data processed by the image processing unit 16 to be displayed on the display unit 21 (step S26).

Next, when the imaging device 1 is in the process of moving image recording (Yes in step S27), the control unit 29 compresses image data through the image compressing/decompressing unit 19, and records the compressed image data in a moving image file created in the recording medium 23 as a moving image (step S28). Thereafter, the imaging device 1 causes the process to proceed to step S18. However, when the imaging device 1 is not in the process of moving image recording in step S27 (No in step S27), the imaging device 1 causes the process to proceed to step S18.

FIG. 16 is a flowchart illustrating an outline of image processing. Referring to FIG. 16, the basic image processing unit 161 performs basic image processing (step S41). Here, the basic image processing includes processing such as subtraction of an OB (Optical Black) value, WB correction, synchronization, a color matrix calculation, gamma conversion color correction, edge enhancement, and NR (Noise Reduction).

Here, the WB correction is processing of perform correction by multiplying image data of the Bayer array by an R gain and a B gain corresponding to a WB mode previously set by the user, reads the WB from a flash memory from the imaging device main body, and multiplying by the value.

The synchronization is processing of interpolating data not included in a corresponding pixel from the periphery and converting the data into data in which each pixel is configured with RGB data when the imaging element 12 has the Bayer array.

The color matrix calculation is processing of reading a color matrix coefficient corresponding to a set WB mode from the flash memory from the main body and multiplying the color matrix coefficient.

In the gamma conversion color correction processing, a gamma table previously designed according to a finish setting is read from the flash memory of the main body, and image data is subjected to gamma conversion. At this time, gamma conversion applied to RGB data may be performed such that an RGB color space is converted into a color space represented by a brightness signal Y and two color difference signals Cb and Cr, and then gamma conversion is performed only on the brightness signal Y. In addition, in order to obtain appropriate color reproducibility, color correction may be performed using a side parameter previously designated according to a finish setting. A gamma curved line may be changed according to the type of artistic effect.

In edge enhancement processing, enhancement is performed such that an edge component is extracted by a bandpass filter, multiplied by a coefficient corresponding to an edge enhancement level, and added to image data.

In NR processing, processing of reducing noise is performed such that frequency decomposition is performed on an image, and then coring processing is performed according to a frequency.

Next, the artistic effect image processing unit 162 performs artistic effect image processing (step S42). Here, processing such as cross filter, soft focus, noise addition, shading, peripheral brightness increase, and peripheral gradation are performed.

Thereafter, when the imaging device 1 performs still image capturing (Yes in step S43), the control unit 29 performs control such that a special effect (a second special effect) corresponding to a moving image special effect (a first special effect) is inhibited from being applied to image data of a still image, and causes the process to return to the main routine.

Here, the reason why a special effect corresponding to a moving image special effect is not applied when the imaging device 1 performs still image capturing will be described. In still image capturing during moving image capturing, a response speed is important. Since the number of pixels of a still image is several times larger than the number of pixels of a moving image, when a moving image special effect is applied to a still image, a restart timing of moving image capturing after still image capturing may be affected. In this regard, in the first embodiment, a moving image special effect is inhibited from being applied to a still image. Further, when a response is not affected by light flux, it can be applied to a still image.

Meanwhile, when the imaging device 1 performs moving image capturing (No in step S43), the control unit 29 determines whether or not the moving image special effect remains set (step S44). Here, when the moving image special effect remains set (Yes in step S44), the imaging device 1 causes the process to proceed to step S45. However, when the moving image special effect does not remain set (No in step S44), the imaging device 1 returns to the main routine.

Here, in a state in which it is determined in step S44 that the moving image special effect remains set (Yes in step S44), when an effect to apply is the multiecho (Yes in step S45), the moving image special effect image processing unit 163 performs multiecho processing (see FIG. 4) such that an immediately previous image processing result (previous frame) is synthesized with a current frame at a predetermined ratio (step S46). However, when a special effect to apply is not the multiecho (No in step S45), the imaging device 1 causes the process to proceed to step S47.

In step S47, the control unit 29 determines whether or not an effect to apply is the one-shot echo. Here, when an effect to apply is the one-shot echo (Yes in step S47), the moving image special effect image processing unit 163 performs synthesis processing on a release frame which is specific image data stored in the SDRAM 25 in order to obtain a one-shot echo effect (step S48). Here, in case of a first frame after the special effect flag is set to the on state, the moving image special effect image processing unit 163 performs processing of storing an image of a current frame in the SDRAM 25. However, in case of a second or later frame after the special effect flag is set to the on state, the moving image special effect image processing unit 163 performs synthesis processing of synthesizing a corresponding frame with the release frame stored in the SDRAM 25.

Meanwhile, when it is determined in step S47 that a moving image special effect to apply is not a one-shot echo (No in step S47), the imaging device 1 causes the process to proceed to step S49.

In step S49, the control unit 29 determines whether or not an effect to apply is the fluctuation. Here, when an effect to apply is the fluctuation (Yes in step S49), the moving image special effect image processing unit 163 performs processing of adding a fluctuation effect (step S50).

Here, concrete processing of the moving image special effect image processing unit 163 in step S50 will be described. The moving image special effect image processing unit 163 adds an effect of applying fluctuation to an image processing parameter in artistic effect image processing such as shading processing and cross filter processing. For example, in case of shading processing, an attenuation characteristic from the center of an image is changed over time. In case of peripheral gradation, a gradation amount or a gradation shape is changed. In case of cross filter, the length or angle of a cross pattern is changed over time. Further, chroma, contrast, or white balance may be changed over time. Further, when the fluctuation overlaps an artistic effect such shading, both may be applied, or only fluctuation may be applied.

Meanwhile, when it is determined in step S49 that an effect to apply is not the fluctuation (No in step S49), the imaging device 1 causes the process to proceed to step S51.

In step S51, the control unit 29 determines whether or not an effect to apply is the transit (step S51). Here, when an effect to apply is the transit (Yes in step S51), the basic image processing unit 161 and the artistic effect image processing unit 162 execute basic image processing and artistic effect image processing according to a finish/switching destination setting, respectively, (steps S52 and S53). Thereafter, the moving image special effect image processing unit 163 performs processing of synthesizing two images for transit processing and so generates a transit image (step S54). After step S54, the imaging device 1 returns to the main routine.

Meanwhile, when the control unit 29 determines in step S51 that an effect to apply is not the transit (No in step S51), the imaging device 1 returns to the main routine.

According to the first embodiment described above, when moving image recording starts, the setting signal input unit is switched for a moving image special effect, and the control unit recognizes that a setting signal of an moving image special effect has been input. Thus, the user can easily apply a special effect to a moving image by performing a simple operation at the time of shooting.

Further, according to the first embodiment, the user interface configuring a setting signal input unit can be provided with both an input function for a moving image and an input function for a still image. Thus, the user interface having excellent operability even during moving image capturing can be implemented. In addition, since the number of user interfaces can be suppressed, a limitation to the layout can be reduced, and an imaging device suitable for miniaturization can be implemented.

Further, according to the first embodiment, a special effect equivalent to an effect which can be implemented on editing devices or personal computers (PCs) can be implemented by an imaging device. Thus, a moving image in which the user's shooting intention is reflected can be generated without requiring a high level of expertise and performing post editing.

Further, according to the first embodiment, control is performed such that a moving image special effect is inhibited from being applied to a still image during moving image capturing, and thus influence on a restart timing of moving image capturing after still image capturing can be prevented.

Generally, imaging devices are smaller in memory capacity and processing capability than personal computers (PCs), and thus it is difficult to implement moving image data editing processing equivalently of PCs or the like. Further, in an imaging device capable of performing still image capturing during moving image capturing or performing still image capturing directly after moving image capturing ends, a memory shortage or a memory management problem is decisive, and there may occur a problem in that the cost increase due to memory addition, responsiveness during still image capturing is lowered, and a still image quality deteriorates. In this regard, in the first embodiment, implemented is a technique capable of capturing a moving image in which a photographer's shooting intension is reflected through a special effect of a temporal change over a plurality of frames at the time of shooting without editing a captured moving image.

Modified Example 1-1

FIG. 17 is a diagram illustrating an assignment of a user interface at the time of moving image recording and at the time of moving image non-recording in an imaging device according to Modified Example 1-1 of the first embodiment. In the example illustrated in FIG. 17, at the time of moving image non-recording, the AE/AF operation is assigned to the first release operation of the release button 42, the shooting operation is assigned to the second release operation of the release button 42, and the focusing operation is assigned to the lens operating unit 35. On the other hand, at the time of moving image recording, the release button 42 (the first release operation) functions as a toggle key to alternately operate an effect start operation and an effect stop operation, and an effect switching operation is assigned to the lens operating unit 35. Here, when the AF operation or the AE operation corresponding to an input from the release button 42 is performed during moving image recording, or when a still image is captured when an effect starts, a trouble may occur. In this regard, at the time of moving image recording, still image capturing is not performed.

Modified Example 1-2

FIG. 18 is a diagram illustrating an assignment of a user interface at the time of moving image recording and at the time of moving image non-recording in an imaging device according to Modified Example 1-2 of the first embodiment. In this case, at the time of moving image non-recording, the AF operation is assigned to the function key 48, and the focusing operation is assigned to the lens operating unit 35. On the other hand, at the time of moving image recording, the function key 48 functions as a toggle key to alternately operate an effect start operation and an effect stop operation, and the effect switching operation is assigned to the lens operating unit 35.

Modified Example 1-3

Figures 19, 20:
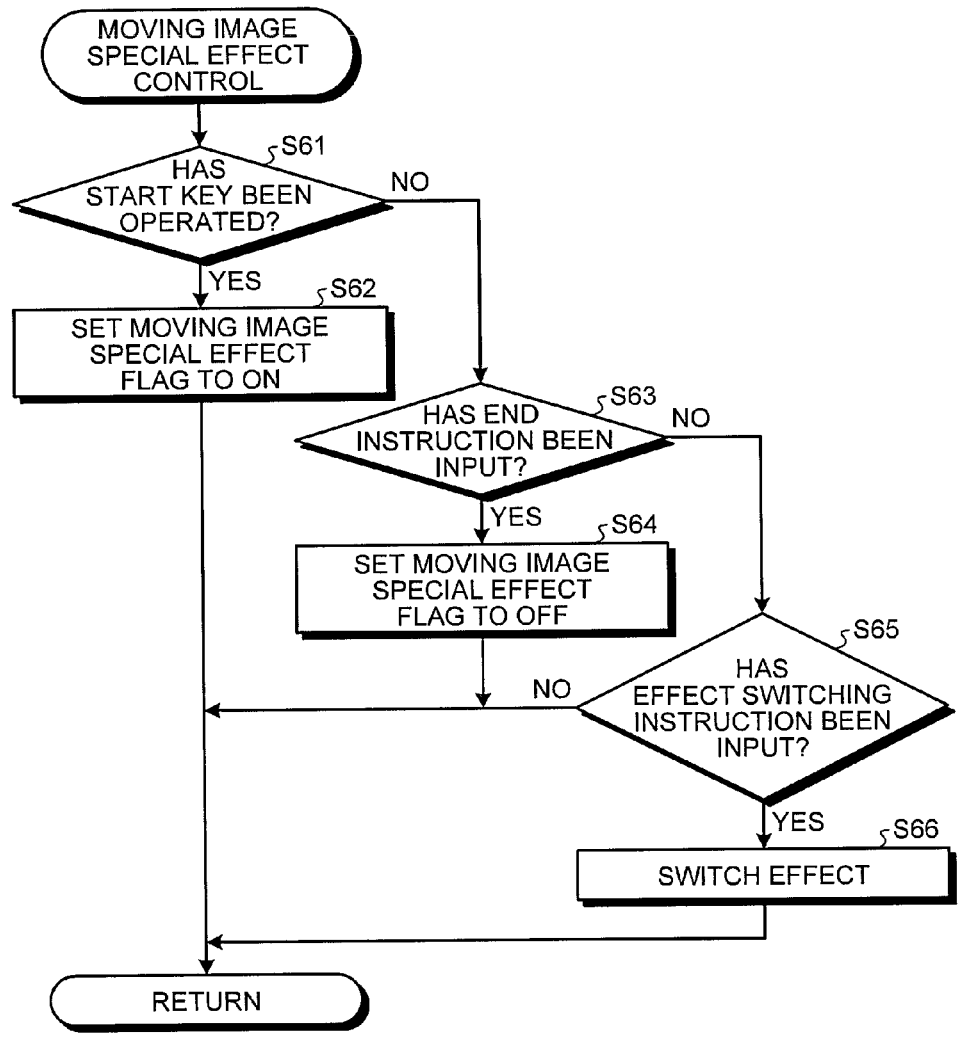
FIG. 19 is a diagram illustrating an assignment of a user interface at the time of moving image recording and at the time of moving image non-recording in an imaging device according to Modified Example 1-3 of the first embodiment of the present invention.
FIG. 20 is a flowchart illustrating an outline of moving image special effect processing performed by an imaging device according to Modified Example 1-4 of the first embodiment of the present invention.

FIG. 19 is a diagram illustrating an assignment of a user interface at the time of moving image recording and at the time of moving image non-recording in an imaging device according to Modified Example 1-3 of the first embodiment. In Modified Example 1-3, on/off switching of an effect is performed using the touch panel 50. At the time of moving image non-recording, the touch operation on the touch panel 50 is assigned to the still image capturing operation. On the other hand, at the time of moving image recording, the touch operation on the touch panel 50 is alternately assigned to the effect start operation and the effect end operation, and a horizontal slide operation on the touch panel 50 is assigned to the effect switching operation.

Using the touch panel 50 in this way, the space of the user interface can be suppressed.

Modified Example 1-4

FIG. 20 is a flowchart illustrating an outline of moving image special effect processing performed by an imaging device according to Modified Example 1-4 of the first embodiment. Referring to FIG. 20, when a key to start moving image special effect processing is operated (Yes in step S61), the image processing control unit 291 set to the moving image special effect flag to on state (step S62). Thereafter, the imaging device 1 causes the process to return to the main routine.

However, when the key to start the moving image special effect is not operated (No in step S61) and then the end instruction is input (Yes in step S63), the image processing control unit 291 performs control such that the moving image special effect flag is set to off state (step S64). Thereafter, the imaging device 1 causes the process to return to the main routine.

Further, when the key to start the moving image special effect is not operated (No in step S61), the end instruction is not input (No in step S63), and then an effect switching instruction is input (Yes in step S65), the image processing control unit 291 switches a special effect (step S66). Thereafter, the imaging device 1 causes the process to return to the main routine.

However, when it is determined in step S65 that the effect switching instruction has not been input (No in step S65), the imaging device 1 causes the process to return to the main routine.

According to Modified Examples 1-1 to 1-4 of the first embodiment described above, the same effect as in the first embodiment can be obtained.

Second Embodiment

An imaging device according to a second embodiment of the present invention is configured such that a function by which a moving image special effect is displayed through a live-view display, the user confirms a desired effect, and then shooting is performed in a state in which a special effect is applied is added to the imaging device of the first embodiment.

Figure 21:
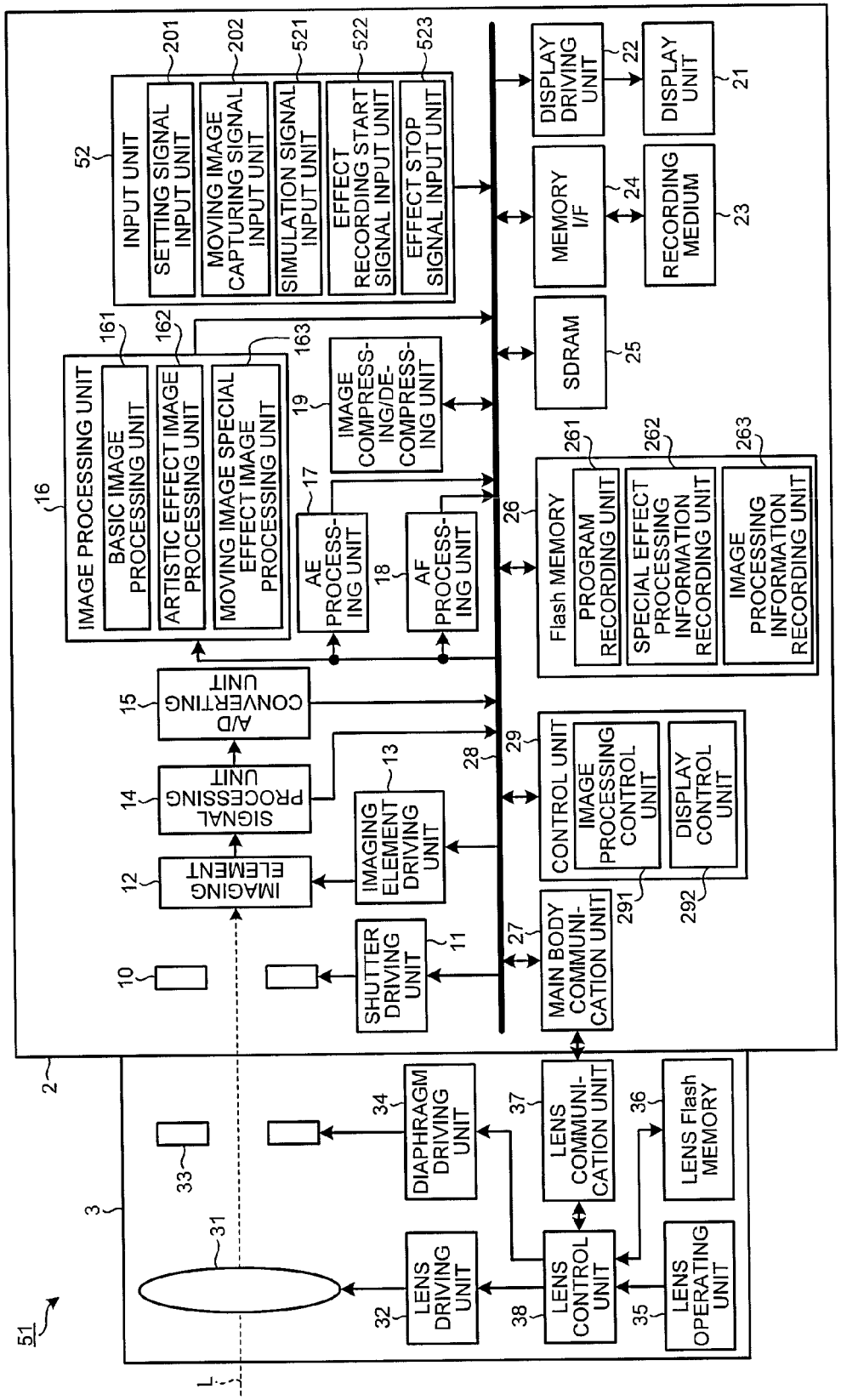
FIG. 21 is a block diagram illustrating a configuration of an imaging device according to a second embodiment of the present invention.

FIG. 21 is a block diagram illustrating a configuration of an imaging device according to the second embodiment.

An imaging device 51 illustrated in FIG. 21 has the same configuration as the imaging device 1 described in the first embodiment except for an input unit 52. A configuration of the input unit 52 will be described below.

The input unit 52 includes a simulation signal input unit 521, an effect recording start signal input unit 522, and an effect stop signal input unit 523 in addition to the setting signal input unit 201 and the moving image capturing signal input unit 202.

The simulation signal input unit 521 receives an input of a simulation signal used to apply a moving image special effect only to a live-view display. The effect recording start signal input unit 522 receives an input of an effect recording start signal used to record an image to which the moving image special effect is applied in the SDRAM 25 and the recording medium 23. The effect stop signal input unit 523 receives an input of an effect stop signal used to stop a moving image special effect applied to recording to a live-view display and an image.

FIG. 22 is a diagram illustrating an assignment of a user interface according to the second embodiment. First, an assignment at the time of moving image non-recording will be described. In this case, the exposure correction operation is assigned to the up-arrow key 443 of the cross key 441. The continuous shooting/single shooting operation is assigned to the down-arrow key 444. The AF target operation is assigned to the left-arrow key 445. The flash setting operation is assigned to the right-arrow key 446. In addition, at the time of moving image non-recording, a camera setting operation is assigned to the decision button 442, an AE/AF operation is assigned to a first release operation, and a shooting operation is assigned to a second release operation.

Next, an assignment at the time of moving image recording will be described. In this case, an effect simulation start operation is assigned to the up-arrow key 443. Thus, the up-arrow key 443 serves as a part of the simulation signal input unit 521.

An effect stop operation is assigned to the down-arrow key 444. Thus, the down-arrow key 444 serves as a part of the effect stop signal input unit 523. Among the moving image special effects, the multiecho and the fluctuation need a stop instruction.

An effect switching operation is assigned to the left-arrow key 445 and the right-arrow key 446.

An effect recording start function is assigned to the decision button 442, and the first release operation and the second release operation of the release button 42. Thus, the decision button 442 and the release button 42 serve as a part of the effect recording start signal input unit 522.

FIG. 23 is a diagram illustrating an outline of a state transition of the imaging device 51 at the time of moving image recording. Here, when the simulation signal is input through the simulation signal input unit 521 in a state (state I) in which a moving image special effect does not remain set to a live-view display and a moving image recording display after moving image recording starts, the image processing control unit 291 transitions to a state II in which control is performed such that a moving image special effect is applied to a live-view display, and a moving image special effect is not applied during moving image recording.

Then, when the effect recording start signal is input through the effect recording start signal input unit 522 in the state II, the image processing control unit 291 starts to apply a moving image special effect even to an image to be recorded in the SDRAM 25 as well as a live-view display (state III).

Then, when the effect stop signal is input through the effect stop signal input unit 523 in the state III, the image processing control unit 291 stops applying a moving image special effect to a live-view display and moving image recording. This causes the imaging device 1 to transit to the state I.

According to the second embodiment of the present invention described above, since the imaging device includes the simulation signal input unit, the effect start signal input unit, and the effect stop signal input unit, the user can apply a special effect as a trial before recording a moving image and check the effect on the screen. Thus, the user can easily shoot a more creative moving image to which an effect expected at an intended timing is applied.

Further, in the second embodiment, recording of an image to which a moving image special effect is applied starts at a point in time at which an input of the effect recording start signal is received. However, when another operation is not made until a predetermined time elapses after an input of the simulation signal is received, recording of an image to which a moving image special effect is applied may automatically start.

Modified Example 2-1

FIG. 24 is a diagram illustrating an assignment of a user interface at the time of moving image recording and at the time of moving image non-recording in an imaging device according to Modified Example 2-1 of the second embodiment. Referring to FIG. 24, an assignment at the time of moving image non-recording is the same as the example illustrated in FIG. 22. An assignment at the time of moving image recording will be described below. A one-shot echo start function is assigned to the up-arrow key 443. A transit effect start function is assigned to the down-arrow key 444. A multi-echo effect simulation start function is assigned to the left-arrow key 445. A fluctuation effect simulation start function is assigned to the right-arrow key 446. An effect recording start function and an effect stop function are assigned to the decision button 442 and the first release operation and the second release operation of the release button 42.

Thus, in Modified Example 2-1, the left-arrow key 445 and the right-arrow key 446 serve as a part of the simulation signal input unit 521. Further, in Modified Example 2-1, the decision button 442 and the release button 42 serve as parts of the effect recording start signal input unit 522 and the effect stop signal input unit 523.

Modified Example 2-2

In Modified Example 2-2 of the second embodiment, an application state of the moving image special effect is changed through the touch panel 50. FIG. 25 is a diagram illustrating a screen display example in the display unit 21 when the imaging device 51 is in the still image capturing standby state. A shooting mode icon I1 (displayed as "P") is displayed on the upper left of the screen Q1. Further, the still image capturing menu selection icon I2 (displayed as "STILL MENU") and a moving image capturing menu selection icon I3 (displayed as "MOVIE MENU") are displayed on the upper right of the screen Q1. In the following, when a portion of the touch panel 50 corresponding to an icon display region is touched, an expression "icon is selected" may be used.

Here, when the menu selection icon I2 is selected in a state in which the screen Q1 is displayed, the display control unit 292 causes an icon used to select each of white balance, AF, and photometry and an icon used to return to an original operation display screen to be displayed on the display unit 21 as a still image capturing menu (not illustrated).

Figure 26:
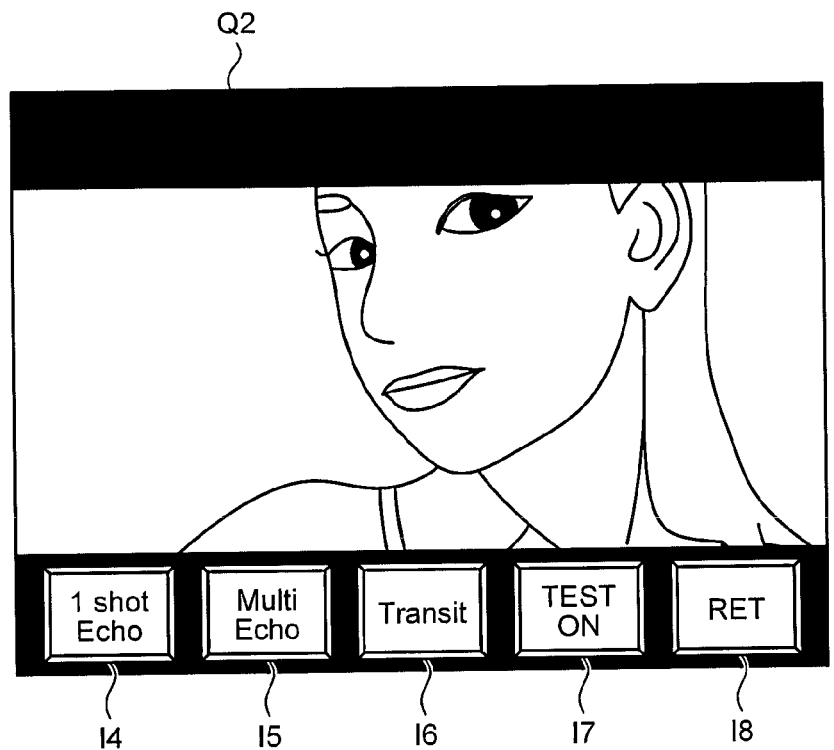
FIG. 26 is a diagram illustrating a screen display example in a display unit when the imaging device according to Modified Example 2-2 of the second embodiment of the present invention is in a moving image capturing standby state.

However, when the menu selection icon I3 is selected in a state in which the screen Q1 is displayed, the display control unit 292 causes an image representing the moving image capturing standby state to be displayed on the display unit 21. FIG. 26 is a diagram illustrating a screen display example in the display unit 21 when the imaging device 51 is in the moving image capturing standby state. The display unit 21 displays five types of icons including a one-shot echo icon I4 (displayed as "1Shot Echo"), a multiecho icon I5 (displayed as "Multi Echo"), a the transit icon I6 (displayed as "Transit"), a test on icon I7 (displayed as "TEST ON"), and a return icon I8 (displayed as "RET") are displayed on a screen Q2 illustrated in FIG. 26.

In the moving image capturing standby state illustrated in FIG. 26, an aspect ratio of an image at the time of still image capturing is changed, and so an image that is more rectangular than a still image is displayed. For this reason, the display unit 21 displays various kinds of icons on a non-display area of an image that is of a rectangular band shape in a vertical direction of a screen.

Among icons displayed on the screen Q2, the one-shot echo icon I4, the multiecho icon I5, and the transit icon I6 are icons used to select the one-shot echo, the multiecho, and the transit as the moving image special effect, respectively. Here, when any one icon is selected, the display unit 21 displays a live-view image to which the selected moving image special effect has been applied. Thus, the one-shot echo icon I4, the multi-echo icon I5, and the transit icon I6 serve as a part of the simulation signal input unit 521.

The test on icon I7 is an icon representing a state the selected moving image special effect is reflected in a live view display but not reflected in moving image recording yet.

The return icon I8 is an icon used to return to an immediately previous image display.

Figure 27:
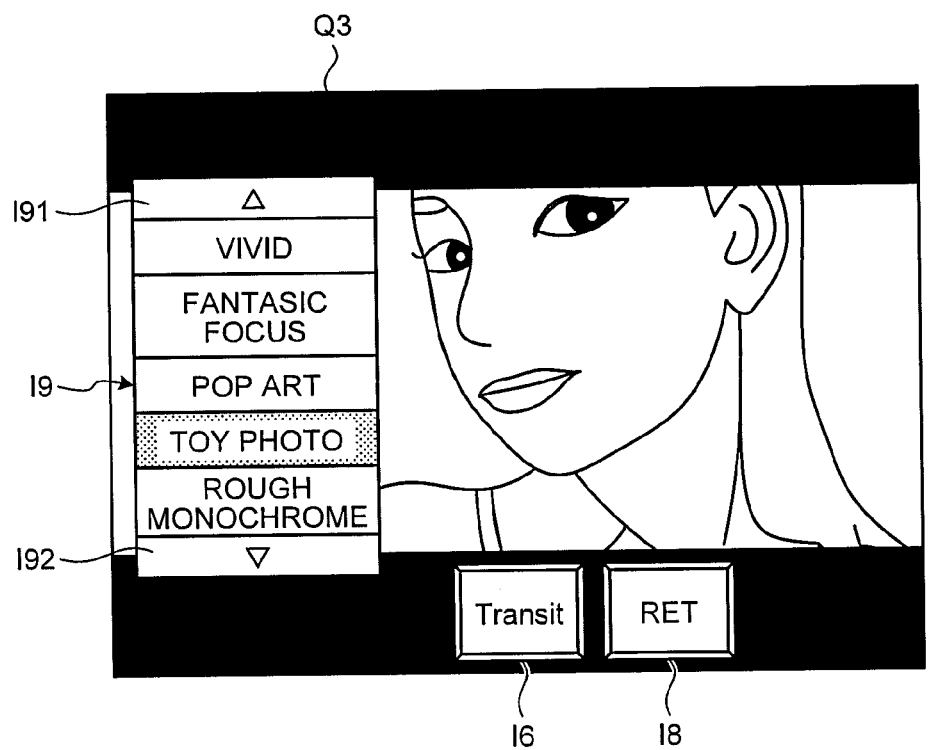
FIG. 27 is a diagram illustrating a screen display example in a display unit when a transit is selected as a moving image special effect.

FIG. 27 is a diagram illustrating a screen display example in the display unit 21 when the transit is selected as the moving image special effect in a state in which the screen Q2 is displayed on the display unit 21. A finish list of switching destinations at the time of transit is selectably displayed on the screen Q3 illustrated in FIG. 27 through the display unit 21. A display order of finish items in the finish list display icon I9 can be appropriately changed.

An up-scroll button I91 used to receive an input of an upward scroll signal and a down-scroll button I92 used to receive an input of a downward scroll signal are disposed on upper and lower ends of the finish list display icon I9, respectively. For example, when the up-scroll button I91 is selected, a display is scrolled upward, an item "vivid" displayed on the top disappears, an item "fantasic focus" is displayed on the top, and another finish item is displayed on the bottom.

In the finish list display icon I9, a currently selected finish item is displayed in a manner different from another finish item. Here, a display in a different manner is a general term of a display distinguished from another finish item, and includes, for example, a gray display or a highlight display. FIG. 27 illustrates an example in which an item "toy photo" is selected. Here, when a finish item of a switching destination is selected, the display control unit 292 erases the finish list display icon I9. Thereafter, the image processing control unit 291 causes the moving image special effect image processing unit 163 to start transit processing.

Further, when a highlight-displayed item is selected again in the finish list display icon I9, the process may return to the previously selected artistic effect. Specifically, let us assume that an effect selected before toy photo is the natural. In this case, when the item "toy photo" is selected again, the process may return to the natural.

Figure 28:
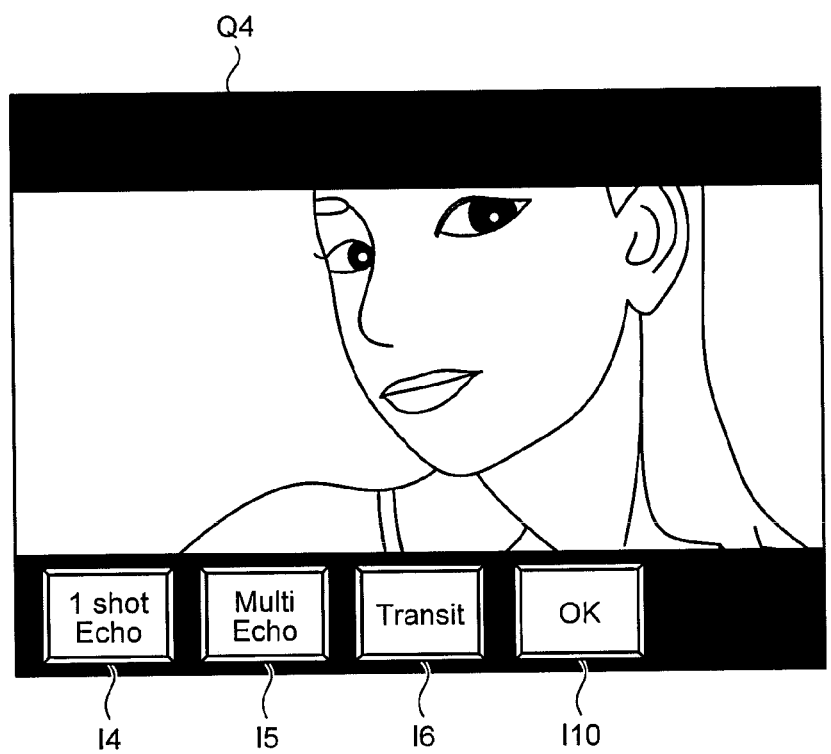
FIG. 28 is a diagram illustrating a screen display example after a moving image button is pressed on a screen illustrated in FIG. 26.

FIG. 28 is a diagram illustrating a screen display example after the moving image button 47 is pressed on the screen Q2 illustrated in FIG. 26. In addition to the one-shot echo icon I4, the multi-echo icon I5, and the transit icon I6, a decision icon I10 (displayed as "OK") is displayed on the screen Q4 illustrated in FIG. 28. The decision icon I10 is an icon used to start recording of an image to which the displayed moving image special effect is applied. Thus, the decision icon I10 serves as a part of the effect recording start signal input unit 522.

Here, when the moving image button 47 is pressed in a state in which the screen Q4 is displayed and thus moving image recording ends, the display control unit 292 performs control such that the screen Q2 is displayed on the display unit 21.

Figure 29:
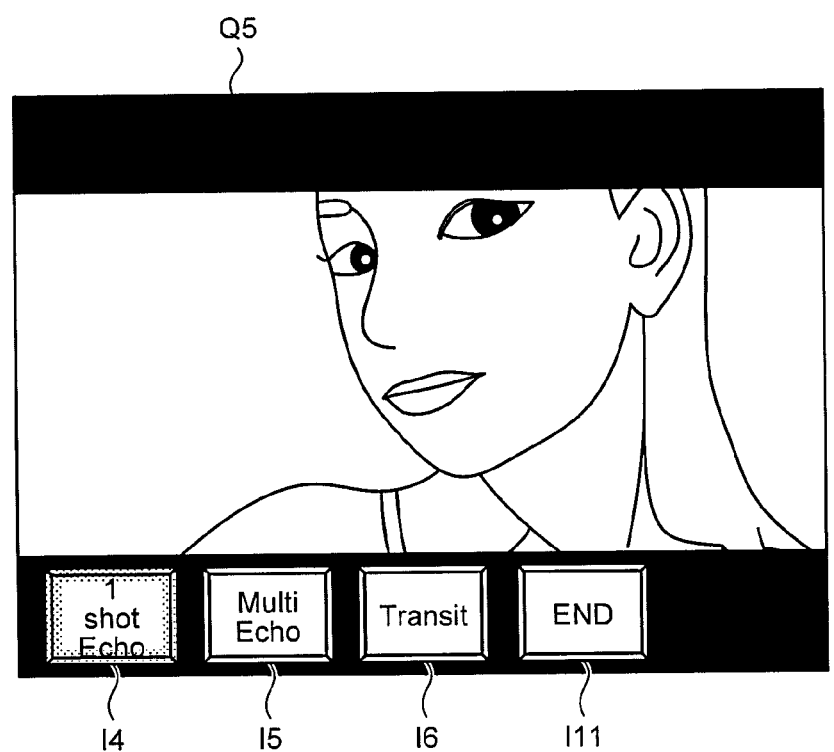
FIG. 29 is a diagram illustrating a screen display example in a display unit 21 after a decision icon is selected on a screen illustrated in FIG. 28.

FIG. 29 is a diagram illustrating a screen display example in the display unit 21 after the decision icon I10 is selected on the screen Q4 illustrated in FIG. 28. In addition to the one-shot echo icon I4, the multi-echo icon I5, and the transit icon I6, an end icon I11 (displayed as "END") is displayed on a screen Q5 illustrated in FIG. 29. Among the icons, the one-shot echo icon I4 is being highlight-displayed. This means that the one-shot echo is selected.

The end icon I11 is an icon used to input an instruction signal used to end application of the moving image special effect to a moving image which is being recorded. Here, when the end icon I11 is selected in a state in which the screen Q5 is displayed, the image processing control unit 291 causes the moving image special effect image processing unit 163 to end application of the moving image special effect. In this case, the display control unit 292 causes a screen in which the end icon I11 is erased from the screen Q5 to be displayed on the display unit 21. At this time, it is natural that the moving image special effect is not applied to a live-view image which is being displayed.

Here, when the moving image button 47 is pressed in a state in which the screen Q5 is displayed and so moving image recording ends, the display control unit 292 performs control such that the screen Q2 is displayed on the display unit 21.

Figure 30:
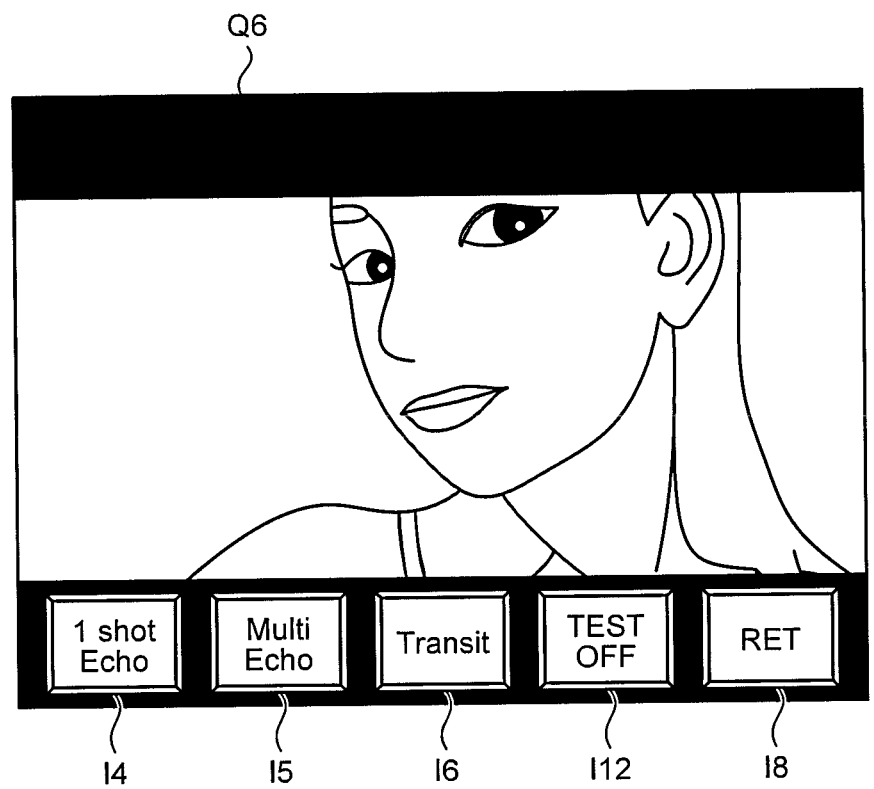
FIG. 30 is a diagram illustrating a screen display example in a display unit when a test on icon is selected on a screen illustrated in FIG. 26 and so a test on state is set.

FIG. 30 is a diagram illustrating a screen display example in the display unit 21 when the test on icon I7 is selected on the screen Q2 illustrated in FIG. 26 and so a test on state is set. A test off icon I12 (displayed as "TEST OFF") rather than the test on icon I7 is displayed on a screen Q6 illustrated in FIG. 30. The test off icon I12 is an icon representing a state in which the selected moving image special effect is reflected in a live view display and moving image recording.

Here, when the test off icon I12 is selected in a state in which the screen Q6 is displayed, the display control unit 292 causes the display unit 21 to display the screen Q2. In other words, when the test off icon I12 is selected, the test on icon I7 is displayed at the position of the test off icon I12.

Here, when the moving image button 47 is pressed in a state in which the screen Q6 is displayed on the display unit 21 and so moving image recording starts, the display control unit 292 performs control such that the screen Q5 is displayed.

According to Modified Examples 2-1 and 2-2 of the second embodiment described above, the same effects as in the second embodiment can be obtained.

Third Embodiment

An imaging device according to a third embodiment of the present invention is settable to either of the moving image capturing mode and the still image capturing mode, and when the moving image capturing mode is set, the user interface is switched to a user interface for moving image capturing.

Figure 31:
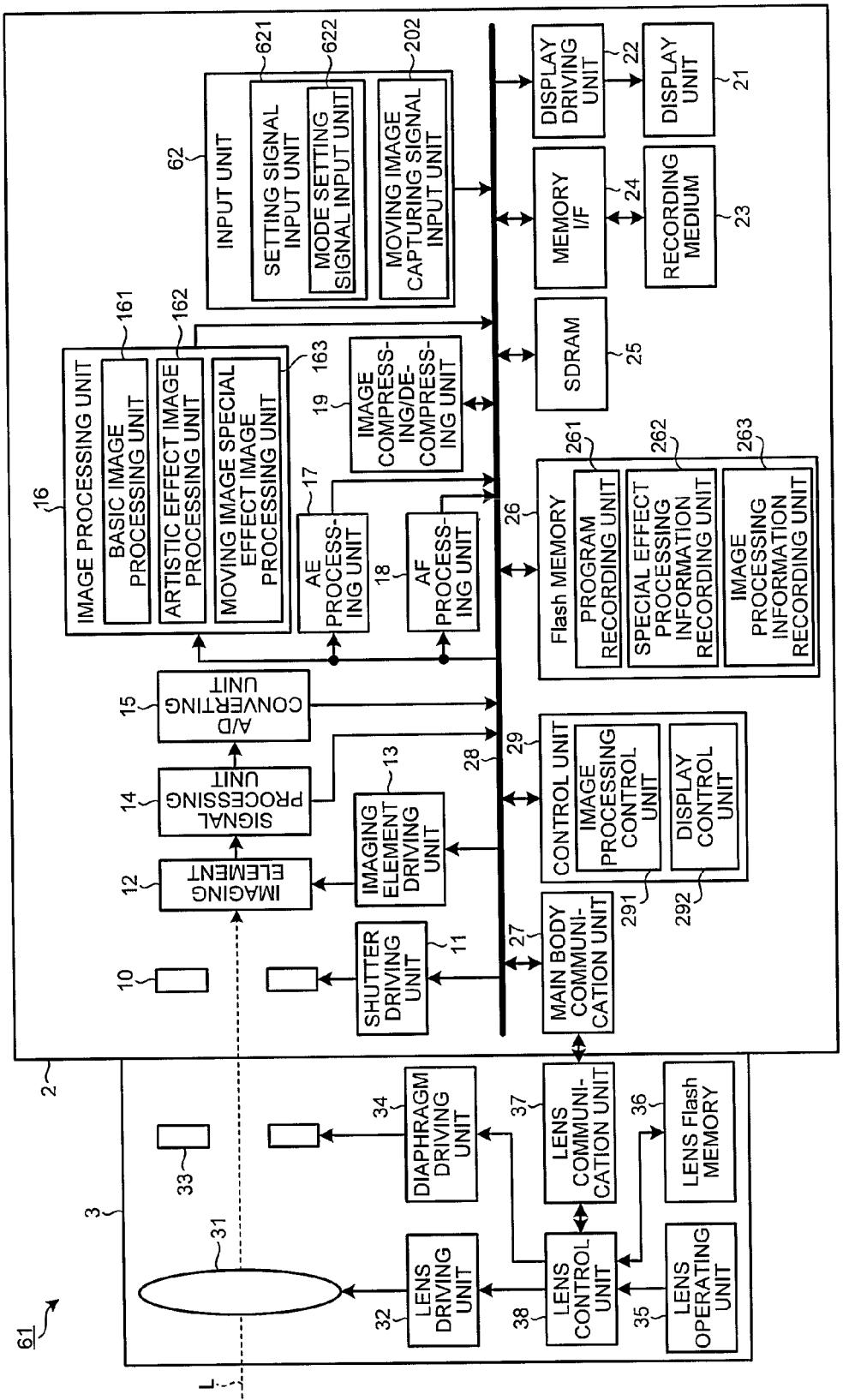
FIG. 31 is a block diagram illustrating a configuration of an imaging device according to a third embodiment of the present invention.

FIG. 31 is a block diagram illustrating a configuration of the imaging device according to the third embodiment. An imaging device 61 illustrated in FIG. 31 has the same configuration as the imaging device 1 described in the first embodiment except for an input unit 62. A configuration of the input unit 62 will be described below.

The input unit 62 includes a setting signal input unit 621 that receives an input of various kinds of signals including a still image capturing condition setting signal used to set a shooting condition in still image capturing and moving image capturing and a moving image capturing signal input unit 202.

The setting signal input unit 621 includes a mode setting signal input unit 622 that receives an input of a mode setting signal instructing mode setting. For example, the mode setting signal input unit 622 is implemented by the mode dial 43.

FIG. 32 is a diagram illustrating a key assignment when the imaging device 61 is set to the still image capturing mode or the moving image capturing mode. Here, when the imaging device 61 is set to the still image capturing mode, the exposure correction operation is assigned to the up-arrow key 443. The continuous shooting/single shooting operation is assigned to the down-arrow key 444. The AF target operation is assigned to the left-arrow key 445. The flash setting operation is assigned to the right-arrow key 446. The playback operation is assigned to the playback button 46. The erase operation is assigned to the erase button 49.

Next, an example in which the imaging device 61 is set to the moving image capturing mode will be described. The up-arrow key 443 and the left-arrow key 445 are assigned the same operations to when the still image mode is set, that is, the exposure correction operation and the AF target operation, respectively. The down-arrow key 444 is assigned the transit effect start operation. The right-arrow key 446 is assigned the fluctuation effect start/stop operation. The playback button 46 is assigned the one-shot echo start operation. The erase button 49 is assigned the multi-echo start/stop operation.

In the third embodiment, a stop setting as well as a start setting can be arbitrarily made on the fluctuation effect. However, when the fluctuation effect stops when a predetermined time elapses after the effect starts similarly to the first embodiment, it is preferable that the fluctuation effect start operation be assigned to the right-arrow key 446.

Figure 33A:
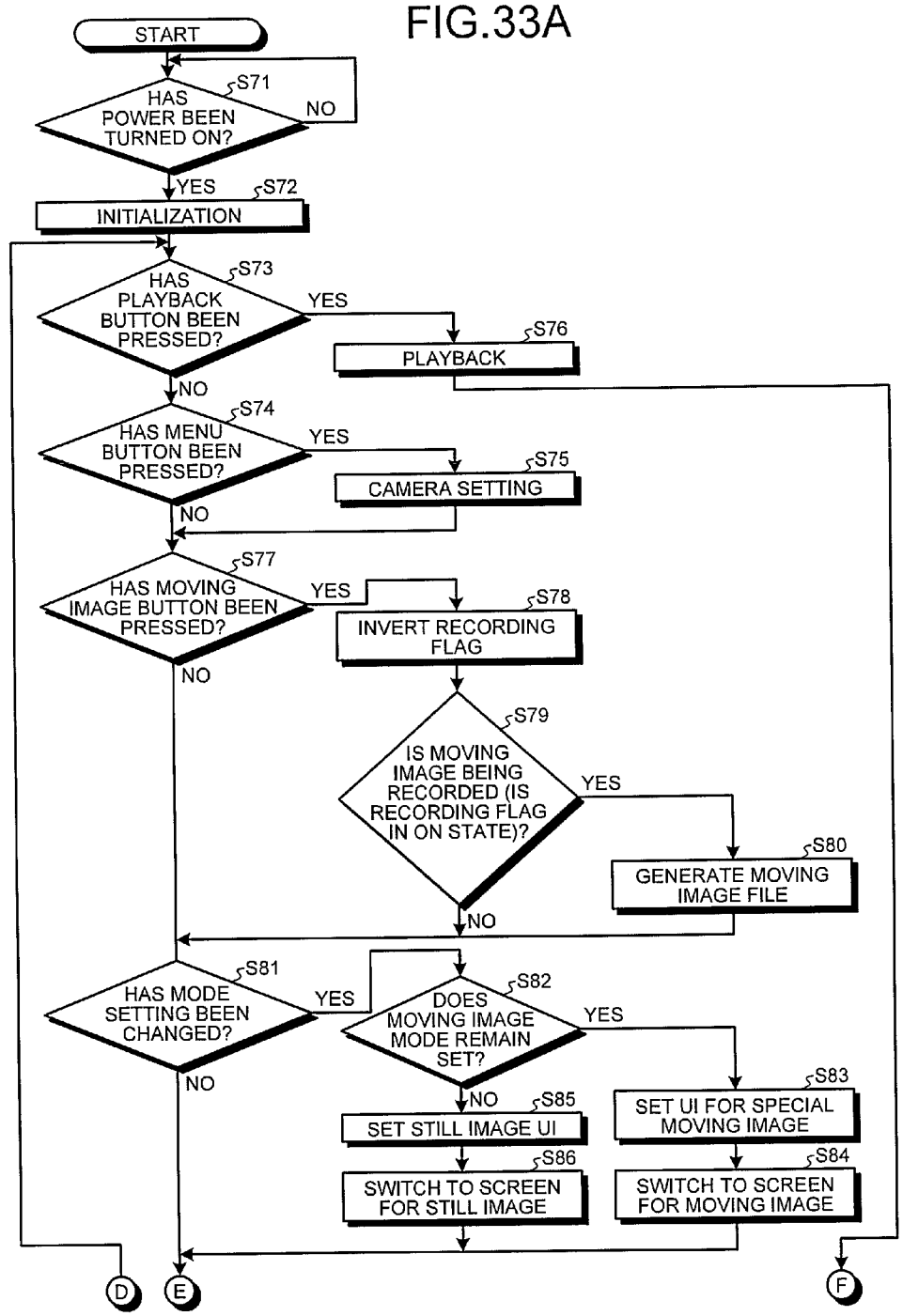
FIGS. 33A and 33B are flowcharts illustrating an outline of processing performed by the imaging device according to the third embodiment of the present invention.
Figure 33B:
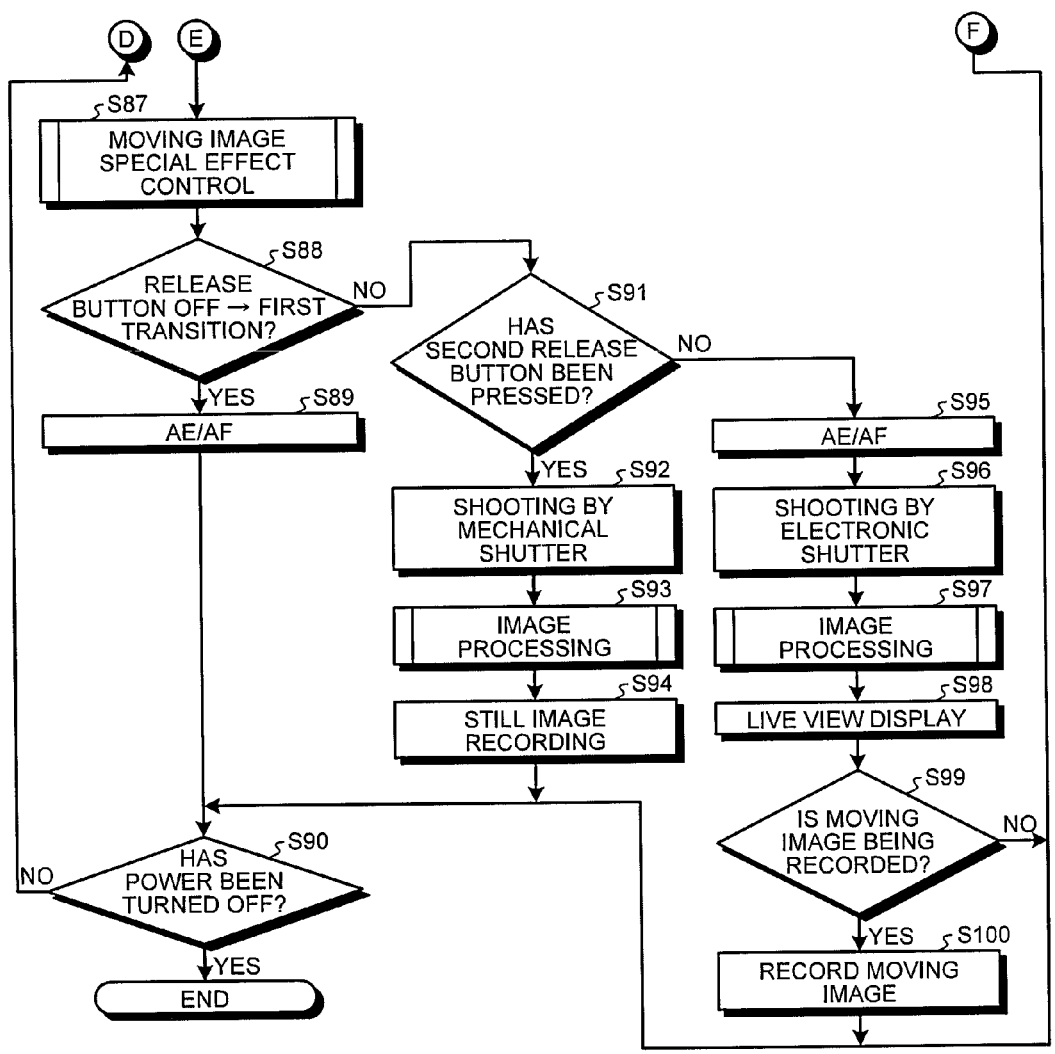

FIGS. 33A and 33B are flowcharts illustrating an outline of processing performed by the imaging device 61. The processes of steps S71 to S76 in FIG. 33A sequentially correspond to the processes of steps S1 to S6 in FIG. 13A.

Here, when it is determined in step S77 that the moving image button 47 has been operated (Yes in step S77), the control unit 29 inverts the recording flag representing that moving image recording is being performed (step S78).

Next, the control unit 29 determines whether or not the recording flag recorded in the SDRAM 25 is in the on state (step S79). Here, when it is determined that the recording flag is in the on state (Yes in step S79), the control unit 29 generates a moving image file used to record image data in the recording medium 23 in time series and stores the moving image file in the recording medium 23 (step S80). Thereafter, the imaging device 61 causes the process to proceed to step S81. However, when it is determined in step S79 that the recording flag is not in the on state (No in step S79), the imaging device causes the process to proceed to step S81.

Then, when it is determined in step S81 that a mode setting has been changed (Yes in step S81) and then it is determined that the moving image mode remains set (Yes in step S82), the control unit 29 performs a process of setting a user interface for a special moving image (step S83). Through this setting, for example, an assignment for the moving image mode illustrated in FIG. 32 is executed. As a result, the control unit 29 recognizes a signal subsequently received by the user interface which is the setting target in step S83 as a signal for a special moving image with reference to FIG. 32.

Meanwhile, when it is determined in step S81 that a mode setting has been changed (Yes in step S81) and then it is determined that the still image mode remains set (No in step S82), the control unit 29 performs a process of setting a user interface for a still image (step S85). At this time, a key assignment for the still image mode illustrated in FIG. 32 is executed.

The processes of steps S86 to S100 sequentially correspond to the processes of steps S14 to S28 described in the first embodiment.

According to the third embodiment of the present invention described above, when the moving image capturing mode is set, the setting signal input unit switches the user interface to the user interface for the moving image special effect, and the control unit recognizes that the moving image special effect setting signal has been input. Thus, the user can easily apply a special effect to a moving image by performing a simple operation at the time of shooting. The setting of the user interface is switched according to the mode setting, and shooting is performed after the moving image special effect is checked through the live-view image.

Further, according to the third embodiment, the user interface configuring the setting signal input unit can be provided with both an input function for a moving image and an input function for a still image. Thus, the number of user interfaces can be reduced. Thus, the user interface is suitable for device miniaturization.

In addition, according to the third embodiment, the user can clearly understand the application of the moving image special effect before the moving image is recorded in the moving image capturing standby state or the still image capturing standby state. Thus, the user can cause a moving image with a special effect to be captured and recorded as a moving image to be imaged in advance or can consider a timing to apply a special effect in advance.

Modified Example 3-1

Figures 34, 35:
FIG. 34 is a diagram illustrating a key assignment when an imaging device according to Modified Example 3-1 of the third embodiment of the present invention is set to a still image capturing mode or a moving image capturing mode.
FIG. 35 is a diagram illustrating a screen display example in a display unit when an imaging device according to Modified Example 3-2 of the third embodiment of the present invention is in the still image capturing standby state.

FIG. 34 is a diagram illustrating a key assignment when an imaging device according to Modified Example 3-1 of the third embodiment is set to the still image capturing mode or the moving image capturing mode. Here, when the imaging device according to Modified Example 3-1 is set to the still image capturing mode, a key assignment of the cross key 441 is the same as in the third embodiment.

An example of a key assignment when the imaging device according to Modified Example 3-1 is set to the moving image capturing mode will be described below. The up-arrow key 443 is assigned the one-shot echo start operation. The down-arrow key 444 is assigned the transit start operation. The left-arrow key 445 is assigned the multi-echo start/stop operation. The right-arrow key 446 is assigned the fluctuation start/stop operation.

Modified Example 3-2

FIG. 35 is a diagram illustrating a screen display example in the display unit 21 when an imaging device according to Modified Example 3-2 of the third embodiment is in the still image capturing standby state. In Modified Example 3-2, various kinds of signals are input using the touch panel 50. In addition to the still image capturing menu selection icon I2, a shooting mode icon I1' is displayed on a screen Q7 illustrated in FIG. 35. The shooting mode icon I1' is configured to receive a touch input and serves as a part of the mode setting signal input unit 622.

Figure 36:
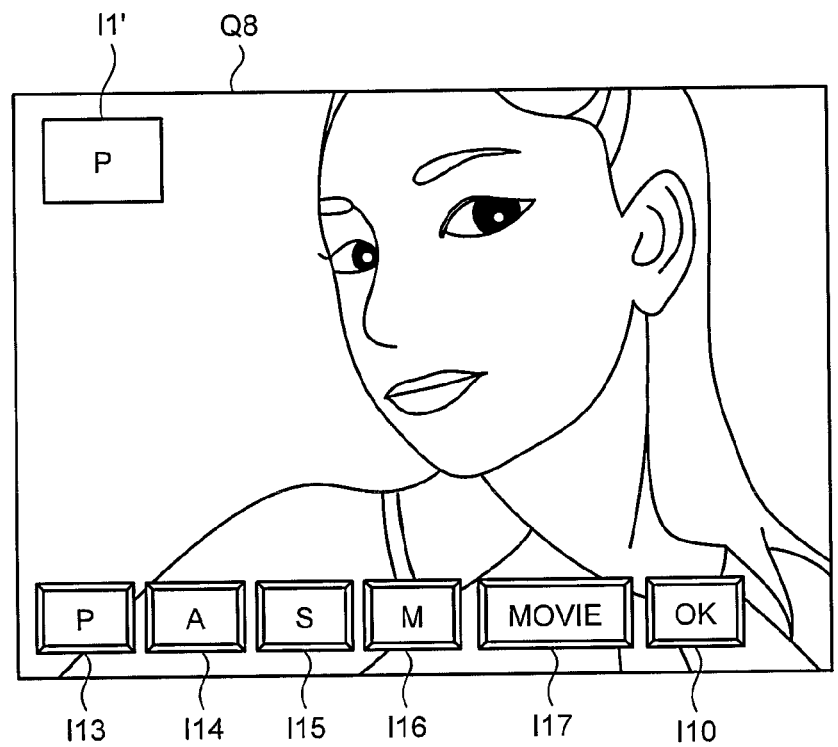
FIG. 36 is a diagram illustrating a screen display example in a display unit 21 when a shooting mode icon is selected on a screen illustrated in FIG. 35.

FIG. 36 is a diagram illustrating a screen display example in the display unit 21 when the shooting mode icon I1' is selected on the screen Q7. Here, six kinds of icons including a P mode icon I13 (displayed as "P"), an A mode icon I14 (displayed as "A"), an S mode icon I15 (displayed as "S"), an M mode icon I16 (displayed as "M"), a moving image icon I17 (displayed as "MOVIE"), and a decision icon 110 are displayed on a lower portion of a screen Q8 illustrated in FIG. 36. Among the icons, the P mode icon 113, the A mode icon I14, the S mode icon I15, and the M mode icon I16 are icons used to set the shooting mode (exposure mode), and have the same function as the mode dial 43.

Here, the moving image icon I17 is selected on the screen Q8, the imaging device 1 is set to the moving image mode and becomes the moving image capturing standby state.

Figure 37:
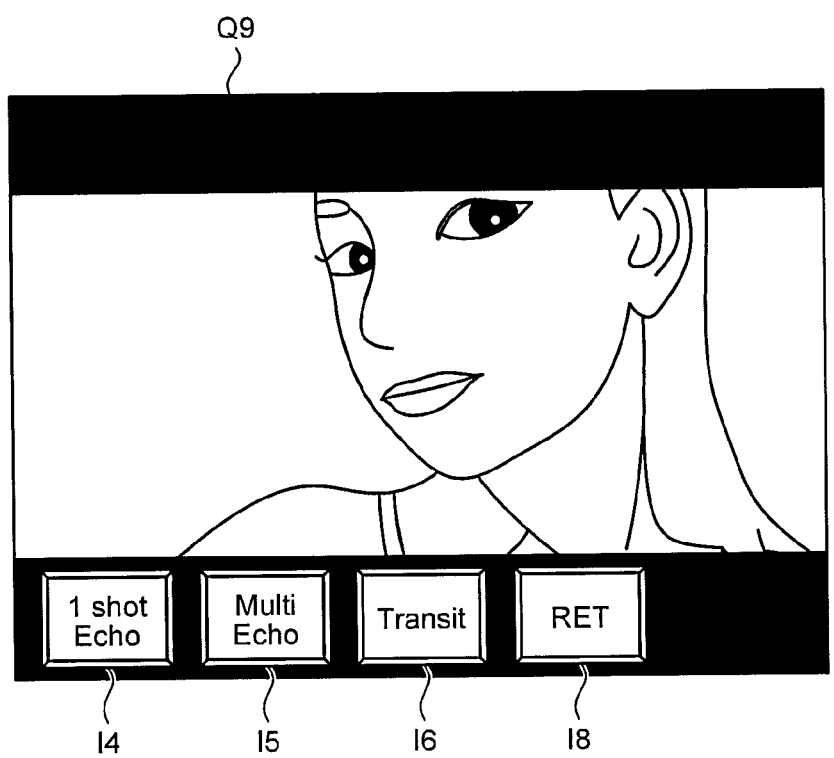
FIG. 37 is a diagram illustrating a screen display example in a display unit in a moving image capturing standby state.

FIG. 37 is a diagram illustrating a screen display example in the display unit 21 in the moving image capturing standby state. The one-shot echo icon I4, the multi-echo icon I5, the transit icon I6, and the return icon I8 are displayed on a screen Q9 illustrated in FIG. 37.

Here, when any one of the one-shot echo icon I4, the multi-echo icon I5, and the transit icon I6 is selected in the state illustrated in FIG. 37, the display control unit 292 applies a special effect corresponding to the selected moving image special effect and displays a live-view image. Here, when the transit icon I6 is selected, the screen Q3 illustrated in FIG. 27 is displayed. Here, when the moving image button 47 is pressed in a state in which the moving image special effect is selected, the control unit 29 starts recording of a moving image to which the moving image special effect currently displayed through the live-view image is applied.

According to Modified Examples 3-1 and 3-2 of the third embodiment described above, the same effects as in the third embodiment can be obtained.

Fourth Embodiment

In a fourth embodiment of the present invention, an imaging device capable of capturing a moving image can set a moving image special effect applying mode in which shooting is performed in a state in which a moving image special effect is applied as one of the shooting modes.

Figure 38A:
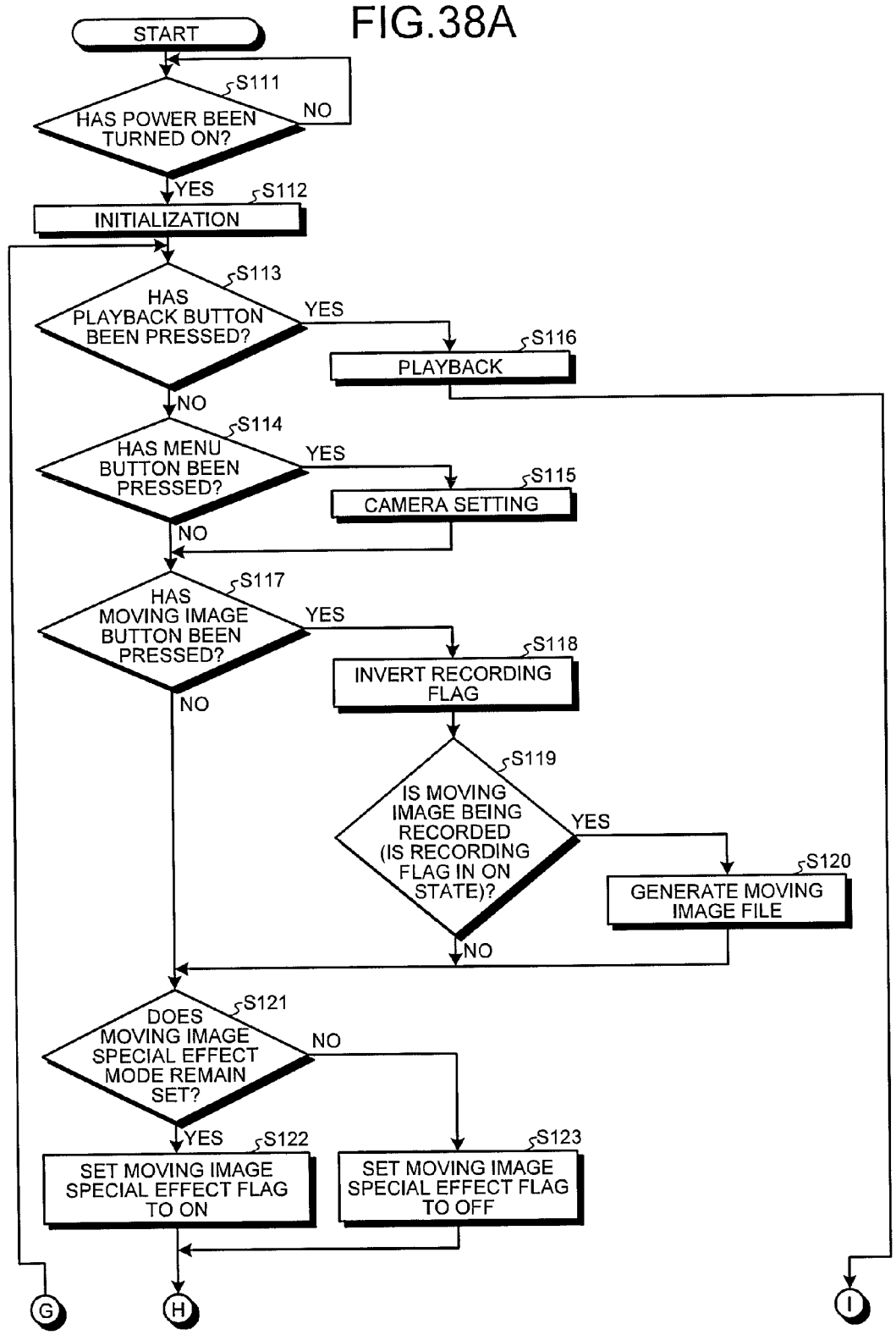
FIGS. 38A and 38B are flowcharts illustrating an outline of processing performed by an imaging device according to a fourth embodiment of the present invention.
Figure 38B:
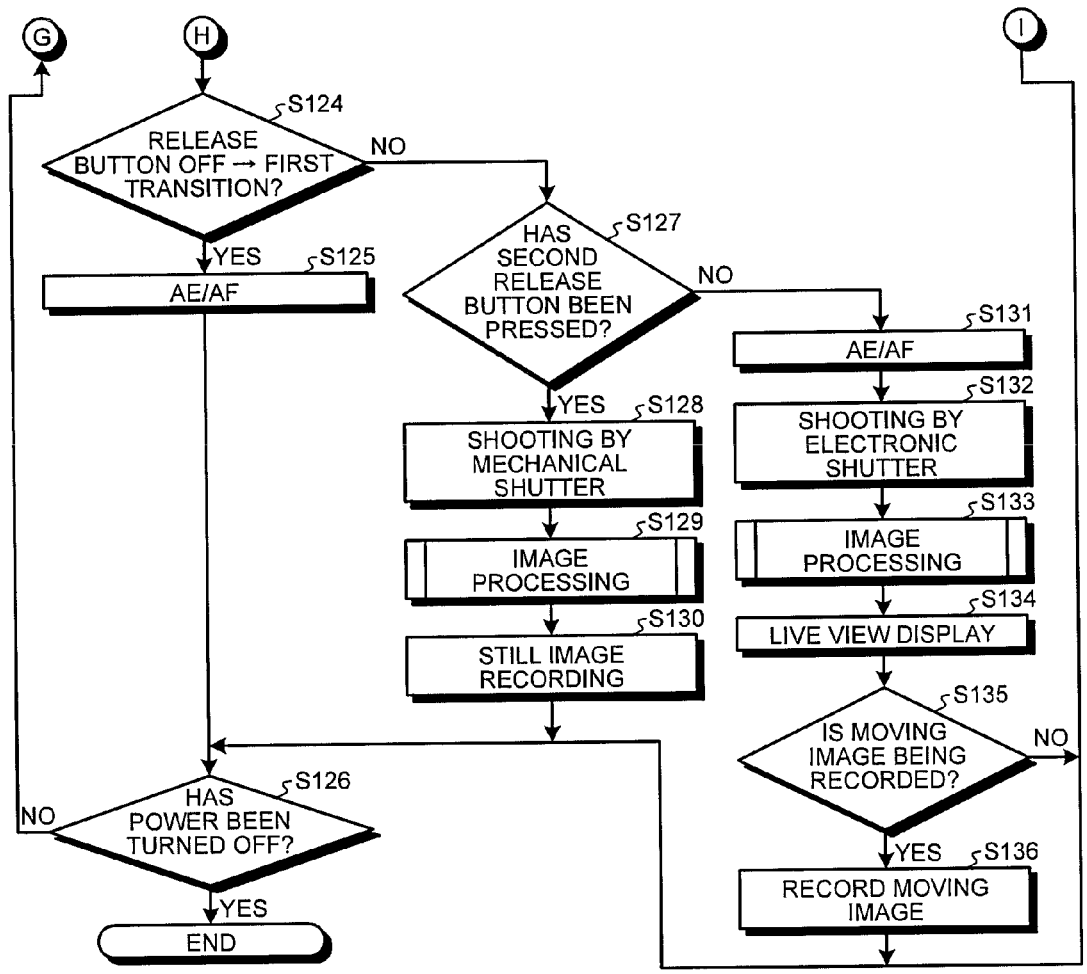

FIGS. 38A and 38B are flowcharts illustrating an outline of processing performed by an imaging device according to the fourth embodiment of the present invention. The imaging device according to the fourth embodiment has the same configuration as the imaging device 61 described in the third embodiment. The processes of steps S111 to S114 and S116 in FIG. 38A sequentially correspond to the processes of steps S71 to S74 and S76 in FIG. 33A.

In step S115, camera setting is performed (step S115). Here, the camera setting includes selection of a special effect in addition to finish setting, still image recording mode setting, moving image recording mode special effect setting, transit switching destination setting, and fluctuation effect setting. Thus, in the fourth embodiment, the moving image special effect is assumed to be selected in advance. The special effect may be selected through the mode dial 43.

Here, when it is determined in step S117 that the moving image button 47 has been operated (Yes in step S117), the control unit 29 inverts the recording flag representing that moving image recording is being performed (step S118).

Next, the control unit 29 determines whether or not the recording flag recorded in the SDRAM 25 is in the on state (step S119). Here, when it is determined that the recording flag is in the on state (Yes in step S119), the control unit 29 generates a moving image file used to record image data in the recording medium 23 in time series and stores the moving image file in the recording medium 23 (step S120). Thereafter, the imaging device 61 causes the process to proceed to step S121. However, when it is determined in step S119 that the recording flag is not in the on state (No in step S119), the moving image special effect image processing unit 163 causes the process to proceed to step S121.

In step S121, the control unit 29 determines whether or not the imaging device 61 remains set to the moving image special effect mode. Here, when it is determined that the imaging device 61 remains se to the moving image special effect mode (Yes in step S121), the control unit 29 sets the moving image special effect flag to the on state (step S122). However, when the control unit 29 determines in step S121 that the imaging device 61 does not remain set to the moving image special effect mode (No in step S121), the control unit 29 sets the moving image special effect flag to the off state (step S123).

The processes of steps S124 to S136 sequentially correspond to the processes of steps S88 to S100 described in the third embodiment.

According to the fourth embodiment of the present invention described above, the moving image special effect mode can be set, and thus by changing the mode, a moving image to which the moving image special effect is applied can be simply captured.

Further, in the imaging device according to the fourth embodiment, it is preferable that the still image mode can be set.

Fifth Embodiment

In a fifth embodiment of the present invention, even when a still image is captured during moving image capturing, a moving image special effect can be applied based on previously recorded moving image data.

Figure 39:
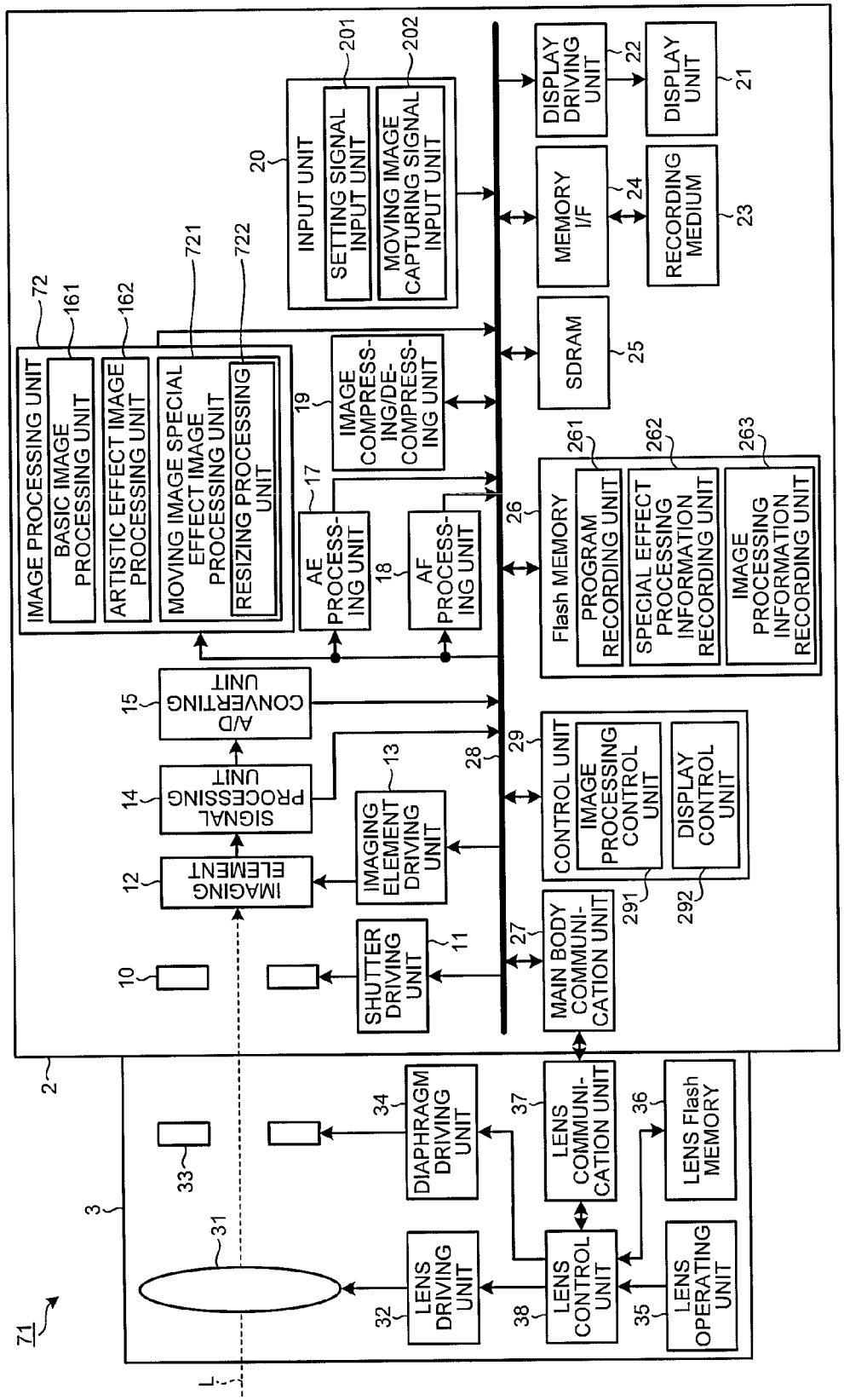
FIG. 39 is a block diagram illustrating a configuration of an imaging device according to a fifth embodiment of the present invention.

FIG. 39 is a block diagram illustrating a configuration of an imaging device according to the fifth embodiment. An imaging device 71 illustrated in FIG. 39 has the same configuration as the imaging device 1 described in the first embodiment except for an image processing unit 72. A configuration of the image processing unit 72 will be described below.

The image processing unit 72 includes a basic image processing unit 161, an artistic effect image processing unit 162, and a moving image special effect image processing unit 721. The moving image special effect image processing unit 721 includes a resizing processing unit 722 that interpolates the number of pixels of moving image data and resizes the number of pixels of moving image data.

Figure 40A:
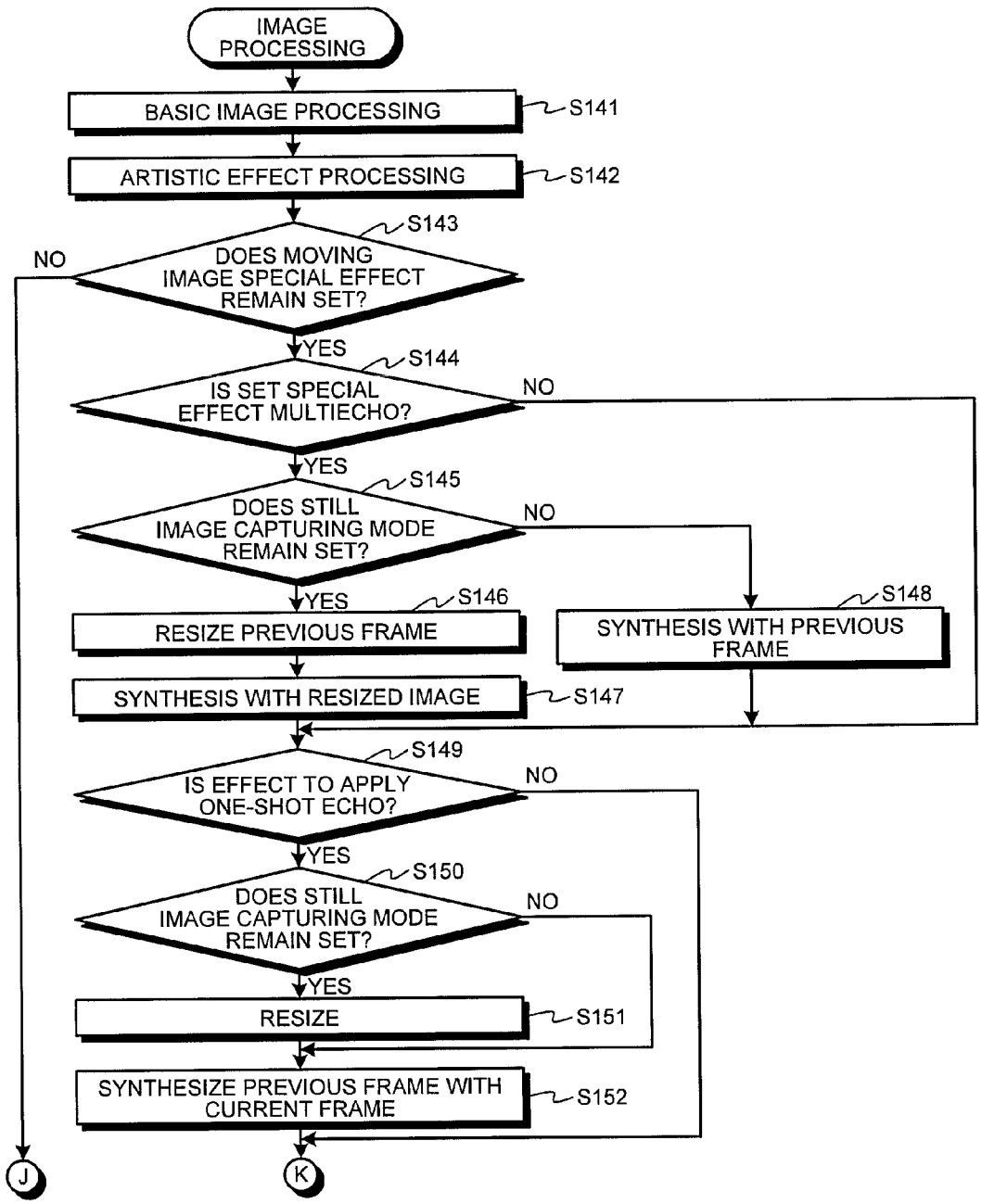
FIGS. 40A and 40B are flowcharts illustrating the details of image processing performed by the imaging device according to the fifth embodiment of the present invention.
Figure 40B:
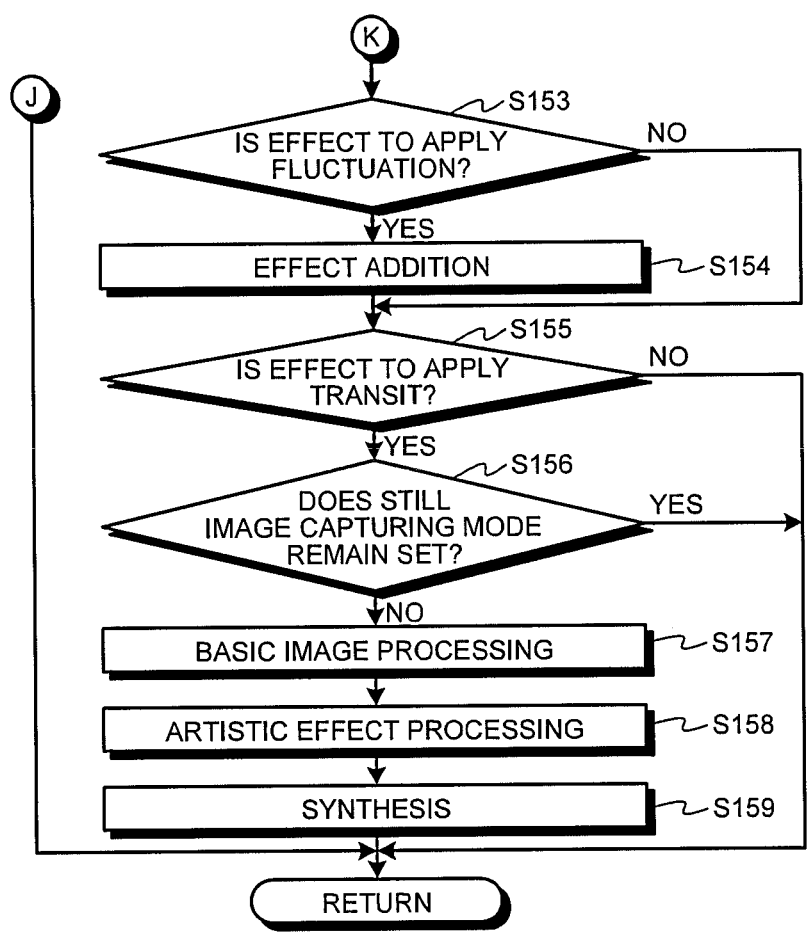

FIGS. 40A and 40B are flowcharts illustrating the details of image processing performed by the imaging device 71. Except for image processing, an outline of processing performed by the imaging device 71 is the same as in the first embodiment (see FIGS. 13A and 13B). Referring to FIGS. 40A and 40B, the basic image processing unit 161 performs basic image processing (step S141), and the artistic effect image processing unit 162 performs artistic effect image processing (step S142). Here, the basic image processing and the artistic effect image processing are the same as described in the first embodiment.

Thereafter, the control unit 29 determines whether or not the moving image special effect remains set (step S143). Here, when it is determined that the moving image special effect remains set (Yes in step S143), the imaging device 71 causes the process to proceed to step S144. However, when it is determined that the moving image special effect does not remain set (No in step S143), the imaging device 71 causes the process to return to the main routine (see FIGS. 13A and 13B).

In step S144, the control unit 29 determines whether or not the set special effect is the multi-echo. Here, when it is determined that the set special effect is the multi-echo (Yes in step S144), the imaging device 71 causes the process to proceed to step S145. However, when it is determined that the set special effect is not the multi-echo (No in step S144), the imaging device 71 causes the process to proceed to step S149 which will be described later.

Here, when it is determined in step S145 that the imaging device 71 remains set to the still image mode (Yes in step S145), the resizing processing unit 722 resizes a previous moving image frame (step S146). This process is performed because a moving image and a still image differ in the number of pixels of image data.

Figure 41:
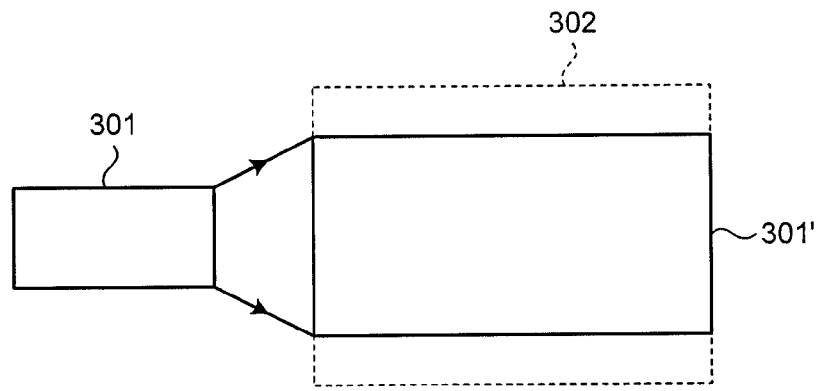
FIG. 41 is a diagram schematically illustrating an outline of resizing processing performed by a resizing processing unit of the imaging device according to the fifth embodiment of the present invention.

FIG. 41 is a diagram schematically illustrating an outline of resizing processing performed by the resizing processing unit 722. Referring to FIG. 41, the size of a frame corresponds to the number of pixels of image data. Here, when resizing processing is performed on moving image data, the resizing processing unit 722 generates a resized frame 301' by increasing the number of pixels by an interpolation such that the number of pixels of a moving image frame 301 in a horizontal direction becomes almost equal to the number of pixels of a still image frame 302 in a horizontal direction in a state in which the aspect ratio of the moving image frame 301 is maintained.

Next, the moving image special effect image processing unit 721 synthesizes the resized moving image frame with the still image frame (step S147). Specifically, the moving image special effect image processing unit 721 generates a synthesized image signal by adding a signal of the moving image frame to a signal of the still image frame at a predetermined ratio for each color data of a pixel. Here, when a ratio of a previous frame image signal is c (<1), the synthesized image signal is represented by:

$$c \times \text{previous frame image signal} + (1-c) \times \text{still image frame signal}.$$

Figure 42:
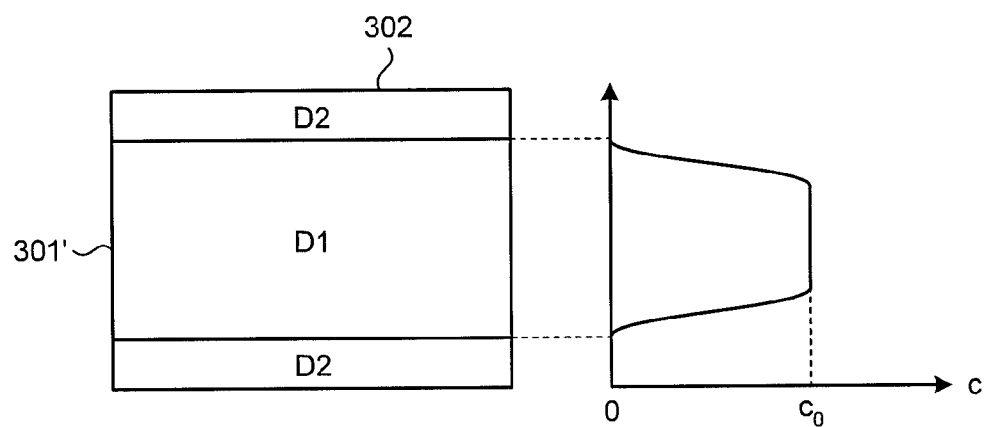
FIG. 42 is a diagram for schematically describing synthesis processing in a still image mode and a synthesis ratio c of a previous frame image signal.

FIG. 42 is a diagram for schematically describing synthesis processing in the still image mode and the synthesis ratio c the previous frame image signal. Referring to FIG. 42, the ratio c of an image signal which is a previous frame has an almost constant value $c_0$ in a region D1 in which an image shared between a resized previous frame and a still image is present. The constant value $c_0$ has a value smaller than, for example, 0.5. On the other hand, near the boundary between a region D2 in which a moving image frame signal is not present an the region D1, the ratio c steadily decreases from the region D1 toward the region D2, and the ratio c becomes zero (0) in the region D2.

Here, when it is determined in step S145 that the imaging device 71 remains set to the moving image mode (No in step S145), the moving image special effect image processing unit 721 synthesizes the previous frame with the moving image frame as is (step S148).

Subsequently to step S147 or S148, the control unit 29 determines whether or not an effect to apply is the one-shot echo (step S149). Here, when it is determined that an effect to apply is the one-shot echo (Yes in step S149) and then it is determined that the still image capturing mode remains set (Yes in step S150), the moving image special effect image processing unit 721 resizes the previous frame (step S151). However, when it is determined that an effect to apply is the one-shot echo (Yes in step S149) and then it is determined that the still image capturing mode does not remain set (No in step S150), the imaging device 71 causes the process to proceed to step S152.

Thereafter, the moving image special effect image processing unit 721 synthesizes the previous frame with a current frame at a predetermined synthesis ratio (step S152). It is preferable that the synthesis ratio be set such that the ratio of the current frame is higher.

Meanwhile, when it is determined in step S149 that a moving image special effect to apply is not the one-shot echo (No in step S149), the imaging device 71 causes the process to proceed to step S153.

In step S153, the control unit 29 determines whether or not an effect to apply is a fluctuation. Here, when it is determined that an effect to apply is the fluctuation (Yes in step S153), the moving image special effect image processing unit 721 adds the fluctuation (step S154). However, when it is determined that an effect to apply is not the fluctuation (No in step S153), the imaging device 71 causes the process to proceed to step S155.

In step S155, the control unit 29 determined whether or not an effect to apply is the transit (step S155). Here, when it is determined that an effect to apply is the transit (Yes in step S155) and then the imaging device 71 is not in a still image capturing state (No in step S156), the basic image processing unit 161 and the artistic effect image processing unit 162 execute basic image processing (step S157) and artistic effect image processing (step S158) according to settings of finish and switching destinations, respectively.

Thereafter, the moving image special effect image processing unit 721 performs synthesis processing of two images for the transit (step S159). After step S159, the imaging device 71 causes the process to return to the main routine.

Meanwhile, when it is determined in step S155 that an effect to apply is not the transit (No in step S155), the imaging device 71 causes the process to return to the main routine without applying the transit to the still image.

Further, when it is determined in step S156 that the imaging device 71 is in the still image capturing state (Yes in step S156), the imaging device 71 causes the process to return to the main routine.

According to the fifth embodiment of the present invention described above, a special effect such as the multi-echo or the one-shot echo is applied to a still image, but in this case, since resizing processing is performed, even though a moving image is synthesized with a still image, a feeling of strangeness does not occur. Thus, according to the fifth embodiment, appropriate residual image effects can be applied to a moving image and a still image while making use of their characteristics.

Further, in the fifth embodiment, both a moving image and a still image are synthesized with a previous frame, but a synthesized image may be generated using a plurality of previous frames. In this case, it is more preferable that a residual image effect be increased using a larger number of previous frames in a still image than in a moving image.

Modified Example 5-1

Figure 43:
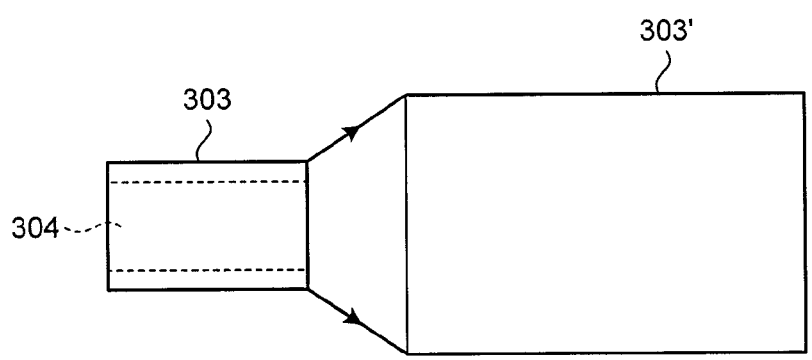
FIG. 43 is a diagram schematically illustrating an outline of resizing processing performed by an imaging device according to Modified Example 5-1 of the fifth embodiment of the present invention.

FIG. 43 is a diagram schematically illustrating an outline of resizing processing performed by an imaging device according to Modified Example 5-1 of the fifth embodiment. Even in FIG. 43, the size of a frame corresponds to the number of pixels of image data. In Modified Example 5-1, when image data is recorded, even in case of a moving image, image data 303 having the same aspect ratio as a still image is recorded in the SDRAM 25. A portion of the image data 303 having an aspect ratio of a moving image is compressed and then recorded in the recording medium 23 as moving image data 304.

In Modified Example 5-1, when a still image is captured, the moving image special effect image processing unit 721 performs the resizing process using the image data 303 stored in the SDRAM 25 as the previous frame and so generates resized image data 303' which is equal in the same number of pixels to the still image frame. Thus, even when a still image data is synthesized with a moving image data, image data with the same aspect ratio can be synthesized.

According to Modified Example 5-1 of the fifth embodiment described above, the synthesis process can be performed in a state in which an aspect ratio of a previous frame matches an aspect ratio of a still image. Thus, among subjects shown in a still image frame, a subject shown outside a region of a moving image aspect ratio of a previous frame image can have a natural residual effect.

Sixth Embodiment

In a sixth embodiment of the present invention, similarly to the fifth embodiment, even when a still image is captured during moving image capturing, a moving image special effect is applied using moving image data acquired before the still image in terms of time, and even a still image to which a moving image special effect is not applied is recorded. An imaging device according to the sixth embodiment has the same configuration as the imaging device 71 described in the fifth embodiment.

Figure 44A:
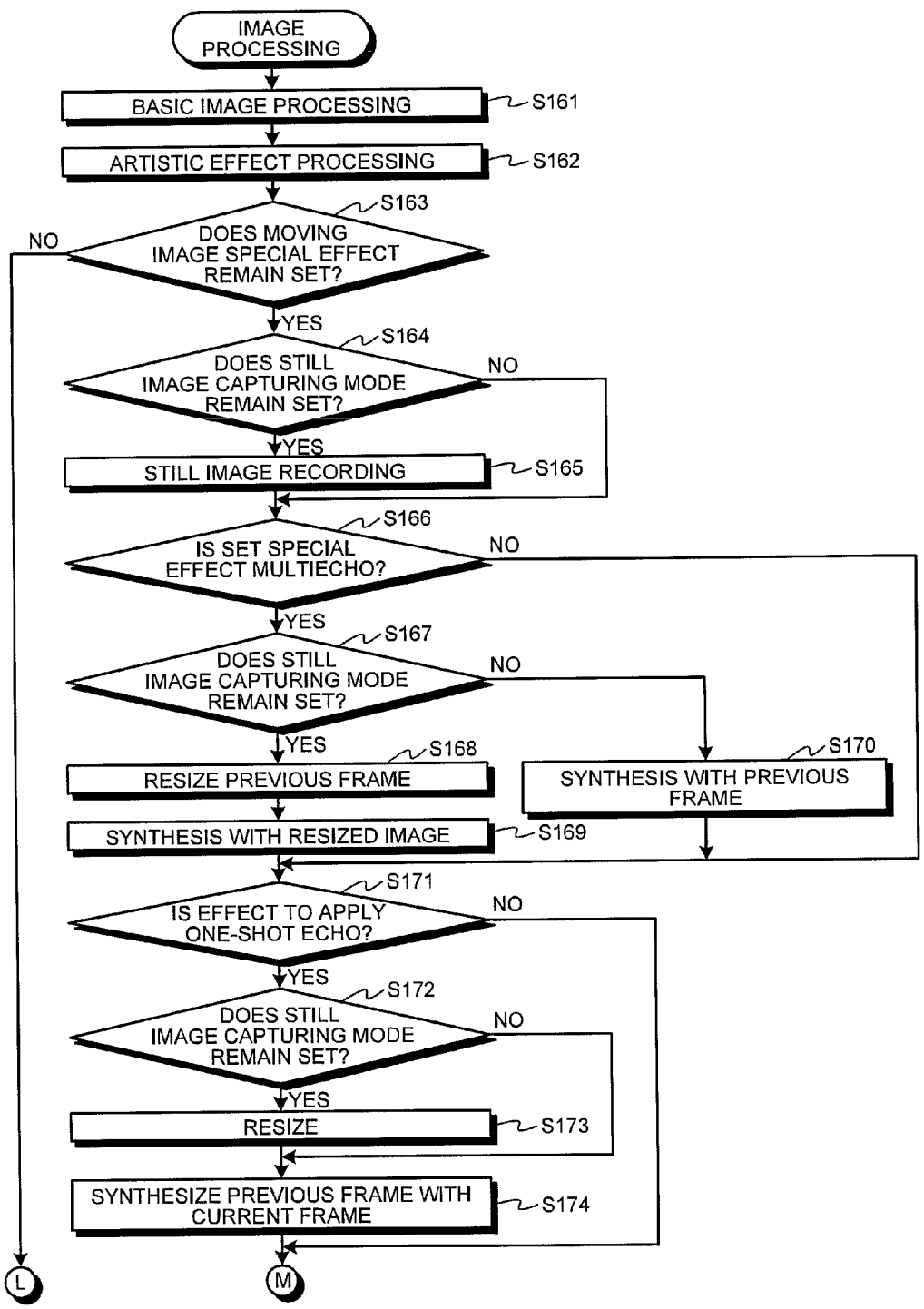
FIGS. 44A and 44B are flowcharts illustrating the details of image processing performed by an imaging device according to an embodiment of the present invention.
Figure 44B:
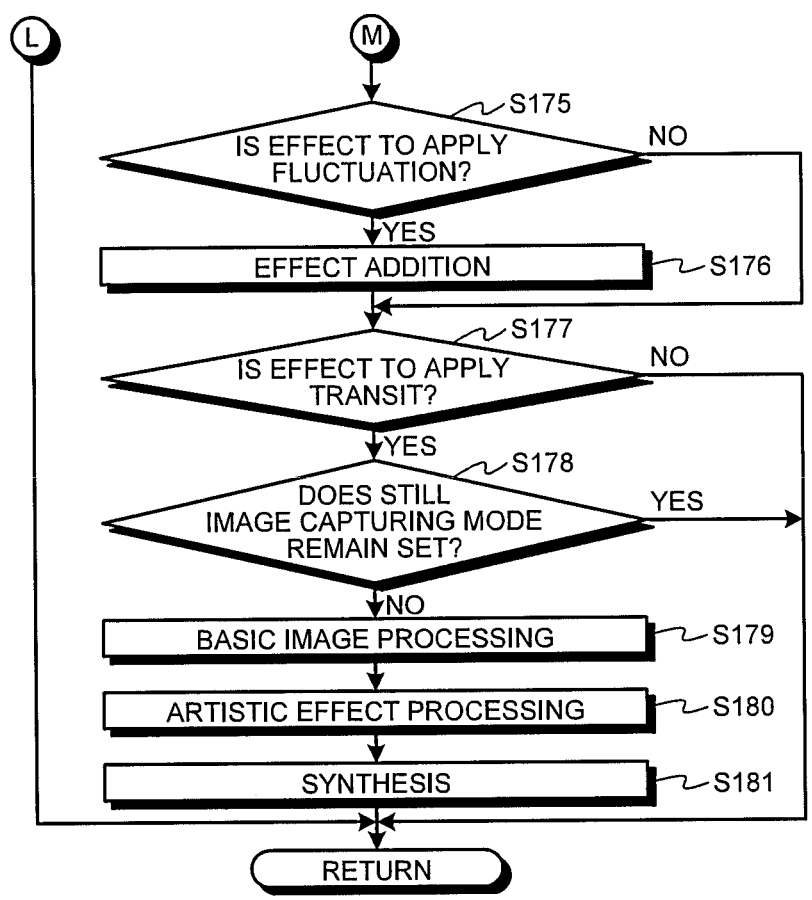

FIGS. 44A and 44B are flowcharts illustrating the details of image processing performed by the imaging device 71 according to the sixth embodiment. Referring to FIGS. 44A and 44B, the basic image processing unit 161 performs basic image processing (step S161). The artistic effect image processing unit 162 performs artistic effect image processing (step S162).

Thereafter, the control unit 29 determines whether or not a moving image special effect remains set (step S163). Here, when it is determined that the moving image special effect remains set (Yes in step S163), the imaging device 71 causes the process to proceed to step S164. However, when it is determined that the moving image special effect does not remain set (No in step S163), the imaging device 71 causes the process to return to the main routine.

Here, when it is determined in step S164 that the imaging device 1 remains set to the still image capturing mode (Yes in step S164), the control unit 29 performs control such that a still image is recorded in the recording medium 23 (step S165). However, when it is determined that the imaging device 1 remains set to the still image capturing mode (No in step S164), the imaging device 1 causes the process to proceed to step S166.

The processes of steps S166 to S181 sequentially correspond to the processes of steps S144 to S159 described in the fifth embodiment (see FIGS. 40A and 40B).

According to the sixth embodiment of the present invention described above, a special effect such as the multi-echo or the one-shot echo is applied even to a still image. However, in this case, resizing processing is performed, and thus even though a moving image is synthesized with a still image, a feeling of strangeness does not occur. Thus, according to the sixth embodiment, appropriate residual image effects can be applied to a moving image and a still image while making use of their characteristics.

Further, according to the sixth embodiment, a still image to which a moving image special effect is desired to be applied is automatically recorded, and thus the user can select his/her preferred image when playing back a still image.

Seventh Embodiment

Figure 45:
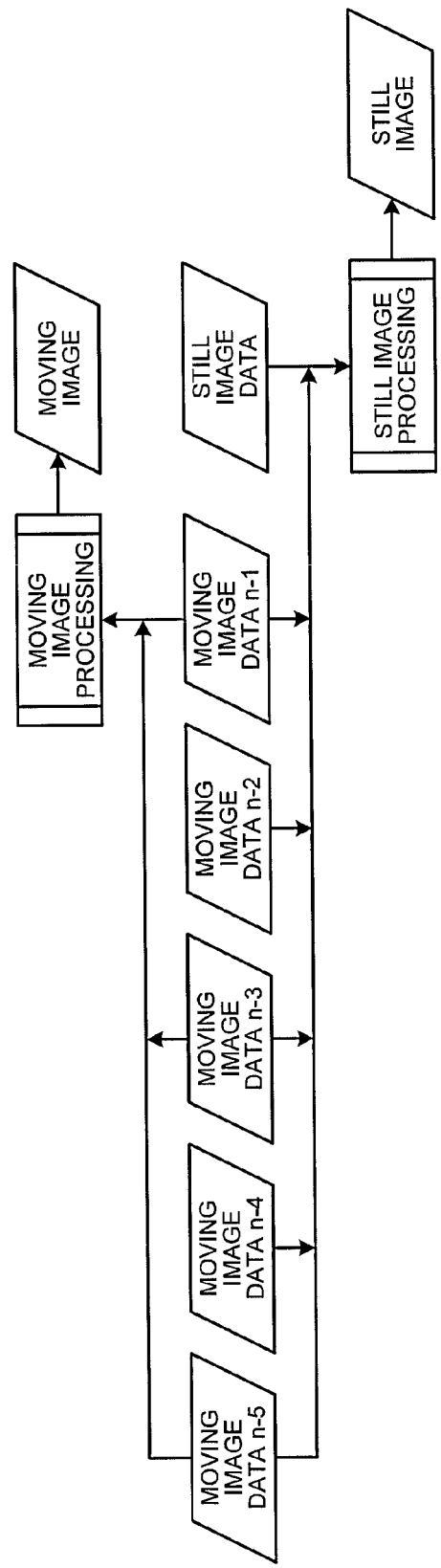
FIG. 45 is a diagram schematically illustrating an outline of image processing performed by an imaging device according to a seventh embodiment of the present invention.

FIG. 45 is a diagram schematically illustrating an outline of image processing performed by an imaging device according to a seventh embodiment of the present invention. In the seventh embodiment, when the multi-echo is applied as the moving image special effect, a moving image and a still image differ in the number of pieces of moving image data of a previous frame which is a synthesis target. Specifically, in case of a moving image, three pieces of moving image data are synthesized, whereas in case of still image, five pieces of moving image data are synthesized. The imaging device according to the seventh embodiment has the same configuration as the imaging device 71 described in the fifth embodiment.

Figure 46A:
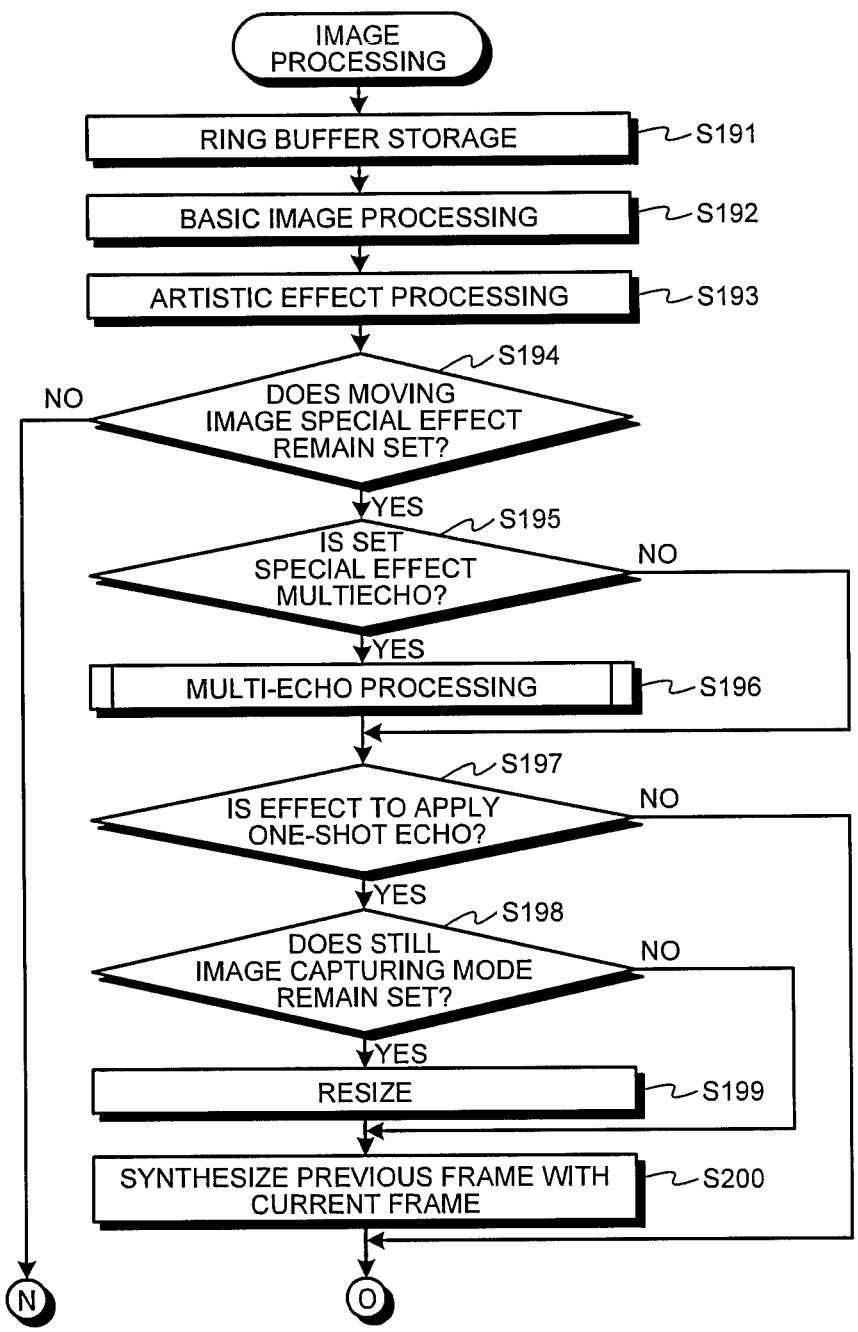
FIGS. 46A and 46B are flowcharts illustrating an outline of image processing performed by the imaging device according to the seventh embodiment of the present invention.
Figure 46B:
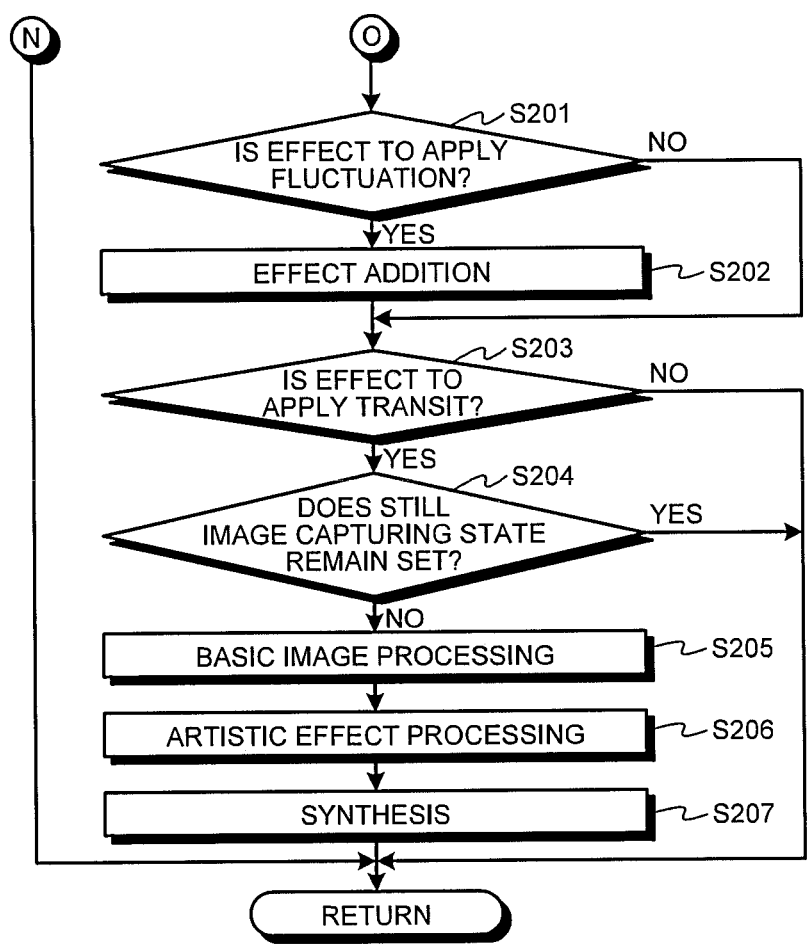

FIGS. 46A and 46B are flowcharts illustrating an outline of image processing performed by the imaging device 71 according to the seventh embodiment. Referring to FIGS. 46A and 46B, first, the control unit 29 manages RAW image data (Bayer data) acquired by the imaging element 12 through a ring buffer secured inside the SDRAM 25 (step S191).

Figure 47:
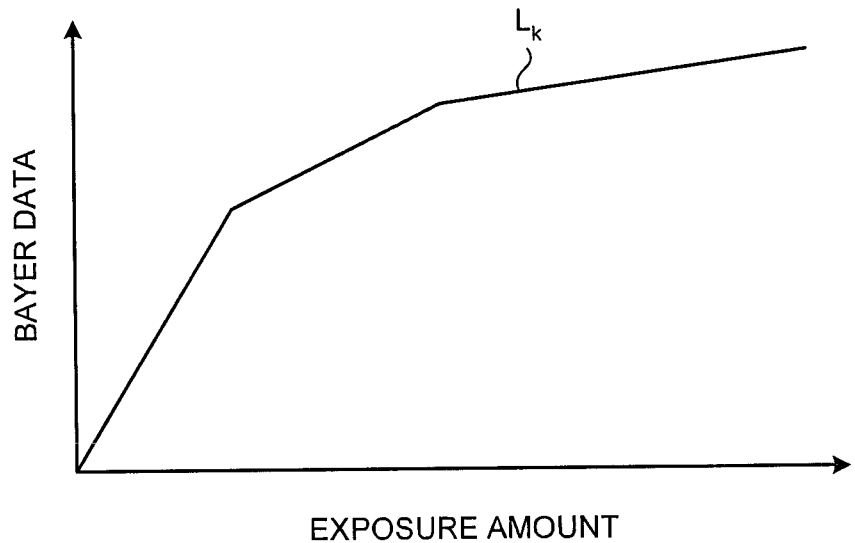
FIG. 47 is a diagram illustrating a relation between Bayer data and an exposure amount.

FIG. 47 is a diagram illustrating a relation between Bayer data and an exposure amount. As can be seen from a curved line $L_k$ illustrated in FIG. 47, a numerical value of the Bayer data has a knee characteristic in which rising is steep in a dark portion, but rising is gentle in a bright portion. The curved line $L_k$ having this characteristic is obtained by finely performing a quantization step as it is closer to the bright portion and roughly performing the quantization step as it is closer to the dark portion. In this way, in the seventh embodiment, Bayer data is quantized by a quantization step different from a normal quantization step which is constant regardless of an exposure amount. Thus, a numerical value characteristic of Bayer data is close to a gamma characteristic, influence on an image quality is reduced, and data is easily compressed. As a result, a small amount of image data can be stored in the SDRAM 25.

Figure 48:
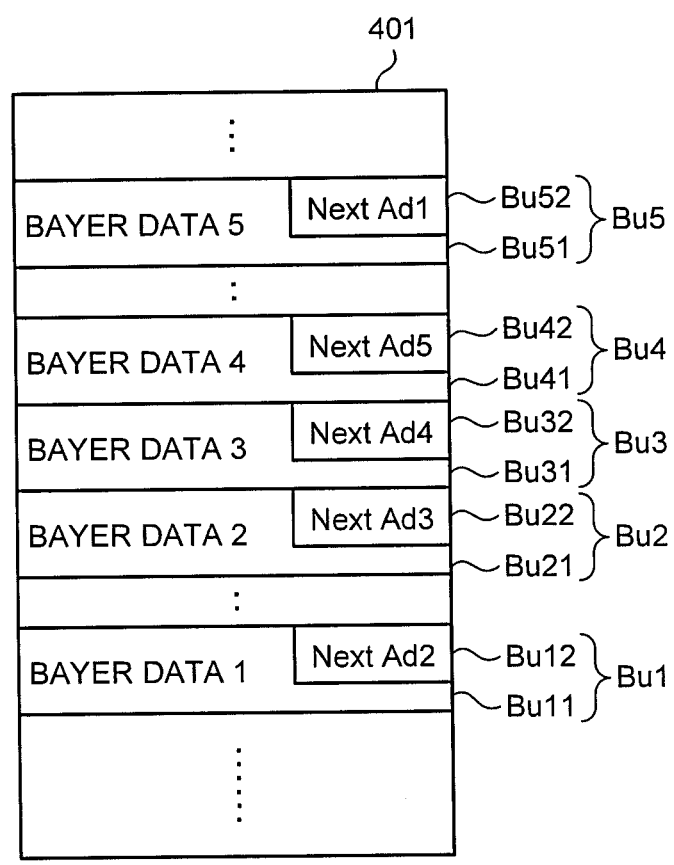
FIG. 48 is a diagram schematically illustrating an output line of a data structure stored in an SDRAM of the imaging device according to the seventh embodiment of the present invention.

FIG. 48 is a diagram schematically illustrating an output line of a data structure stored in the SDRAM 25. In data structure 401 illustrated in FIG. 48, buffers Bu1 to Bu5 which are equal in number to the number (five in FIG. 48) used at the time of image synthesis are secured as ring buffers. The buffer Bui (i=1 to 5) includes a region Bui1 used to store Bayer data and a region Bui2 used to store an address of a next buffer. In the following, an address of a buffer Bui is denoted by Adi.

First, when Bayer data is stored, initial storage destination information is set to "storage destination address=Ad1, end address=NULL(0)." Thereafter, when Bayer data is stored, the storage destination information is set to "storage destination address=Ad2, end address=Ad1." This means that data is present in ascending order by time from the buffer of the address Ad1 to the immediately previous buffer of the address Ad2. In other words, it means that single Bayer data remains stored.

Thereafter, when second Bayer data is stored, the storage destination information is set to "storage destination address=Ad3, end address=Ad1." In this case, Bayer data is stored in the two buffers Bu1 and Bu2.

Thereafter, the same process as described above is repeated, and then when fifth Bayer data is stored, the storage destination information is set to "storage destination address=Ad1, end address=Ad1." In this case, Bayer data is stored in the five buffers Bu1 to Bu5.

Thereafter, when Bayer data is continuously stored, since the oldest Bayer data is stored in the buffer Bu1, the Bayer data is updated to latest data, and Bayer data stored in the buffer Bu1 becomes the oldest data. Thus, the storage destination information is set to "storage destination address=Ad2, end address=Ad2."

Thereafter, by repeating the same process as described above, a constant number of pieces of Bayer data are managed in the SDRAM 25 while replacing the oldest Bayer data with latest Bayer data.

Referring back to FIGS. 46A and 46B, step S192 and subsequent processes will be described. The basic image processing unit 161 performs basic image processing (step S192). The artistic effect image processing unit 162 performs artistic effect image processing (step S193). The image data (Bayer data) which have been subjected to basic image processing and artistic effect image processing is stored in the buffer of the SDRAM 25.

Thereafter, the control unit 29 determines whether or not the moving image special effect remains set (step S194). Here, when it is determined that the moving image special effect remains set (Yes in step S194), the imaging device 71 causes the process to proceed to step S195. However, when it is determined that the moving image special effect does not remain set (No in step S194), the imaging device 71 causes the process to return to the main routine.

Here, when it is determined in step S195 that the multi-echo remains set as the moving image special effect (Yes in step S195), the imaging device 71 performs multi-echo processing (step S196). The details of multi-echo processing will be described later.

The processes of steps S197 to S207 sequentially correspond to the processes of steps S171 to S181 of FIGS. 44A and 44B.

Figure 49:
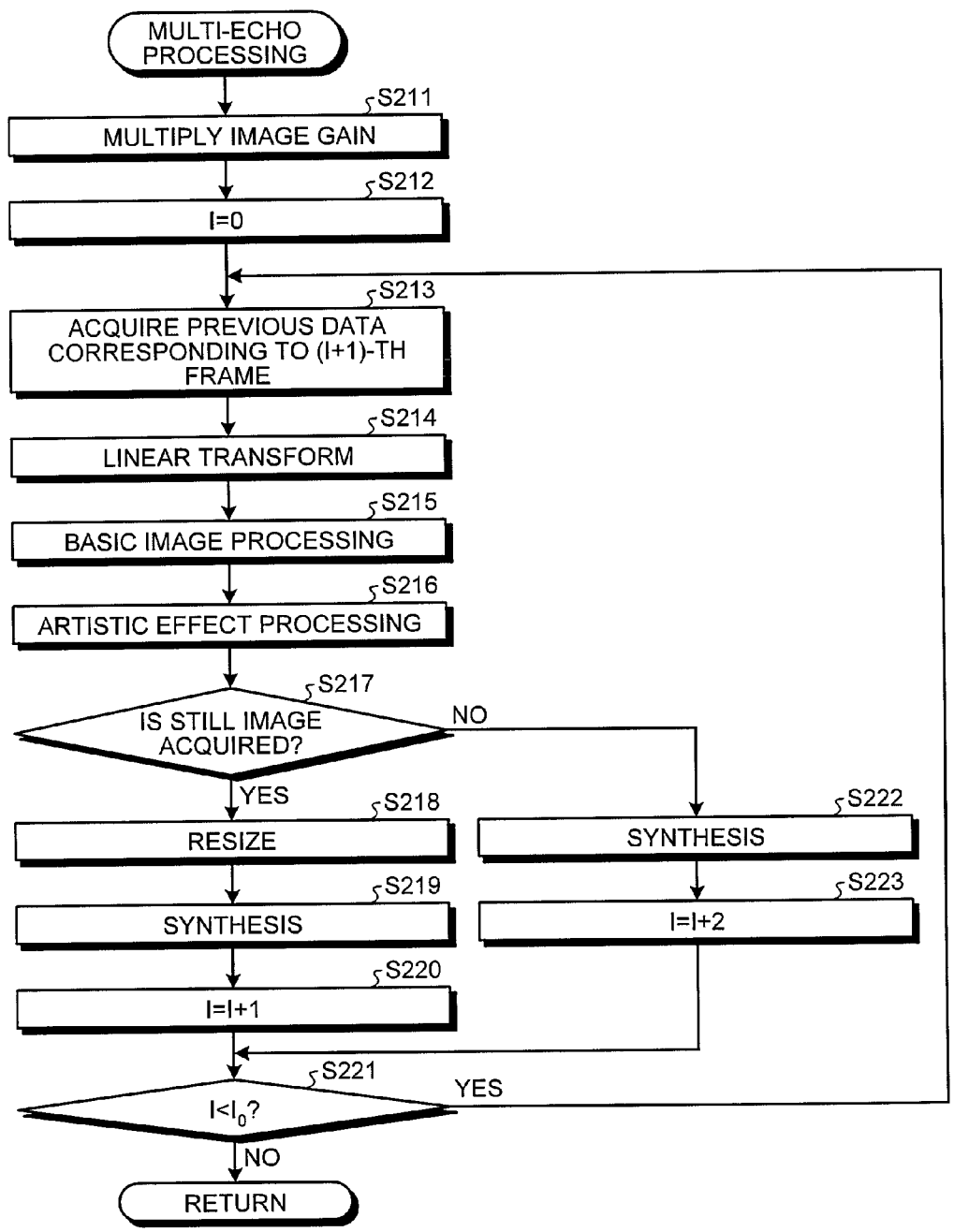
FIG. 49 is a flowchart illustrating an outline of multi-echo processing.

FIG. 49 is a flowchart illustrating an outline of multi-echo processing. Referring to FIG. 49, the moving image special effect image processing unit 721 multiplies an acquired image signal by a predetermined coefficient (gain) for each pixel (step S211). A value of this coefficient is $d_0$ which will be described later.

Thereafter, the control unit 29 sets a value of a counter I representing a repeat count to zero (0) (step S212).

Next, the moving image special effect image processing unit 721 acquire data corresponding to a (I+1)-th previous frame (step S213), and then performs a linear transform (step S214). Here, the linear transform is to eliminate a difference in characteristic at the time of quantization step of each frame, and has a characteristic (a deknee) characteristic) opposite to the characteristic in the above-described quantization step. As the linear transform is performed, Bayer data has a numerical value proportional to an exposure amount.

Thereafter, the basic image processing unit 161 performs basic image processing on the image data which has been subjected to the linear transform (step S215). Further, the artistic effect image processing unit 162 performs artistic effect image processing on the image data which has been subjected to basic image processing in step S215 (step S216).

The process subsequent to step S216 depends on whether an image acquired by the imaging device 71 is a still image or a moving image. First, an example in which the acquired image is a still image (Yes in step S217) will be described. In this case, the resizing processing unit 722 resizes the image data (step S218), and then performs the synthesis process using the resized image data (step S219). Here, the synthesis processing is represented by:

frame buffer image data+d×image data.

Figure 50:
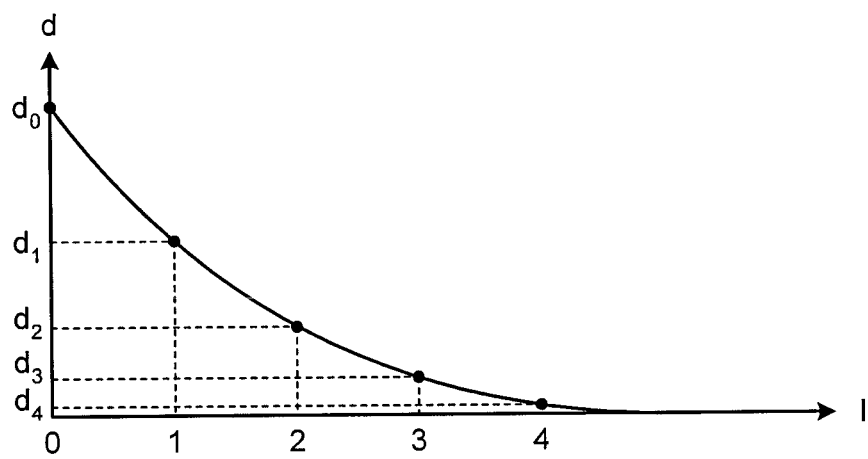
FIG. 50 is a diagram illustrating a relation between a value of an image gain applied when an acquired image is a still image and a repeat count.

FIG. 50 is a diagram illustrating a relation between a value of an image gain d and a repeat count I. In an example illustrated in FIG. 50, as the repeat count I increases, the image gain d decreases, and a setting is made such that a value obtained by adding coefficients corresponding to all possible repeat counts I by all repeat counts I is 1.0 ($d_0+d_1+d_2+d_3+d_4=1.0$). Here, when I is zero, the image gain $d_0$ has a value of an image gain applied in step S211 described above.

Next, the control unit 29 increases the counter I by one (1) to be set to (I+1) (step S220). Thereafter, when the counter I is a predetermined value $I_0$ (here, $I_0=5$) (Yes in step S221), the imaging device 71 causes the process to return to step S213. However, when the counter I is equal to or more than the predetermined value $I_0$ (No in step S221), the imaging device 71 causes the process to return to the main routine.

Next, an example in which the acquired image is a moving image (No in step S217) will be described. In this case, the moving image special effect image processing unit 721 synthesizes two frames (step S222). Here, similarly to a still image, the synthesis processing is represented by:

frame buffer image data+e×image data

Figure 51:
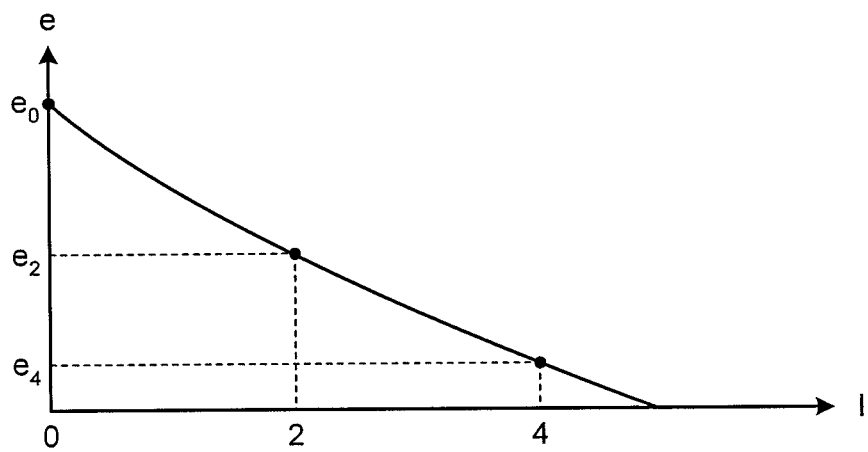
FIG. 51 is a diagram illustrating a relation between a value of an image gain applied when an acquired image is a moving image and a repeat count.

FIG. 51 is a diagram illustrating a relation between a value of an image gain e applied when the acquired image is a moving image and the repeat count I. In the example illustrated in FIG. 51, similarly to the case of a still image, as the repeat count I increases, the coefficient decreases, and a setting is made such that a value obtained by adding coefficients corresponding to all possible repeat counts I by all repeat counts I is 1.0 ($e_0+e_2+e_4=1.0$). However, since a moving image is larger in an increment amount than a still image, when a moving image and a still image are assumed to have the same I value, it is preferable that a coefficient applied to a moving image be larger than a coefficient applied to a still image. Further, in order to cause an image gain value of a still image to be equal to an image gain value of a moving image at step S211, $d_0=e_0$ needs to be satisfied.

Next, the control unit 29 increases the counter I by two (2) to be set to (I+2) (step S223). Thereafter, the imaging device 1 causes the process to proceed to step S221.

According to the seventh embodiment of the present invention described above, an appropriate residual image effect can be implemented on each of a moving image and a still image, and an image can be generated by minimum processing.

Further, according to the seventh embodiment, since a characteristic of a coefficient can be arbitrarily set, a degree of freedom of a design is large.

Further, in the seventh embodiment, settings such as the image gains d and e, the number of ring buffers, and interval between frames used for a synthesis may be changed by an operation input from the lens operating unit 35 or the like. By changing various settings in this way, the user's preferred residual image effect can be generated.

In the seventh embodiment, a form in which a ring buffer is managed is not limited to the above-described method. For example, a ring buffer can be managed using a queue. Next, a method of managing a ring buffer using a queue will be described.

Figure 52:
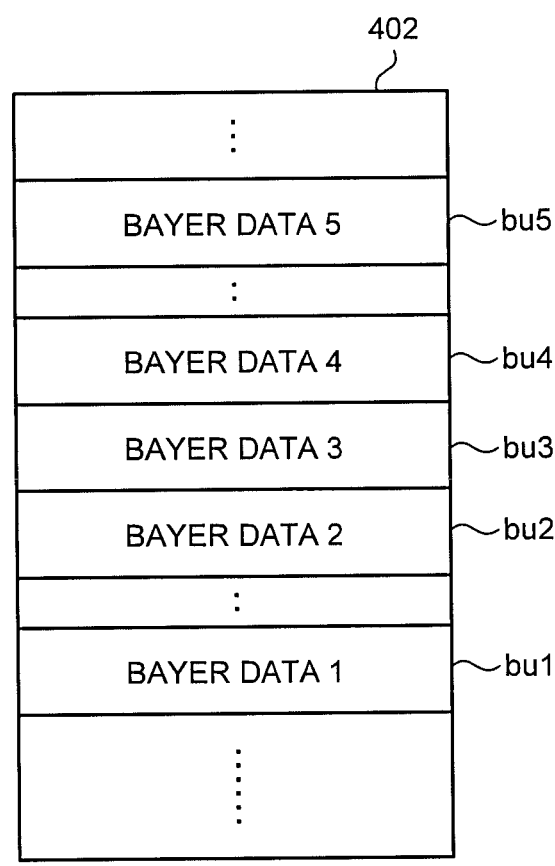
FIG. 52 is a diagram schematically illustrating a main part of a data structure stored in an SDRAM.

FIG. 52 is a diagram schematically illustrating a main part of a data structure stored in the SDRAM 25. In the data structure 402 illustrated in FIG. 52, buffers bu1 to bu5 which are equal in number to the number (five in FIG. 52) used at the time of image synthesis are secured as ring buffers. The buffer bui (i=1 to 5) stores Bayer data.

Figure 53:
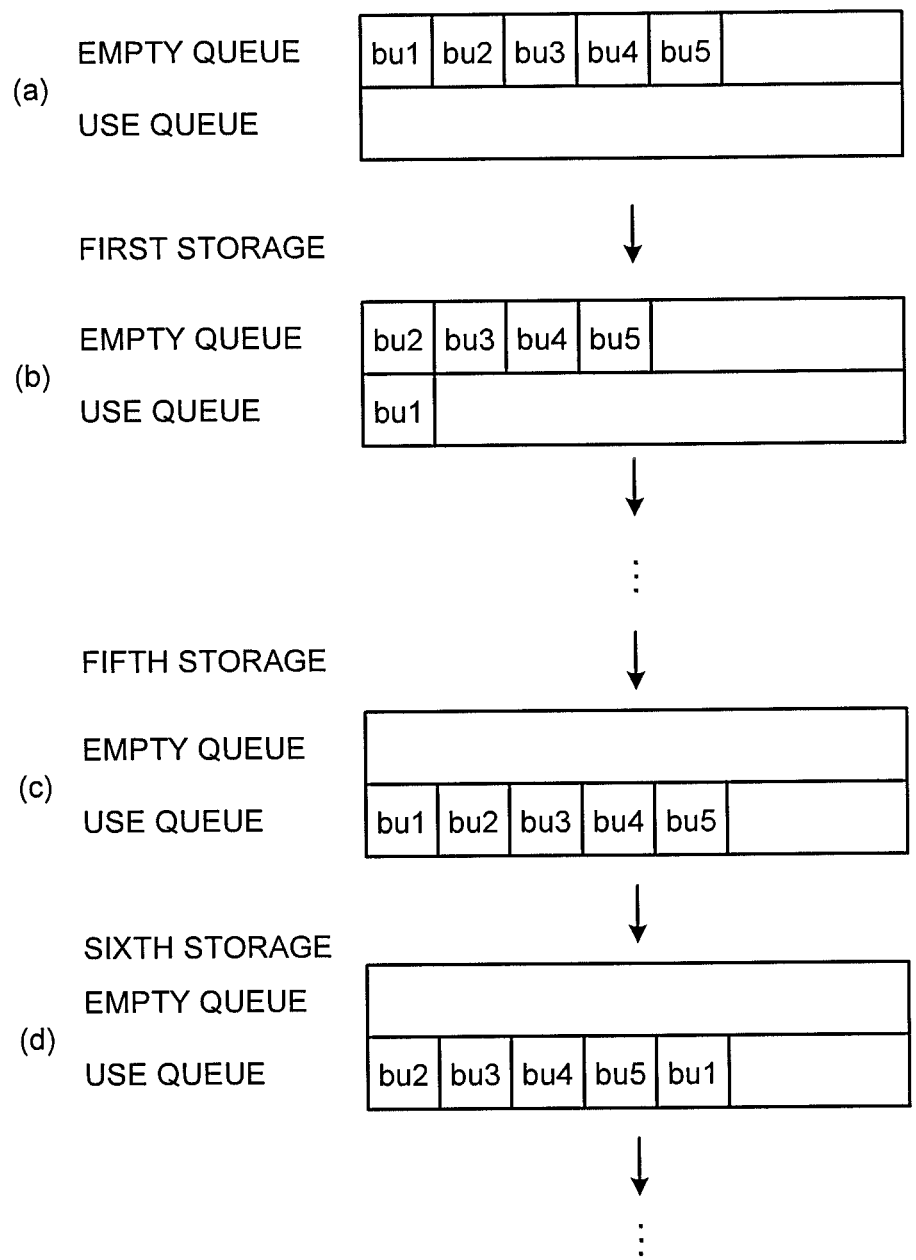
FIG. 53 is a diagram illustrating a form in which a ring buffer is managed using a queue.

FIG. 53 is a diagram illustrating a formed in which a ring buffer is managed using a queue. First, when an element is present in an empty queue, an element at the head is fetched, corresponding Bayer data is stored in the fetched element, and then the element is added to the tail of a use queue. In the example of FIG. 53(*a*), a buffer but at the head of the empty queue is fetched, corresponding Bayer data1 is stored in the buffer bu1, and then the buffer bu1 is added to the tail of the use queue (FIG. 53(*b*)). As this process is repeated, in the example illustrated in FIG. 53(*a*), the empty queue becomes empty when fifth storage is completed, and all buffers are added to the use queue. Thereafter, Bayer data is continuously stored while moving the buffers from the head to the tail of the use queue (FIG. 53(*d*)).

In this way, any well-known technique can be applied in order to manage moving image data using a ring buffer.

Further, in the seventh embodiment, an extraction interval of image data to be synthesized may be changed, and the number of pieces of image data to be synthesized may be changed. Further, in the seventh embodiment, the number of pieces of Bayer data stored as a ring buffer may be changed. This setting change can be made in response to a setting signal input through the setting signal input unit 201.

Other Embodiments

The embodiments for embodying the present invention have been described so far, but the present invention is not limited to the first to seventh embodiments.

For example, in the present invention, an electronic view finder may be disposed in the main body separately from a display unit, and the present invention may be applied to the electronic view finder. In this case, it is preferable that the display unit and the electronic view finder differ from each other in a method of viewing a moving image special effect.

Further, in the present invention, the lens unit may be formed integrally with the main body.

In addition, the imaging device according to the present invention can be applied to electronic devices such as digital cameras with an accessory mounted thereto, digital video cameras, portable phones with a shooting function, and tablet type portable devices as well as digital single-lens reflex cameras.

Furthermore, in the description of the flowchart in this disclosure, a sequence relation of processing between steps is specified using an expression such as "first," "thereafter," and "next." However, a sequence of processing necessary to embody the present invention is not uniquely decided. In other words, a sequence of processing in a flowchart described in this disclosure may be changed within a consistent range.

As described above, the present invention can include various embodiments which have not been described herein, and various design changes can be made within the scope of a technical spirit set forth in claims.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device that captures a subject, generates image data of the subject, captures a moving image, and captures a still image during moving image capturing including directly after moving image capturing end, the device comprising:

a moving image special effect image processing unit that performs image processing of applying a first special effect causing a visual effect over a plurality of frames corresponding to image data of a moving image, and image processing of applying a second special effect corresponding to the first special effect to a still image captured during moving image capturing using image data of a moving image captured before the still image; and a control unit that controls an application form of the first and second special effects in the moving image special effect image processing unit, wherein the moving image special effect image processing unit includes a resizing processing unit that performs resizing processing of approximating the number of pixels of image data of a moving image captured before the still image to the number of pixels of image data of the still image, and the moving image special effect image processing unit synthesizes the image data of a moving image which has been subjected to resizing processing by the resizing processing unit with the image data of the still image.

2. The imaging device according to claim 1, wherein image processing performed by the moving image special effect image processing unit includes multi-echo processing of continuously performing processing of synthesizing image data of an immediately previous frame with most recent image data at a predetermined ratio, and when the most recent image data is image data of a still image, the resizing processing unit performs resizing processing on the image data.

3. The imaging device according to claim 1, wherein image processing performed by the moving image special effect image processing unit includes one-shot echo processing in which specific image data is sequentially synthesized with image data captured after the specific image data at a predetermined ratio, and a synthesis ratio of the specific image data decreases over time, and when the most recent image data is image data of a still image, the resizing processing unit performs resizing processing on the image data.

4. An imaging method performed by an imaging device that captures a subject, generates image data of the subject, captures a moving image, and captures a still image during moving image capturing including directly after moving image capturing end, the method comprising:

performing image processing of applying a first special effect causing a visual effect over a plurality of frames corresponding to image data of a moving image, and image processing of applying a second special effect corresponding to the first special effect to a still image captured during moving image capturing using image data of a moving image captured before the still image, wherein the act of performing image processing includes (1) performing resizing processing of approximating the number of pixels of image data of a moving image captured before the still image to the number of pixels of image data of the still image, and (2) synthesizing the image data of a moving image which has been subjected to resizing processing with the image data of the still image.

* * * * *